United States Patent
Mikazuki et al.

(10) Patent No.: US 10,427,633 B2
(45) Date of Patent: Oct. 1, 2019

(54) END STRUCTURE OF VEHICLE

(71) Applicant: NIPPON STEEL & SUMITOMO METAL CORPORATION, Tokyo (JP)

(72) Inventors: Yutaka Mikazuki, Tokyo (JP); Eiji Isogai, Tokyo (JP); Kenji Yamamoto, Tokyo (JP); Takashi Ariga, Tokyo (JP); Seiya Ishii, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 38 days.

(21) Appl. No.: 15/546,420

(22) PCT Filed: Feb. 1, 2016

(86) PCT No.: PCT/JP2016/052924
§ 371 (c)(1),
(2) Date: Jul. 26, 2017

(87) PCT Pub. No.: WO2016/125745
PCT Pub. Date: Aug. 11, 2016

(65) Prior Publication Data
US 2018/0265025 A1    Sep. 20, 2018

(30) Foreign Application Priority Data

Feb. 6, 2015  (JP) ................................. 2015-022204
Feb. 6, 2015  (JP) ................................. 2015-022216
(Continued)

(51) Int. Cl.
*B60R 19/56*    (2006.01)
*B60R 19/24*    (2006.01)
(Continued)

(52) U.S. Cl.
CPC .............. *B60R 19/56* (2013.01); *B60R 19/18* (2013.01); *B60R 19/24* (2013.01); *B62D 21/02* (2013.01); *B62D 21/152* (2013.01)

(58) Field of Classification Search
CPC ........ B60R 19/56; B60R 19/24; B62D 21/152
(Continued)

(56) References Cited

U.S. PATENT DOCUMENTS 8,430,437 B2*  4/2013  Asakawa ................ B60R 19/34
                                              293/132
8,899,642 B2* 12/2014  Kosaka .................. B60R 19/26
                                              293/133
(Continued)

FOREIGN PATENT DOCUMENTS

CN    201224371 Y    4/2009
CN    203558028 U    4/2014
(Continued)

OTHER PUBLICATIONS

International Search Report for PCT/JP2016/052924 dated Apr. 26, 2016.
(Continued)

*Primary Examiner* — Jason S Morrow
*Assistant Examiner* — E Turner Hicks
(74) *Attorney, Agent, or Firm* — Birch, Stewart, Kolasch & Birch, LLP

(57) ABSTRACT

[Object] To improve load resistance performance in response to collision.
[Solution] An end structure of a vehicle according to the present invention includes: a beam 2 that extends in a vehicle width direction; and a connecting structure 3 that connects the beam 2 to a vehicle body frame. In a cross-sectional view perpendicular to the vehicle width direction, the beam 2 includes a first top surface part 2a and a first
(Continued)

bottom surface part 2b which face each other, a first side surface part 2c that connects one ends of the first top surface part 2a and the first bottom surface part 2b, and first flange parts 2d that are formed to protrude vertically outwardly at the other ends of the first top surface part 2a and the first bottom surface part 2b. The beam 2 is fixed to the connecting structure 3 by at least one of bonding of a protrusion 6 that is provided in the connecting structure 3 and is arranged to protrude inside the beam 2 to the first top surface part 2a and the first bottom surface part 2b and bonding of a beam attachment member provided in the connecting structure 3 to the first flange parts 2d.

17 Claims, 38 Drawing Sheets

(30) Foreign Application Priority Data

Jul. 9, 2015 (JP) ................................ 2015-137758
Oct. 29, 2015 (JP) ................................ 2015-212519

(51) Int. Cl.
  *B62D 21/15* (2006.01)
  *B62D 21/02* (2006.01)
  *B60R 19/18* (2006.01)

(58) Field of Classification Search
  USPC .......... 296/187.09, 203.02, 30; 293/154, 155
  See application file for complete search history.

(56) References Cited

U.S. PATENT DOCUMENTS

| | | | |
|---|---|---|---|
| 2008/0116719 A1* | 5/2008 | Bae | B60R 19/34 296/187.09 |
| 2014/0367982 A1* | 12/2014 | Kano | B60R 19/18 293/121 |
| 2015/0035316 A1* | 2/2015 | Kuriyama | B62D 25/082 296/187.1 |

FOREIGN PATENT DOCUMENTS

| | | |
|---|---|---|
| JP | 2001-122058 A | 5/2001 |
| JP | 2004-243984 A | 9/2004 |
| JP | 2005-88740 A | 4/2005 |
| JP | 2005-225325 A | 8/2005 |
| JP | 2005-225326 A | 8/2005 |
| JP | 2010-241247 A | 10/2010 |
| JP | 2014-125000 A | 7/2014 |

OTHER PUBLICATIONS

Written Opinion of the International Searching Authority for PCT/JP2016/052924 (PCT/ISA/237) dated Apr. 26, 2016.
Japanese Office Action and partial English translation for corresponding Application No. 2016-573352, dated Jun. 26, 2018.
Korean Office Action, dated Aug. 16, 2018, for corresponding Korean Application No. 10-2017-7023866, with a partial English translation.
Chinese Office Action and Search Report dated Dec. 28, 2018, for corresponding Chinese Application No. 201680008957.8, with partial English translation.
Office Action issued in Corresponding KR Application 10-2017-7023866 dated Feb. 26, 2019, with English translation.
Office Action dated Jul. 15, 2019 in corresponding Indian Patent Application No. 201717026712, with English Translation.
Korean Notice of Final Rejection dated May 15, 2019, for corresponding Korean Patent Application No. 10-2017-7023866, with English translation.
Indonesian Office Action dated Jul. 25, 2019 for corresponding Application No. P00201705690, along with an English translation.

* cited by examiner

END STRUCTURE OF VEHICLE

TECHNICAL FIELD

The present invention relates to an end structure of a vehicle to prevent an object from becoming wedged under a vehicle when the vehicle collides with the object.

BACKGROUND ART

For example, in the event of head-on collision or rear end collision of a passenger vehicle and a large vehicle such as a truck, due to a difference in installation heights of strength members such as cross members provided in the vehicles, the passenger vehicle may become wedged under the large vehicle. Therefore, in the related art, an underrun protector is provided at the front part and the rear part of the large vehicle in accordance with an installation height of a strength member of the passenger vehicle. The underrun protector is an example of an end structure of a vehicle. In addition, underrun protectors include a front underrun protector (FUP) provided at the front of a vehicle and a rear underrun protector (RUP) provided at the rear of a vehicle.

It is necessary for such an underrun protector to prevent the passenger vehicle from becoming wedged under the large vehicle and to exhibit a collision energy absorption effect due to a crushable zone provided at the front or rear part of the passenger vehicle. Therefore, there is a higher demand for the underrun protector to have load resistance performance to generate a reaction force by which the passenger vehicle that collides with the large vehicle is cast aside rather than for an effect of absorbing the collision energy generated when collision with the passenger vehicle occurs.

For example, techniques related to underrun protectors are disclosed in Patent Literature 1 to 3. Such underrun protectors have a structure in which a beam that extends in a vehicle width direction is fastened to a vehicle body frame with a bracket or a stay (support) therebetween.

In addition, in the underrun protector disclosed in Patent Literature 4, a reinforcing member is provided to bridge a frame attachment part attached to a vehicle body frame and a beam attachment surface (a main body attachment part) attached to a beam in a plan view. Thus, improvement of the load resistance performance is attempted.

CITATION LIST

Patent Literature

Patent Literature 1: JP 2005-88740A
Patent Literature 2: JP 2005-225325A
Patent Literature 3: JP 2005-225326A
Patent Literature 4: JP 2004-243984A

SUMMARY OF INVENTION

Technical Problem

As a method of evaluating load resistance performance, there is a method in which, at an attachment position of a beam in a stay or at a position lateral to the attachment position in a vehicle width direction, when a load is applied to a collision surface (a surface with which another vehicle collides) of the beam, a maximum load that can be input is evaluated. The performance of an underrun protector as a product depends on the superiority or inferiority of the load resistance performance. Therefore, the development of an underrun protector in which a maximum input load at any collision position in a load resistance performance evaluation test is greater than in the related art is desirable.

Therefore, the present invention has been made in view of the above problems, and in view of the above circumstances, an object of the present invention is to provide a novel and improved end structure of a vehicle through which it is possible to improve load resistance performance in response to collision.

Solution to Problem

In order to solve the above problem, according to an aspect of the present invention, there is provided an end structure of a vehicle, including: a beam that extends in a vehicle width direction; and a connecting structure that connects the beam to a vehicle body frame. In a cross-sectional view perpendicular to the vehicle width direction, the beam includes a first top surface part and a first bottom surface part which face each other, a first side surface part that connects one ends of the first top surface part and the first bottom surface part, and first flange parts that are formed to protrude vertically outwardly at the other ends of the first top surface part and the first bottom surface part. The beam is fixed to the connecting structure by at least one of bonding of a protrusion that is provided in the connecting structure, protrudes inside the beam, and is arranged inside the beam to the first top surface part and the first bottom surface part and bonding of a beam attachment member provided in the connecting structure to the first flange parts.

In a case where the protrusion is provided in the connecting structure, a protruding side surface part which faces the first side surface part may be formed in the protrusion.

In a case where the beam attachment member is provided in the connecting structure and the beam attachment member is fixed to the first flange parts, in a cross-sectional view perpendicular to the vehicle width direction, the beam attachment member may include a second top surface part and a second bottom surface part which face each other, a second side surface part that connects one ends of the second top surface part and the second bottom surface part, and second flange parts formed to protrude vertically outwardly at the other ends of the second top surface part and the second bottom surface part. The first flange parts and the second flange parts may be fixed.

The second side surface part may be positioned on a vehicle interior side in a vehicle longitudinal direction with respect to the first flange parts.

In a case where the beam attachment member is provided in the connecting structure and the beam attachment member is fixed to the first flange parts, a first reinforcing member may be provided in a region of an opening part of the beam that faces at least the connecting structure in the vehicle width direction, and a closed cross section may be formed by the beam and the first reinforcing member in a cross-sectional view perpendicular to the vehicle width direction.

In a cross-sectional view perpendicular to the vehicle width direction, the first reinforcing member may include a first reinforcing member top surface part and a first reinforcing member bottom surface part which face each other, and a first reinforcing member side surface part that connects one ends of the first reinforcing member top surface part and the first reinforcing member bottom surface part. The first reinforcing member may be arranged inside the beam, the first top surface part and the first reinforcing member top surface part may be fixed, and the first bottom surface part and the first reinforcing member bottom surface part may be fixed.

In the first reinforcing member side surface part, a convex part that protrudes to a vehicle interior side in a vehicle longitudinal direction with respect to the first flange parts may be formed.

At least a part of the first reinforcing member side surface part may be in contact with the connecting structure.

A second reinforcing member may be provided in a region of an opening part of the beam that faces at least the beam attachment member. In a cross-sectional view perpendicular to the vehicle width direction, the second reinforcing member may include a second reinforcing member top surface part and a second reinforcing member bottom surface part which face each other, a second reinforcing member side surface part that connects one ends of the second reinforcing member top surface part and the second reinforcing member bottom surface part, and second reinforcing member flange parts formed to protrude vertically outwardly at the other ends of the second reinforcing member top surface part and the second reinforcing member bottom surface part. The second reinforcing member may be arranged inside the beam. The second reinforcing member flange parts may be fixed to the first side surface part. The second reinforcing member side surface part may be in contact with the beam attachment member.

In a case where the beam attachment member is provided in the connecting structure and the beam attachment member is fixed to the first flange parts, the connecting structure may further include a structure main body part that is provided to extend in the vertical direction. The beam attachment member may include a beam attachment surface to which the beam is attached and which includes a bent portion that bends toward a vehicle interior side in a vehicle longitudinal direction at an end on the outside in the vehicle width direction, and a main body connecting surface which includes a surface perpendicular to the beam attachment surface in a plan view and is attached to the structure main body part. At least one third reinforcing member may be additionally provided to bridge the structure main body part and the beam attachment surface in a plan view.

The bent portion may have a radius of curvature of 50 to 200 mm.

The third reinforcing member may be provided such that a ratio $L_1/L_2$ of a length $L_1$ of the third reinforcing member in the vehicle longitudinal direction to a length $L_2$ of a surface of the structure main body part to which the third reinforcing member is attached in the vehicle longitudinal direction is 0.8 or more.

The structure main body part may have a U-shaped cross section in which an opening part is provided in the vehicle width direction in a plan view, and a closed cross section part whose horizontal cross section shape formed by the structure main body part and the main body connecting surface is a closed cross section may be further provided.

In a case where a plurality of third reinforcing members are provided in the vertical direction, inside the closed cross section part, a reinforcing plate arranged in accordance with a position of a rear side tip, among tips of the third reinforcing member, in the vehicle longitudinal direction may be provided. The reinforcing plate may have a shape that extends to the rear side tip of the third reinforcing member positioned on the uppermost side from the rear side tip of the third reinforcing member positioned on the lowermost side among the plurality of third reinforcing members.

A partition member may be provided to fill a space inside the closed cross section part in a horizontal cross-sectional view of the closed cross section part, and the partition member may be arranged in accordance with an installation height of at least one of the third reinforcing members.

The end structure of the vehicle may be an underrun protector.

In order to solve the above problem, according to another aspect of the present invention, there is provided an end structure of a vehicle, including: a beam that extends in a vehicle width direction and a connecting structure that connects the beam and a vehicle body frame. The connecting structure includes a structure main body part that is provided to extend in a vertical direction, and a beam attachment member to which the beam is attached. The beam attachment member includes a beam attachment surface to which the beam is attached and which includes a bent portion that bends toward a vehicle interior side in a vehicle longitudinal direction at an end on the outside in the vehicle width direction, and a main body connecting surface which includes a surface perpendicular to the beam attachment surface in a plan view and is attached to the structure main body part. At least one reinforcing member is additionally provided to bridge the structure main body part and the beam attachment surface in a plan view.

Advantageous Effects of Invention

As described above, according to the present invention, it is possible to improve load resistance performance in response to collision.

DESCRIPTION OF EMBODIMENTS

Figure 1:
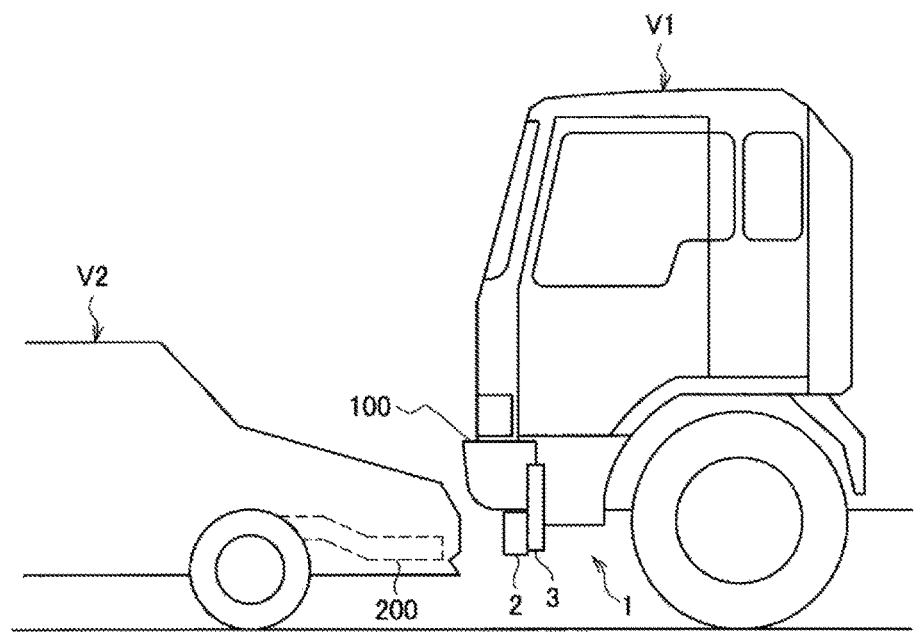
FIG. 1 is a schematic view of an underrun protector according to an embodiment of the present invention.

Hereinafter, (a) preferred embodiment(s) of the present invention will be described in detail with reference to the appended drawings. In this specification and the appended drawings, structural elements that have substantially the same function and structure are denoted with the same reference numerals, and repeated explanation of these structural elements is omitted.

In addition, in this specification, for example, the "vehicle exterior side in a vehicle longitudinal direction" refers to the "front side" when an end structure of the vehicle is provided at the front of the vehicle and refers to the "rear side" when an end structure of the vehicle is provided at the rear of the vehicle. The "vehicle interior side in a vehicle longitudinal direction" refers to a side opposite to the "vehicle exterior side in a vehicle longitudinal direction." In addition, in this specification, the expressions "horizontal" and "vertical" include not only precisely "horizontal" and "vertical," but also include substantially horizontal and substantially vertical. In addition, in this specification, the expression "perpendicular" includes not only exactly perpendicular (90°) but also substantially perpendicular.

1. Load Resistance Performance Evaluation of Underrun Protector

FIG. 1 is a schematic view of an underrun protector according to an embodiment of the present invention. As shown in FIG. 1, in a large vehicle V1, an underrun protector 1 including a beam 2 and a connecting structure 3 is provided. The underrun protector 1 according to the present embodiment is an example of an end structure of a vehicle. The underrun protector 1 shown in FIG. 1 is provided at a front lower part of the large vehicle V1 and is attached to a vehicle body frame (not shown) with the connecting structure 3 therebetween. The underrun protector 1 is provided not only at the front but also the rear of the large vehicle V1.

As shown in FIG. 1, in the large vehicle V1, a bumper 100 is generally provided at the front or rear of the vehicle. However, the bumper 100 may be provided at a position higher than a frame 200 of a passenger vehicle V2. Therefore, when the large vehicle V1 collides with the passenger vehicle V2, the bumper 100 and the frame 200 do not collide from the front, and the large vehicle V1 rides over the passenger vehicle V2. In this case, it is not possible for the frame 200 to absorb the impact energy received from the large vehicle V1, and the cabin of the passenger vehicle V2 may be deformed. Therefore, it is difficult to ensure the safety of passengers aboard the passenger vehicle V2.

Meanwhile, as shown in FIG. 1, the underrun protector 1 is provided at substantially the same height as the frame 200 of the passenger vehicle V2. In this case, when the large vehicle V1 collides with the passenger vehicle V2 in the vehicle longitudinal direction, the underrun protector 1 collides with the frame 200. Accordingly, the passenger vehicle V2 does not become wedged under the large vehicle V1, and the frame 200 can absorb the collision energy received from the large vehicle V1. Therefore, it is possible to ensure the safety of passengers aboard the passenger vehicle V2.

It is necessary for such an underrun protector to exhibit a mechanism for absorbing collision energy of the passenger vehicle V2 while preventing the passenger vehicle V2 from becoming wedged under the large vehicle. That is, there is a higher demand for the underrun protector 1 to have load resistance performance to generate a reaction force by which the passenger vehicle V2 that collides with the large vehicle V1 is cast aside rather than for an effect of absorbing the collision energy generated when collision with the passenger vehicle V2 occurs. The high load resistance performance is necessary regardless of a collision position in a vehicle width direction with respect to the beam 2 of the underrun protector 1. However, depending on a position at which a load is input to the beam 2, a deformation mode occurring in the underrun protector 1 during collision is different. Therefore, it is necessary to improve the load resistance performance according to a plurality of deformation modes.

Figure 2:
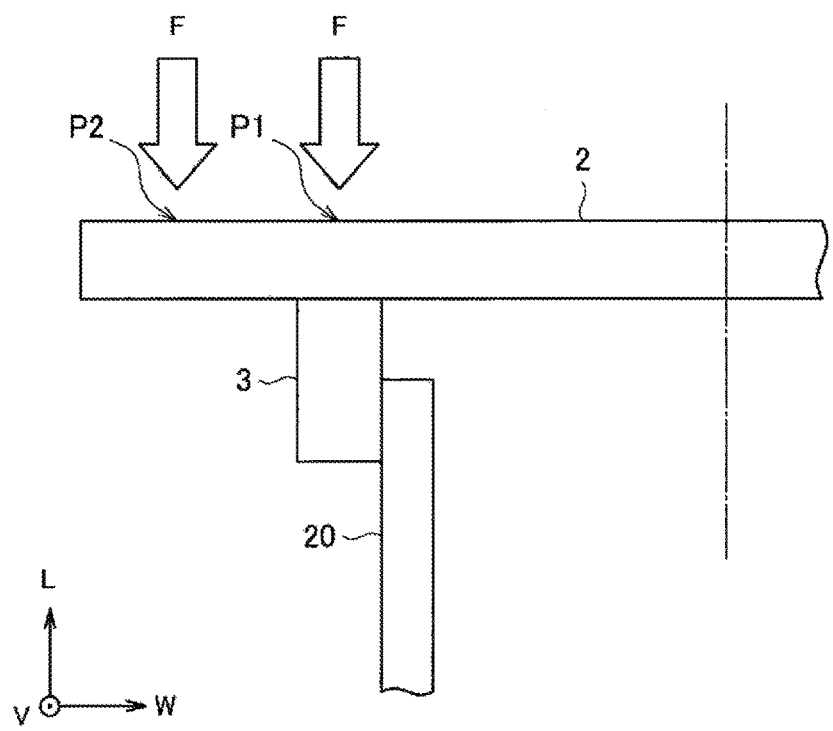
FIG. 2 is a diagram for describing load input positions according to a method of evaluating load resistance performance of an underrun protector.

FIG. 2 is a diagram for describing load input positions according to a method of evaluating load resistance performance of an underrun protector. Referring to FIG. 2, the method of evaluating load resistance performance of an underrun protector (a load resistance performance evaluation method) is a method in which a maximum input load obtained when a load F is input at a position P1 at which the beam 2 is attached to the connecting structure 3 attached to a vehicle body frame 20 or a position P2 lateral to the attachment position P1 in a vehicle width direction W is evaluated.

In order to obtain sufficient load resistance performance of the underrun protector, as described above, it is necessary to respond to a deformation mode of the beam 2 occurring when a load is input to each collision position. For example, when the load F is applied to the attachment position P1, the cross section of the beam 2 near the attachment position P1 may collapse. In order to prevent the cross section of the beam 2 at the attachment position P1 from collapsing, it is necessary to prevent out-of-plane deformation of the beam 2. In addition, when the load F is applied to the position P2, the beam 2 may be deflected near the position P2. In order to avoid deflection of the beam 2 near the position P2, it is necessary to prevent the beam 2 from being bent.

That is, the performance of the underrun protector as a product is influenced by the superiority or inferiority of the load resistance performance at the attachment position P1 and the position P2. Therefore, the underrun protector having favorable load resistance performance is an underrun protector having a high maximum input load at the attachment position P1 and the position P2.

Figure 3:
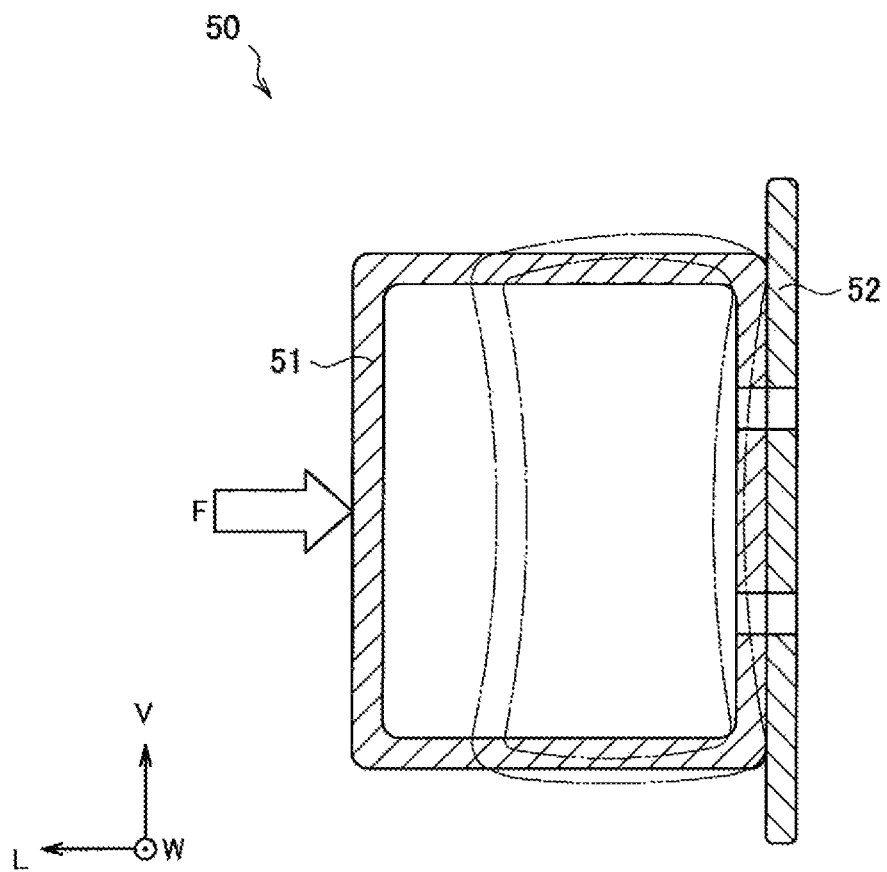
FIG. 3 is a cross-sectional view of an exemplary schematic configuration of an underrun protector of the related art.

Here, an exemplary configuration of an underrun protector of the related art will be described. FIG. 3 is a cross-sectional view of an exemplary schematic configuration of an underrun protector 50 of the related art. As shown in FIG. 3, the underrun protector 50 of the related art includes a beam 51 and a bracket 52. The bracket 52 is attached to a vehicle frame (not shown). The beam 51 is attached to the bracket 52 so that it is at the vehicle exterior side in the vehicle longitudinal direction.

In the case of such a beam shape, when the load F is input to a beam collision surface, the beam 51 may be deformed as indicated by dashed lines in FIG. 3. In this case, for example, at the position P1 in FIG. 2, the cross section of the beam 51 may collapse. In addition, when such deformation occurs at the position P2 in FIG. 2, near a fastening part between the beam 51 and the bracket 52, an anti-collision surface of the beam 51 and the bracket 52 are deformed to be deflected to the inside of the beam 51.

When such deformation occurs, the deformation progresses as an input load increases. Therefore, the cross section of the beam has a strength that is significantly smaller than the inherent strength of the cross section of the beam. That is, it is not possible for sufficient load resistance performance of the underrun protector to be exhibited.

Thus, the inventors conducted extensive studies and invented underrun protectors described in the following embodiments as a result. The underrun protector in the present embodiment can improve the load resistance performance at any collision position compared to the related art. Underrun protectors according to embodiments will be described below.

Here, while the underrun protector in the present embodiment is an example of an end structure of a vehicle, the present invention is not limited thereto. For example, a life guard device for preventing an object such as a passenger vehicle from becoming entangled with a railway vehicle is also an example of the end structure of the vehicle according to the present invention. While the underrun protector is described in the present embodiment, the end structure of the vehicle according to the present invention can also be applied to other vehicles and self-travelling machines. Examples of the other vehicles and self-travelling machines include two-wheel vehicles, large vehicles such as buses and tractors, trailers, railway vehicles, construction machines, mining machines, agricultural machines, general machines, and ships. In addition, materials forming members of the end structure of the vehicle according to the present invention may be aluminum, titanium, or stainless steel metal plates in addition to steel plates. In addition, a material forming the members may be an alloy, a composite material including a metal and a resin, carbon fibers, or the like.

2. First Embodiment

Figure 4:
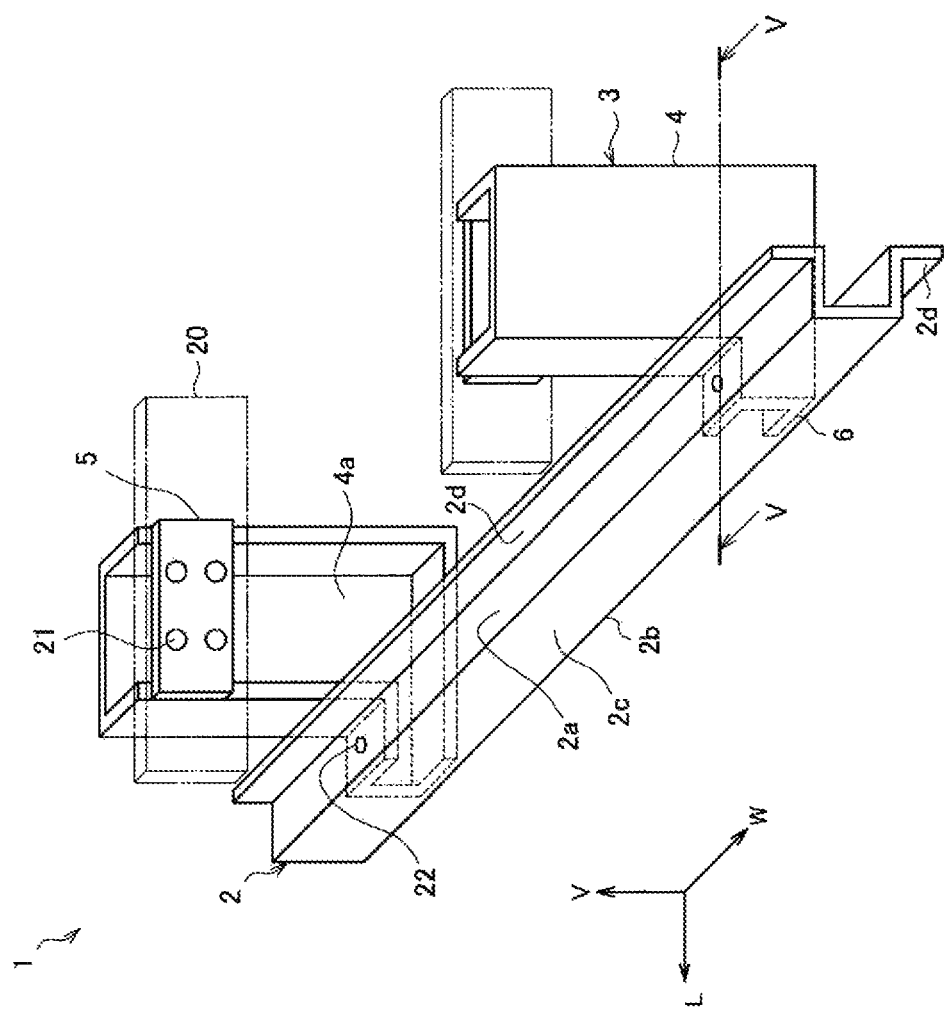
FIG. 4 is a perspective view of a schematic configuration of an underrun protector according to a first embodiment of the present invention.

FIG. 4 is a perspective view of an exemplary schematic configuration of an underrun protector 1 according to a first embodiment of the present invention. As shown in FIG. 4, the underrun protector 1 according to the present embodiment includes the beam 2 that extends in the vehicle width direction W and the connecting structure 3 for connecting the beam 2 to the vehicle body frame 20. The connecting structure 3 according to the present embodiment is, for example, a stay 4. Here, in another embodiment, the connecting structure 3 may be a bracket attached to the stay. The bracket is an example of a beam attachment member in another embodiment. A pair of left and right connecting structures 3 are provided at least at the front or rear of the vehicle. The beam 2 is provided to bridge the pair of left and right connecting structures 3. A material forming the beam 2 is not limited to a steel material as described above and may include various metals, alloys, a composite material including a metal and a resin, carbon fibers, or the like. Since the load resistance performance is necessary for the beam 2, it is preferably formed of a high strength material.

A pair of stays 4 are formed to extend in a vertical direction V and include a part formed in a U-shape in a plan view and a protrusion 6 that protrudes inside the beam 2. In addition, the pair of stays 4 are arranged with an interval therebetween so that opening surfaces 4a face each other inside in the vehicle width direction W. On a part of each of the opening surfaces 4a of the pair of stays 4, a frame attachment plate 5 is provided to cover an opening. The frame attachment plate 5 is welded to the stay 4. A bolt hole 21 is formed in the frame attachment plate 5. The frame attachment plate 5 is fastened to the vehicle body frame 20 through the bolt hole 21 using a bolt. Accordingly, the stay 4 is fixed to the vehicle body frame 20. Here, in the present embodiment, the connecting structure 3 includes the stay 4 and the frame attachment plate 5.

Figure 5:
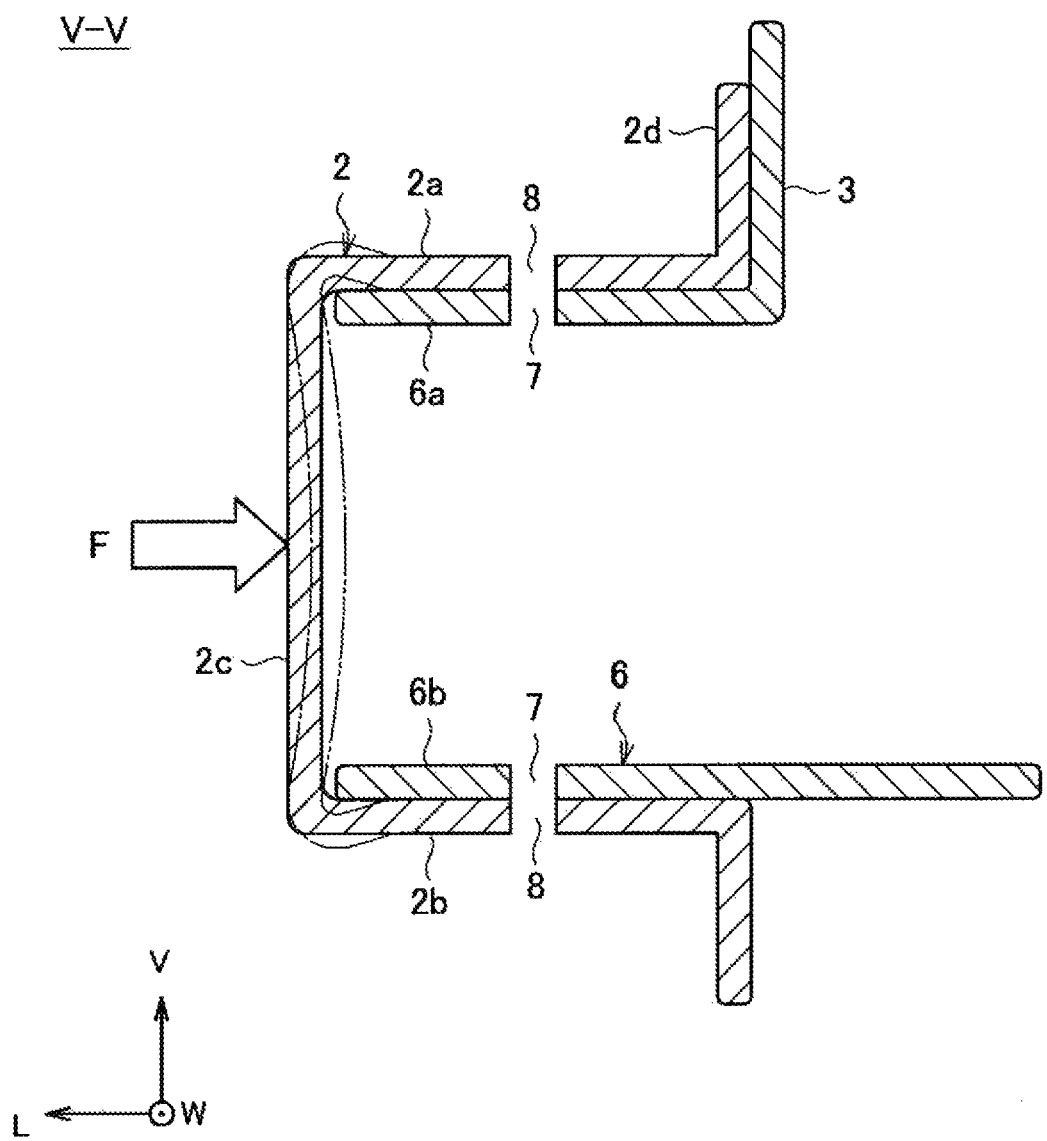
FIG. 5 is a cross-sectional view of the underrun protector according to the first embodiment taken along the line V-V in FIG. 4.

FIG. 5 is a cross-sectional view of the underrun protector 1 according to the present embodiment taken along the line V-V in FIG. 4. Here, in FIG. 5, deformations of members when a load is input are indicated by dashed lines in the image. As shown in FIG. 5, in a cross-sectional view perpendicular to the vehicle width direction W, the beam 2 according to the present embodiment includes a first top surface part 2a and a first bottom surface part 2b which face each other and a first side surface part 2c connecting one ends of the first top surface part 2a and the first bottom surface part 2b. In the present embodiment, the first top surface part 2a and the first bottom surface part 2b are provided to be horizontal. In addition, the first side surface part 2c is formed to be perpendicular to the first top surface part 2a and the first bottom surface part 2b and has a vertical surface. In addition, at the other ends (one ends on the side in which the first side surface part 2c is not provided) of the first top surface part 2a and the first bottom surface part 2b, a pair of first flange parts 2d that protrude outward in the vertical direction V are provided. Specifically, the first flange parts 2d are formed to protrude upward in the vertical direction V at the other end of the first top surface part 2a and to protrude downward in the vertical direction V on the first bottom surface part 2b. That is, the beam 2 according to the present embodiment has a so-called hat shape in a cross-sectional view perpendicular to the vehicle width direction W.

That is, the beam 2 according to the present embodiment has a so-called hat shape in a cross-sectional view perpendicular to the vehicle width direction W. In addition, as shown in FIG. 5, bolt holes 8 are formed at central parts of the first top surface part 2a and the first bottom surface part 2b in the beam 2.

In addition, as shown in FIG. 4 and FIG. 5, the protrusion 6 of the stay 4 includes a protruding top surface part 6a that is formed to face the first top surface part 2a and a protruding bottom surface part 6b that is formed to face the first bottom surface part 2b. In the present embodiment, the tip of the protrusion 6 is close to the first side surface part 2c. In addition, the first top surface part 2a and the protruding top surface part 6a are in contact with each other, and the first bottom surface part 2b and the protruding bottom surface part 6b are in contact with each other. In addition, bolt holes 7 are formed at central parts of the protruding top surface part 6a and the protruding bottom surface part 6b. The protrusion 6 is fixed to the first top surface part 2a and the first bottom surface part 2b via the bolt hole 7 and the bolt hole 8 using a bolt 22. Accordingly, the beam 2 is attached to the vehicle body frame 20 via the stay 4.

The underrun protector 1 according to the present embodiment is configured as described above. In such a configuration, the protrusion 6 is arranged inside the beam 2 having an open cross section and is fixed to the first top surface part 2a and the first bottom surface part 2b. Accordingly, the load F applied due to collision is transmitted from the first top surface part 2a and the first bottom surface part 2b to the protrusion 6 in the in-plane direction as a shear force. Therefore, since the load applied to the first side surface part 2c of the beam 2 is transmitted to the stay 4 through the first top surface part 2a and the first bottom surface part 2b, a burden applied to the first side surface part 2c is reduced. Therefore, it is possible to prevent the progress of local deformation of the cross section of the beam 2 and prevent the input load from being dispersed. As a result, the maximum load value can be increased compared to the related art in a load resistance performance evaluation test, and it is possible to improve the load resistance performance of the underrun protector. That is, it is possible to improve the load resistance performance with respect to the load input to a collision surface (surface on the vehicle exterior side of a first side surface part 2c) of the beam 2 at the attachment position P1 on the beam 2 shown in FIG. 2.

In addition, in the above embodiment, the beam 2 includes the pair of first flange parts 2d. On the other hand, counter load input ends of the first top surface part 2a and the first bottom surface part 2b near a load input point of the beam 2 roughly undergo tensile deformation. Therefore, when the beam 2 having no first flange part 2d is made of a highly tensile material having high strength and low ductility, since an end of at least one of the first top surface part 2a and the first bottom surface part 2b may break, there is a possibility of a load resistance performance improvement effect being degraded more than expected. Therefore, when the first flange part 2d is formed in the beam 2, it is possible to prevent the end from breaking.

While the underrun protector 1 according to the present embodiment has been described above, the present invention is not limited thereto. For example, the shape of the stay 4 is not limited to the example described in the above embodiment. For example, the tip of the protrusion 6 of the stay 4 is preferably close to the first side surface part 2c of the beam 2 as described above. However, the position or the shape of the tip of the protrusion 6 inside the beam 2 may be appropriately changed according to the necessary load resistance performance, beam shape, and the like.

First Modified Example

Figure 6:
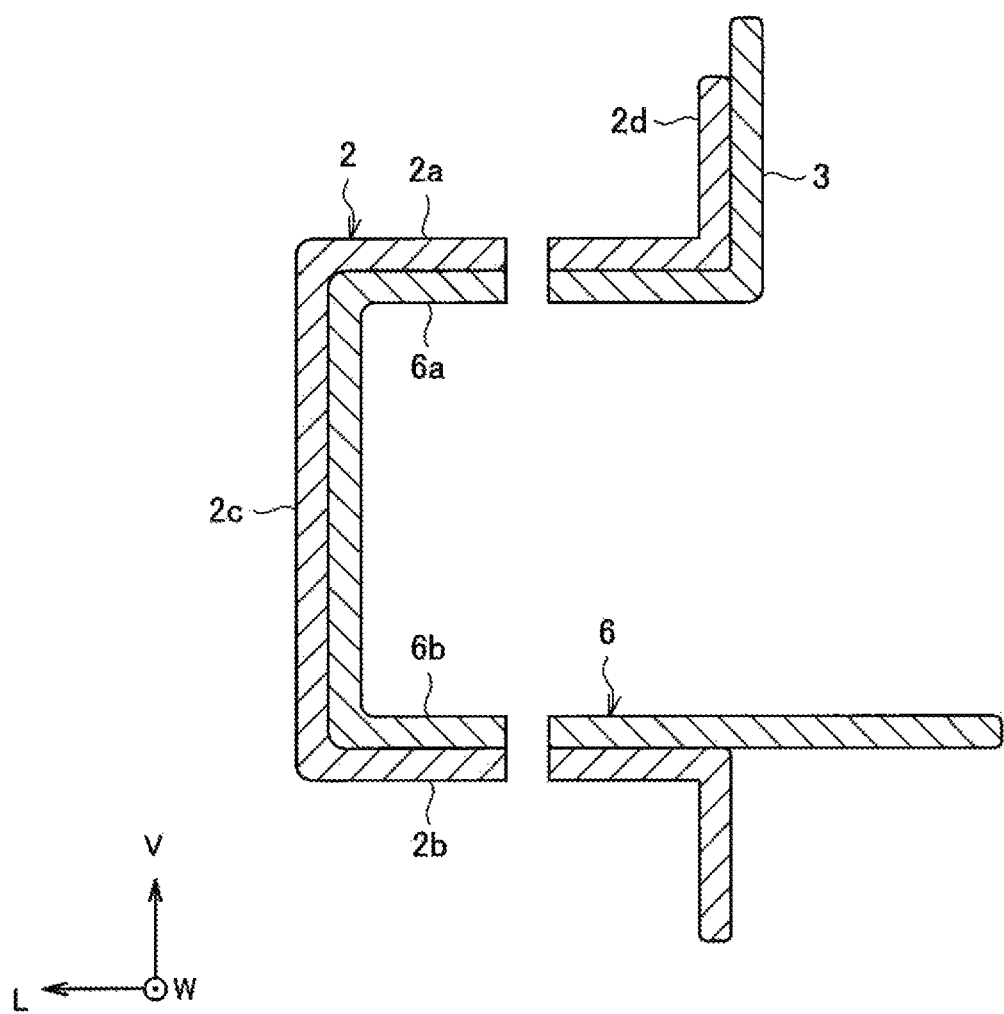
FIG. 6 is a cross-sectional view of a schematic configuration of a first modified example of the underrun protector according to the first embodiment.

FIG. 6 is a cross-sectional view of a schematic configuration of a first modified example of the underrun protector 1 according to the present embodiment. As shown in FIG. 6, a protruding side surface part 6c connecting tips of the protruding top surface part 6a and the protruding bottom surface part 6b may be provided. In this case, the protruding side surface part 6c may be provided at a position in contact with an inner side surface of the first side surface part 2c. In this case, when a load is input, it is possible to prevent the deformation of the first side surface part 2c and prevent out-of-plane deformation of the protrusion 6 (for example, the out-of-plane deformation of the protruding top surface part 6a or the protruding bottom surface part 6b). Therefore, it is possible to further improve the load resistance performance.

Second Modified Example

Figure 7:
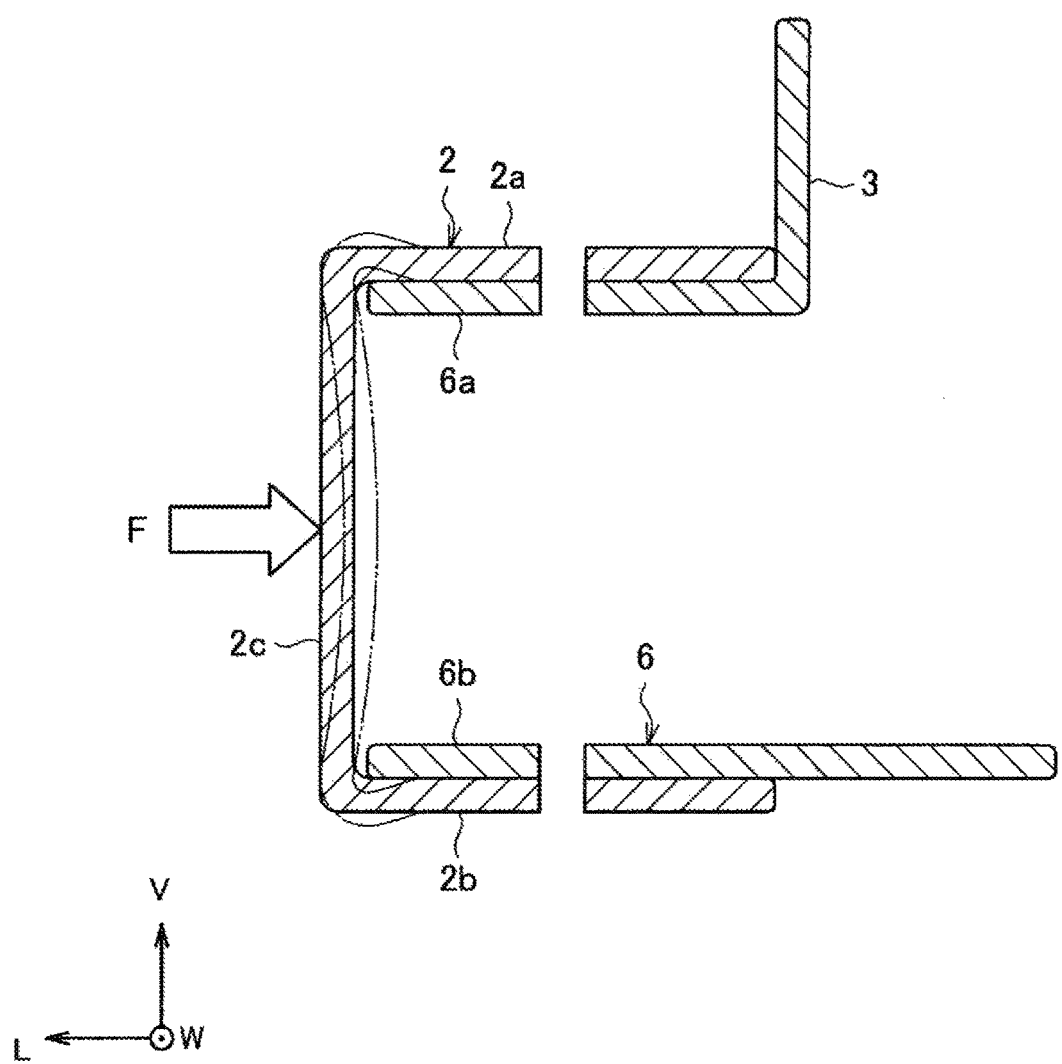
FIG. 7 is a cross-sectional view of a schematic configuration of a second modified example of the underrun protector according to the first embodiment.

In addition, while the beam 2 includes the pair of first flange parts 2d in the above embodiment, the first flange parts 2d may not be formed in the beam 2. FIG. 7 is a cross-sectional view of a schematic configuration of a second modified example of the underrun protector 1 according to the present embodiment. In this case, it is possible to prevent the deformation of the beam 2 to some extent, and it is possible to improve the load resistance performance of the underrun protector. However, as described above, when the beam 2 in which no first flange part 2d is formed is made of a highly tensile material having high strength and low ductility, since an end of at least one of the first top surface part 2a and the first bottom surface part 2b may break, there is a possibility of a load resistance performance improvement effect being degraded more than expected. Therefore, in order to prevent the end from breaking as described above, the first flange part 2d is preferably formed in the first top surface part 2a and the first bottom surface part 2b.

In addition, while the first top surface part 2a and the protruding top surface part 6a, and the first bottom surface part 2b and the protruding bottom surface part 6b are fixed using the bolt 22 in the above embodiment, positions of the bolt hole 7 and the bolt hole 8 are not limited to the example described in the above embodiment. Depending on the shape of the beam 2 or the shape of the stay 4, both parts may be fixed at other positions. Alternatively, both parts may be fixed by, for example, welding, instead of fixing using a bolt. However, when a bolt is used, since it is easy to exchange only the damaged beam 2 alone, maintainability is improved.

In addition, while the protrusion 6 is formed in contact with the first top surface part 2a and the first bottom surface part 2b in the above embodiment, the protrusion 6 and the first top surface part 2a and the first bottom surface part 2b may not be in contact with each other. The protrusion 6 is fixed to the first top surface part 2a and the first bottom surface part 2b. In addition, an insertion length of the protrusion 6 from an opening part of the beam 2 to the inside of the beam 2 is not particularly limited. For example, the tip of the protrusion 6 is not necessarily in contact with the first side surface part 2c. However, when the insertion length of the protrusion 6 is short, there is a possibility of out-of-plane deformation occurring at at least one of the first top surface part 2a and the first bottom surface part 2b when a load is input. Therefore, it is preferable that the insertion length of the protrusion 6 be as long as possible.

In addition, while the stay 4 is provided in contact with the first flange part 2d of the beam 2 in the above embodiment, the stay 4 and the first flange part 2d do not necessarily come in contact with each other. However, when the stay 4 and the first flange part 2d are in contact with each other, a load is transmitted from the first flange part 2d to the stay 4 when a load is input. Therefore, since the load transmitted to the stay 4 is increased, it is possible to improve the load resistance performance.

In addition, while the stay 4 includes one part in the above embodiment, it may be an assembly including a plurality of parts. The structure of the stay 4 is not particularly limited as long as the stay 4 forms the protrusion 6 that can be arranged inside the beam 2.

The underrun protector 1 according to the first embodiment of the present invention has been described above.

3. Second Embodiment

Next, an underrun protector 1 according to a second embodiment of the present invention will be described.

Figure 8:
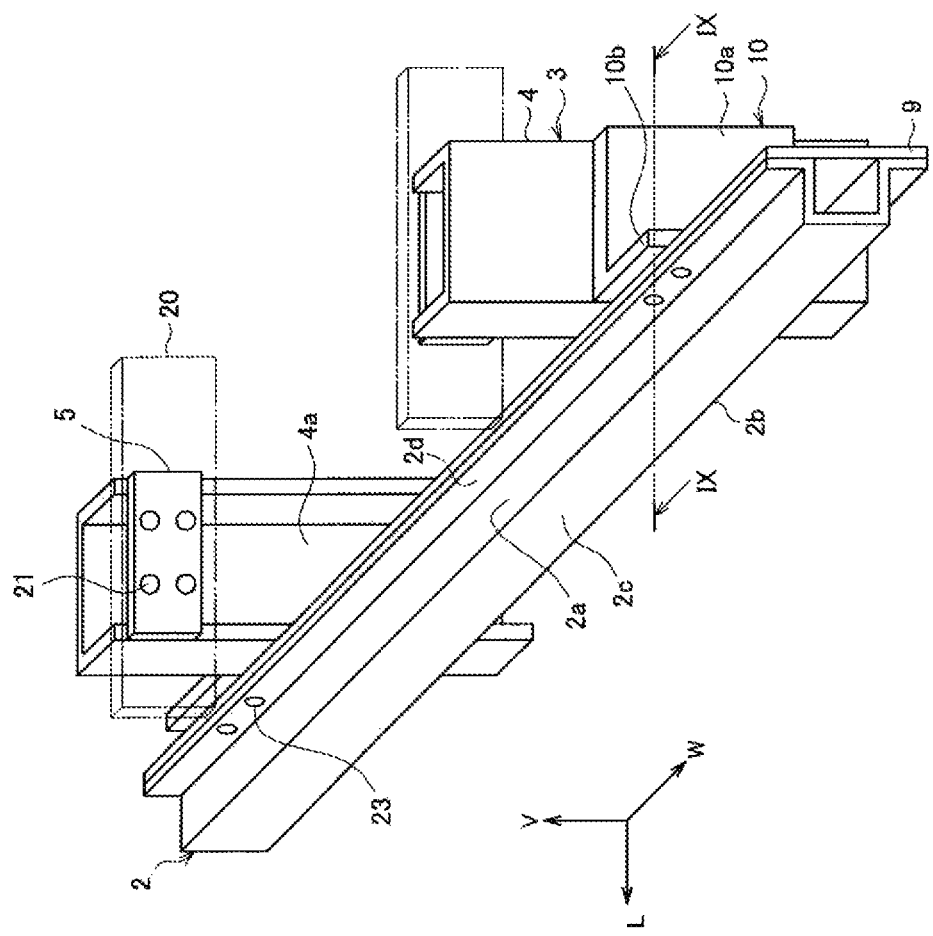
FIG. 8 is a perspective view of a schematic configuration of an underrun protector according to a second embodiment of the present invention.

FIG. 8 is a perspective view of a schematic configuration of the underrun protector 1 according to the second embodiment of the present invention. Since functions of the beam 2, the stay 4, the frame attachment plate 5, and the vehicle body frame 20 which are basic components of the underrun protector 1 are the same as those in the first embodiment of the present invention, description thereof will be omitted. Here, unlike the first embodiment of the present invention, the stay 4 according to the present embodiment has no protrusion 6 and is formed to extend in the vertical direction V.

As shown in FIG. 8, L-shaped brackets 10 are provided on surfaces that face the opening surfaces 4a of the pair of stays 4. The bracket 10 includes a flat plate stay attachment part 10a and a flat plate beam attachment part 10b perpendicular to the stay attachment part 10a. The stay attachment part 10a is fixed on a side surface of the stay 4. In addition, the beam attachment part 10b is fixed in a direction in which it comes in contact with a back surface (anti-collision surface) of the beam 2. Here, in the present embodiment, the bracket 10 is an example of a beam attachment member and is a part of the connecting structure 3.

Figure 9:
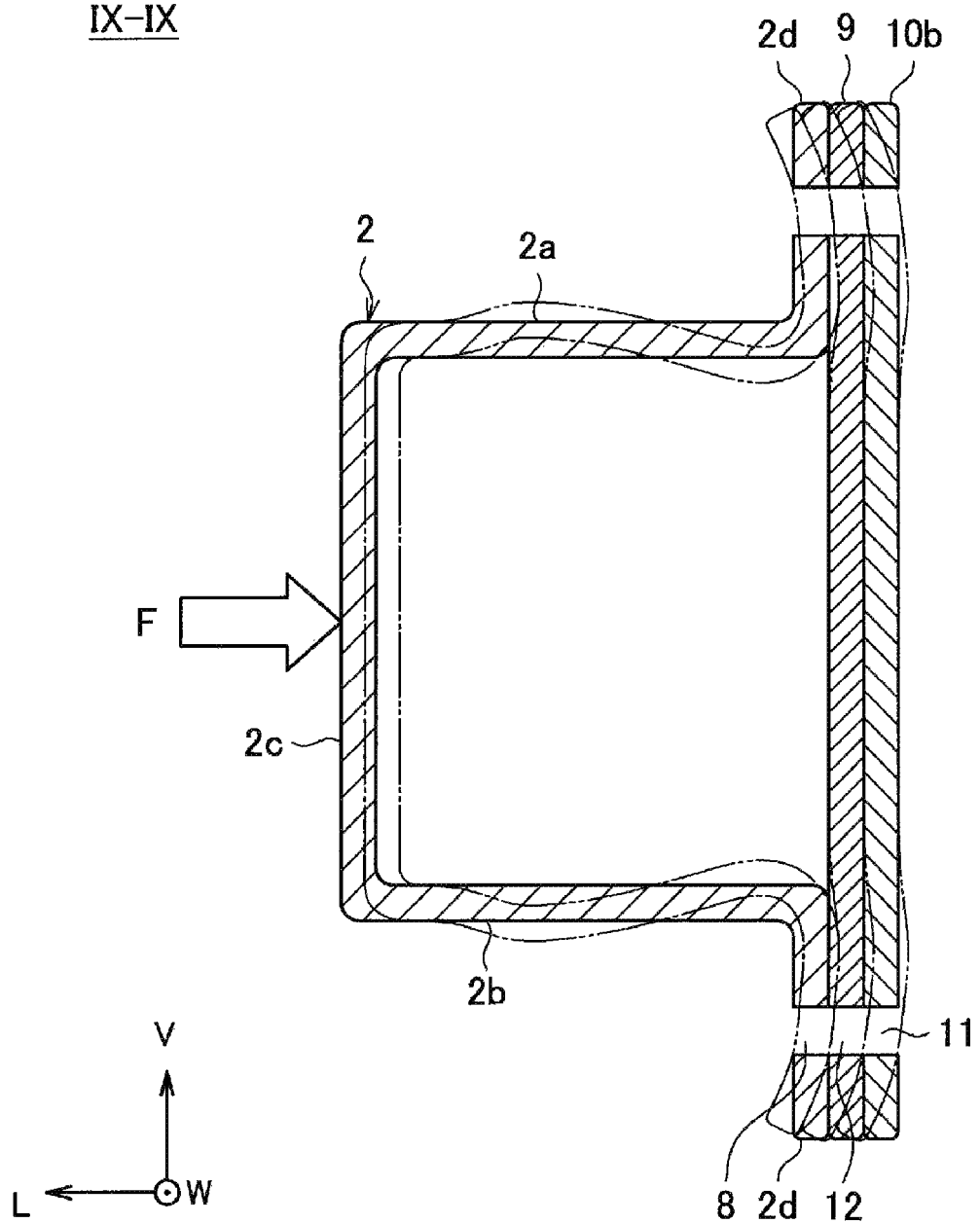
FIG. 9 is a cross-sectional view of the underrun protector according to the second embodiment taken along the line IX-IX in FIG. 8.

FIG. 9 is a cross-sectional view of the underrun protector 1 according to the present embodiment taken along the line IX-IX in FIG. 8. As shown in FIG. 9, a first reinforcing member 9 that covers the whole or a part of the back surface of the beam 2 is provided between the beam 2 and the bracket 10. A closed cross section is formed by the beam 2 and the first reinforcing member 9 in a cross-sectional view perpendicular to the vehicle width direction W. In the example shown in FIG. 9, the first reinforcing member 9 is formed in a rectangular shape to extend in the vehicle width direction W.

Figure 10:
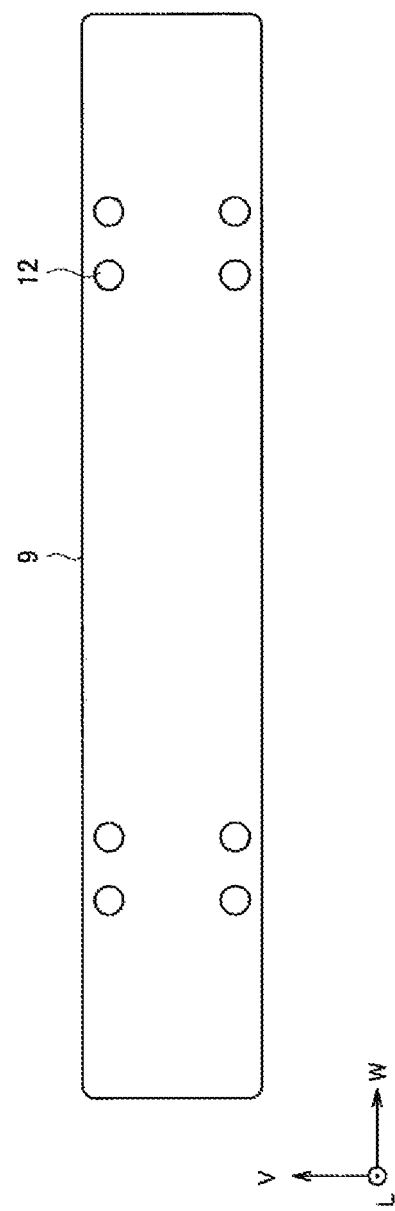
FIG. 10 is a longitudinal cross-sectional view of the shape of a first reinforcing member of the underrun protector according to the second embodiment.

In addition, as shown in FIG. 9, a bolt hole 11 is formed in the beam attachment part 10b of the bracket 10. In addition, in the first reinforcing member 9, a bolt hole 12 corresponding to a bolt diameter is formed to fix the first flange part 2d and the bracket 10. FIG. 10 is a longitudinal cross-sectional view of the shape of the first reinforcing member of the underrun protector according to the present embodiment. As shown in FIG. 10, the beam 2, the bracket 10, and the first reinforcing member 9 are fastened using a bolt (not shown) via the bolt hole 12.

The underrun protector 1 according to the present embodiment is configured as described above. In such a configuration, the beam 2 has a hat shape, and the beam 2 and the bracket 10 are fixed at the first flange part 2d that protrudes outward in the vertical direction V. Therefore, when the load F is input, a moment $M_1$ is generated around a point C in the drawing such that the tip of the first flange part 2d rotates to a collision surface side. In this case, the end of the first reinforcing member 9 and the end of the bracket 10 fixed to the first flange part 2d are deformed to rotate to the collision surface side.

The moment $M_1$ is a moment in a direction opposite to a moment $M_2$ that is applied so that the first reinforcing member 9 and the bracket 10 deflect to the inside of the beam 2. Therefore, the moments cancel each other out and deflection of the first reinforcing member 9 and the bracket 10 to the inside of the beam is prevented.

Accordingly, it is possible to prevent local deformation of the cross section of the beam 2 in contrast to in the related art in the vicinity of the position P2 lateral to the attachment position of the beam 2 with respect to the input load. As a result, the maximum load value can be increased compared to the related art at the position P2 in the load resistance performance evaluation test. Therefore, it is possible to improve the load resistance performance of the underrun protector.

While the underrun protector 1 according to the present embodiment has been described above, the present invention is not limited thereto. For example, the shapes of the bracket 10, the stay 4, and the first reinforcing member 9 are not limited to the example described in the above embodiment. The shapes of these members are appropriately changed depending on the shape of the vehicle body frame 20, or the necessary performance of the underrun protector 1. For example, while the flat plate first reinforcing member 9 is provided in contact with the first flange part 2d in the above embodiment, the first reinforcing member 9 may be provided inside the beam 2 (for example, between the top surface part 2a and the bottom surface part 2b of the beam 2). That is, the first reinforcing member 9 is provided at an opening part of the beam 2 so that a closed cross section is formed by the beam 2 and the first reinforcing member 9 in a cross-sectional view perpendicular to the vehicle width direction W. Accordingly, it is possible to improve the load resistance performance. Modified examples of the first reinforcing member 9 will be described below.

In addition, while the beam 2 and the bracket 10 are fixed using bolts 23 in the above embodiment, the positions of the bolt holes provided in these members are not limited to the example described in the above embodiment. In addition, both parts may be fixed by welding, instead of fixing using a bolt. However, when a bolt is used, since it is easy to exchange only the damaged beam 2 alone, maintainability is improved.

First Modified Example

Figure 11:
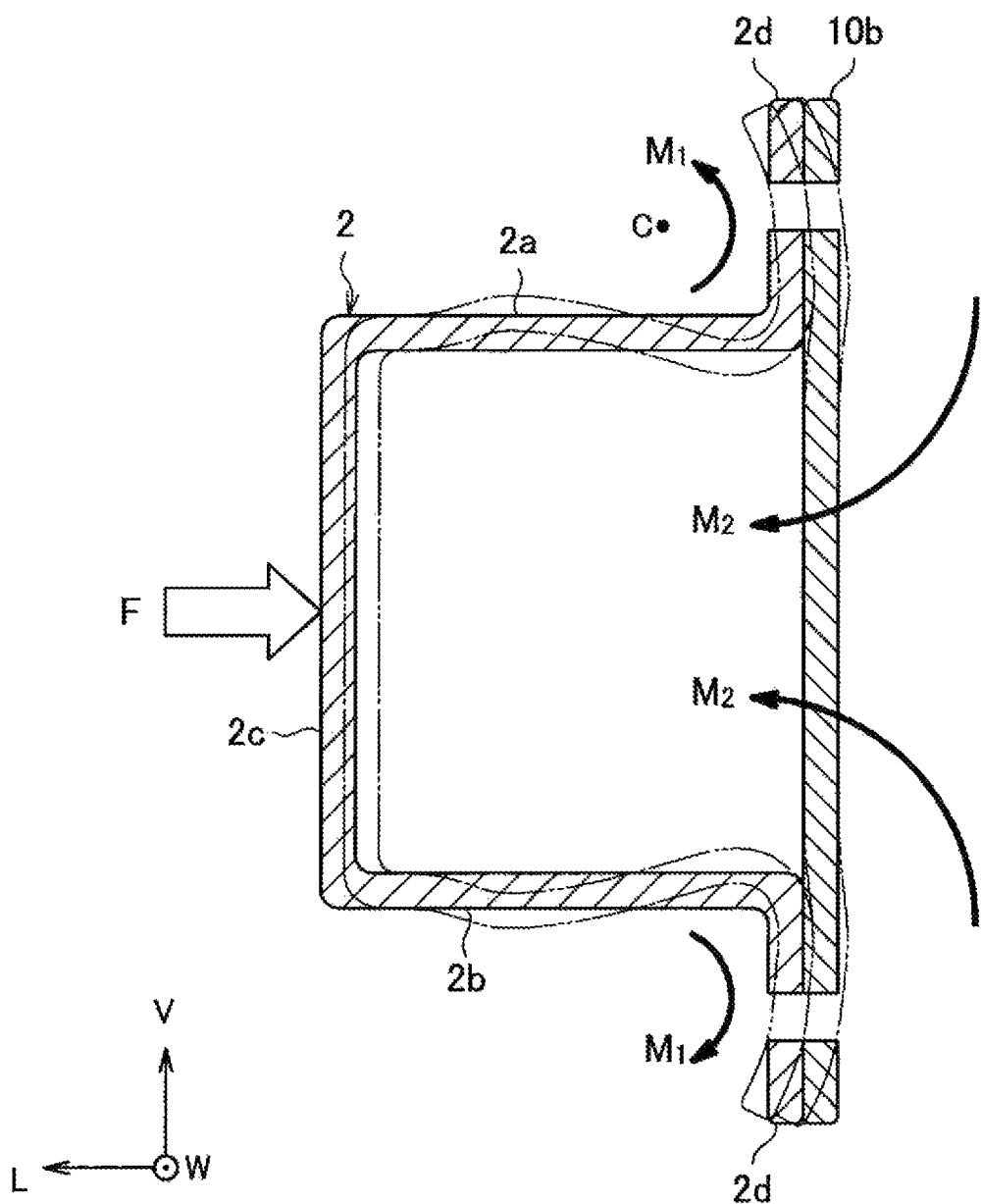
FIG. 11 is a cross-sectional view of a schematic configuration of a first modified example of the underrun protector according to the second embodiment.

In addition, while the first reinforcing member 9 is provided on the back surface side (anti-collision surface side) of the beam 2 in the above embodiment, the present invention is not limited thereto. For example, the first reinforcing member 9 may not be provided in the underrun protector 1, and the beam 2 may be directly attached to the bracket 10. FIG. 11 is a cross-sectional view of a schematic configuration of a first modified example of the underrun protector 1 according to the present embodiment. As shown in FIG. 11, even if the beam 2 is directly attached to the bracket 10, it is possible to prevent deflection of each member to the inside of the beam 2 as in the above embodiment. Therefore, it is possible to improve the load resistance performance of the underrun protector.

Second Modified Example

Figure 12:
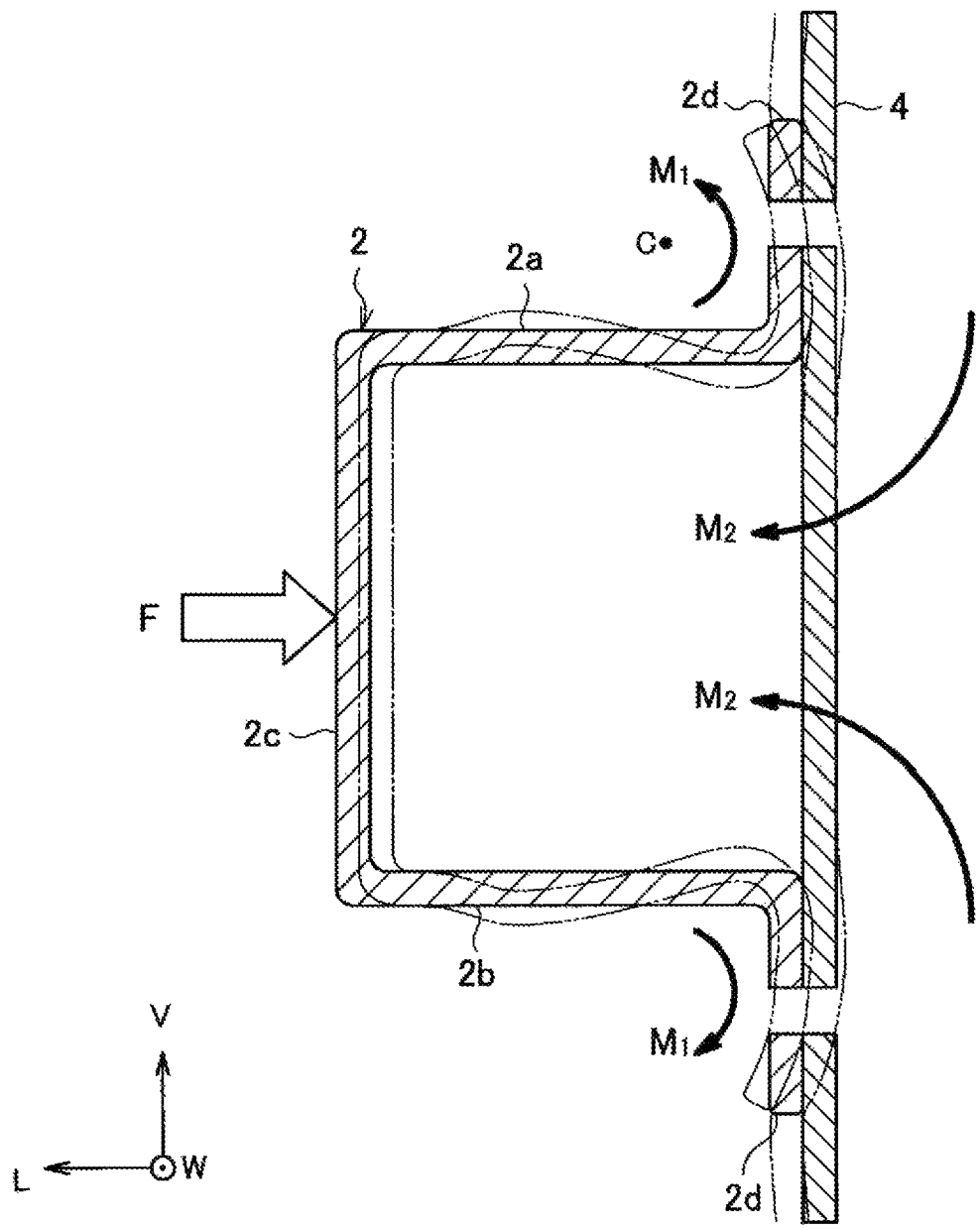
FIG. 12 is a cross-sectional view of a schematic configuration of a second modified example of the underrun protector according to the second embodiment.

In addition, while the beam 2 is attached to the bracket 10 in the first modified example of the underrun protector according to the above embodiment, the present invention is not limited thereto. For example, the bracket 10 may not be provided in the underrun protector 1, and the beam 2 may be directly attached to the stay 4. FIG. 12 is a cross-sectional view of a schematic configuration of a second modified example of the underrun protector 1 according to the present embodiment. Even if the beam 2 is directly attached to the stay 4, it is possible to prevent deflection of each member to the inside of the beam 2 as in the above embodiment. Therefore, it is possible to improve the load resistance performance of the underrun protector In addition, regardless of the configuration (the bracket 10 or the stay 4) of the connecting structure 3 shown in the first modified example and the second modified example, it is preferable that the beam 2 have a hat shape, and the beam 2 and the connecting structure 3 be fixed at the first flange part 2d. Thus, it is possible to improve the load resistance performance of the underrun protector. However, when the first reinforcing member 9 is additionally provided, it is possible to further improve the load resistance performance. Therefore, the first reinforcing member 9 is preferably provided in the underrun protector 1.

Third Modified Example

In addition, in order to improve the load resistance performance more effectively using the first reinforcing member 9, it is necessary to further refine the shape or arrangement of the first reinforcing member 9. For example, in the underrun protector 1 shown in FIG. 9, it is possible to prevent deformation to the inside of the beam in contrast to in the related art. However, the first top surface part 2a and the first bottom surface part 2b may be easily deformed to the inside of the cross section near the first flange part 2d. Therefore, the inventors conducted more extensive studies of the shape or arrangement of the first reinforcing member 9 and developed the underrun protector 1 to be described below.

Figure 13:
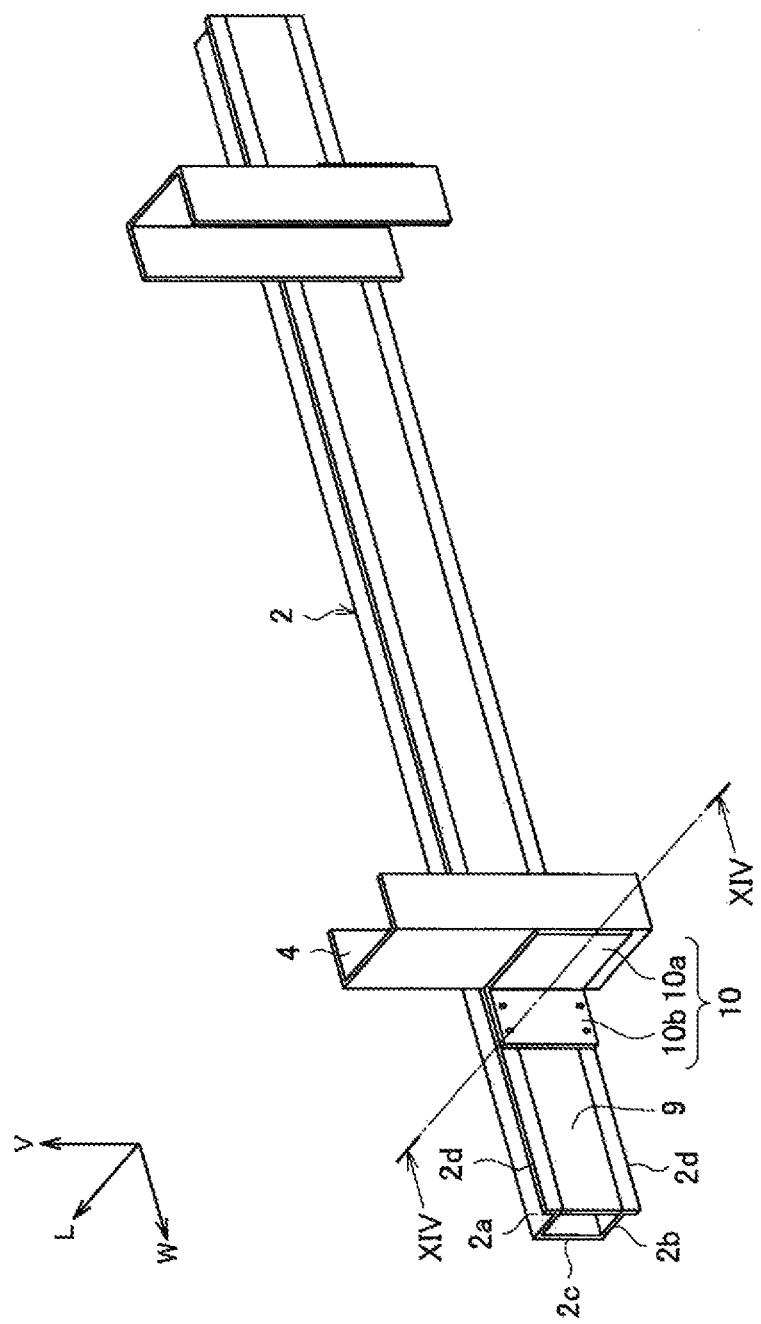
FIG. 13 is a perspective view of a schematic configuration of a third modified example of the underrun protector according to the second embodiment.
Figure 14:
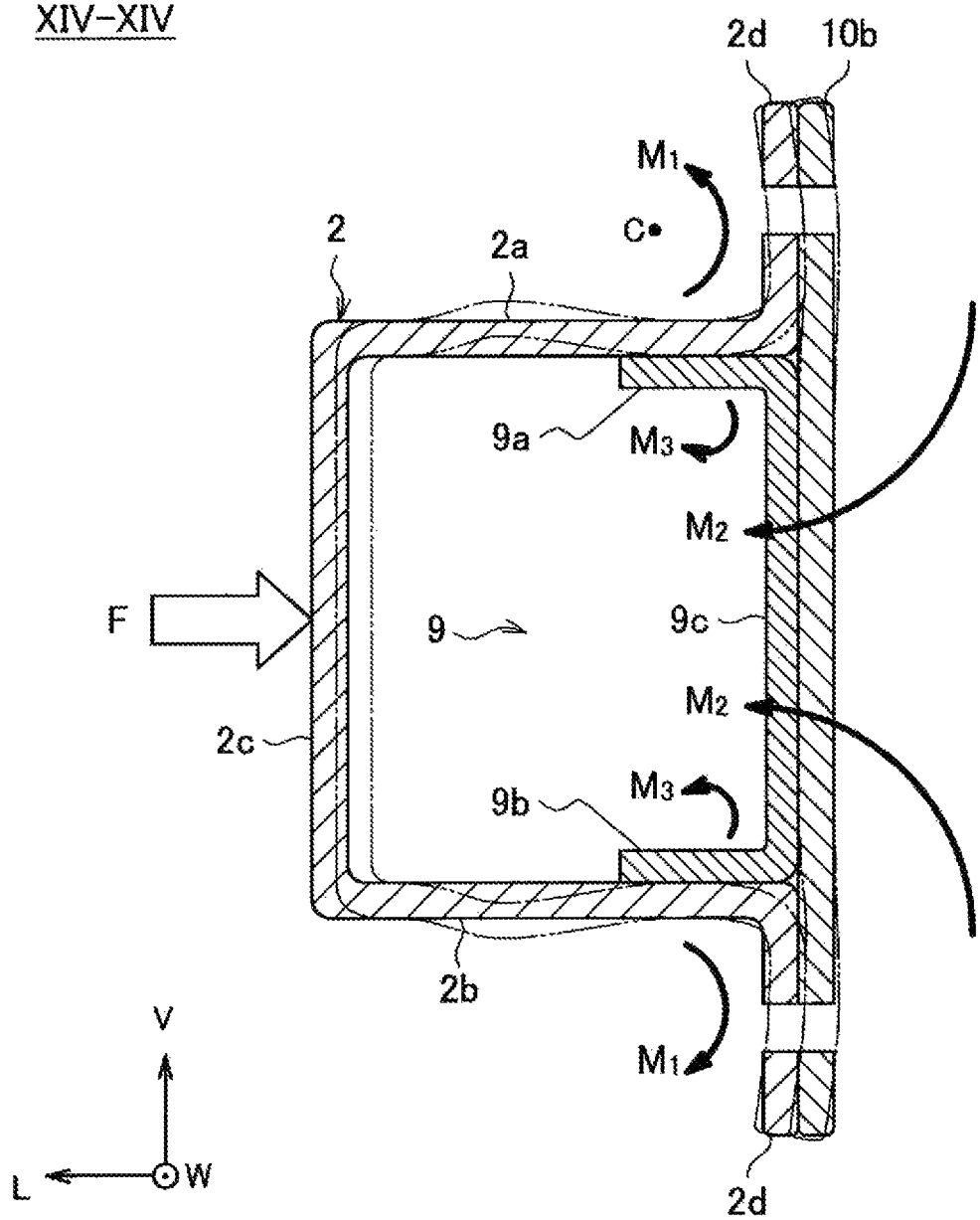
FIG. 14 is a cross-sectional view of the underrun protector according to the second embodiment taken along the line XIV-XIV in FIG. 13.

FIG. 13 and FIG. 14 are a perspective view of a schematic configuration of a third modified example of the underrun protector 1 according to the present embodiment and a cross-sectional view taken along the line XIV-XIV. As shown in FIG. 14, the first reinforcing member 9 according to the present modified example has a U-shaped cross section including a first reinforcing member top surface part 9a and a first reinforcing member bottom surface part 9b which face each other, and a first reinforcing member side surface part 9c connecting one ends of the first reinforcing member top surface part 9a and the first reinforcing member bottom surface part 9b in a cross-sectional view perpendicular to the vehicle width direction W.

In the first reinforcing member 9, the first reinforcing member top surface part 9a and the first reinforcing member bottom surface part 9b, and the first top surface part 2a and the first bottom surface part 2b are bonded respectively by, for example, welding. In addition, a closed cross section is formed by the beam 2 and the first reinforcing member 9. In addition, in the example shown in FIG. 13 and FIG. 14, the first reinforcing member side surface part 9c is arranged in contact with the beam attachment part 10b of the bracket 10. When the first reinforcing member 9 is arranged in this manner, it is possible to cause the action of inhibiting the deformation of the first top surface part 2a and the first bottom surface part 2b to the inside of the cross section near the first flange part 2d. Here, a method of fixing the first reinforcing member top surface part 9a and the first reinforcing member bottom surface part 9b, and the first top surface part 2a and the first bottom surface part 2b is not limited to welding.

In addition, as shown in FIG. 14, the first reinforcing member 9 is preferably arranged so that the first reinforcing member side surface part 9c is positioned on the first flange part 2d side. For example, in the first reinforcing member top surface part 9a and the first reinforcing member bottom surface part 9b, ends on the side in which the first reinforcing member side surface part 9c is not provided are preferably provided to be positioned on the vehicle exterior side in a vehicle longitudinal direction L with respect to the first reinforcing member side surface part 9c. Accordingly, a moment $M_3$ for deforming the first reinforcing member side surface part 9c to the inside of the cross section is generated and the action of the first reinforcing member top surface part 9a and the first reinforcing member bottom surface part 9b deforming to the outside of the cross section occurs. Therefore, it is possible to further prevent deformation to the inside of the cross section of the first top surface part 2a and the first bottom surface part 2b. As a result, it is possible to further improve the load resistance performance.

Here, the shape of the cross section of the first reinforcing member 9 is not limited to the U-shape shown in FIG. 13 and FIG. 14. That is, as long as the first reinforcing member 9 includes the first reinforcing member top surface part 9a and the first reinforcing member bottom surface part 9b which face each other and the first reinforcing member side surface part 9c connecting one ends of the first reinforcing member top surface part 9a and the first reinforcing member bottom surface part 9b, and the first reinforcing member top surface part 9a and the first top surface part 2a, and the first reinforcing member bottom surface part 9b and the first bottom surface part 2b are fixed, it is possible to improve the load resistance performance. For example, if a structure in which a recess (not shown) is provided in the first reinforcing member side surface part 9c is used, the same effect can be obtained.

Fourth Modified Example

Figure 15:
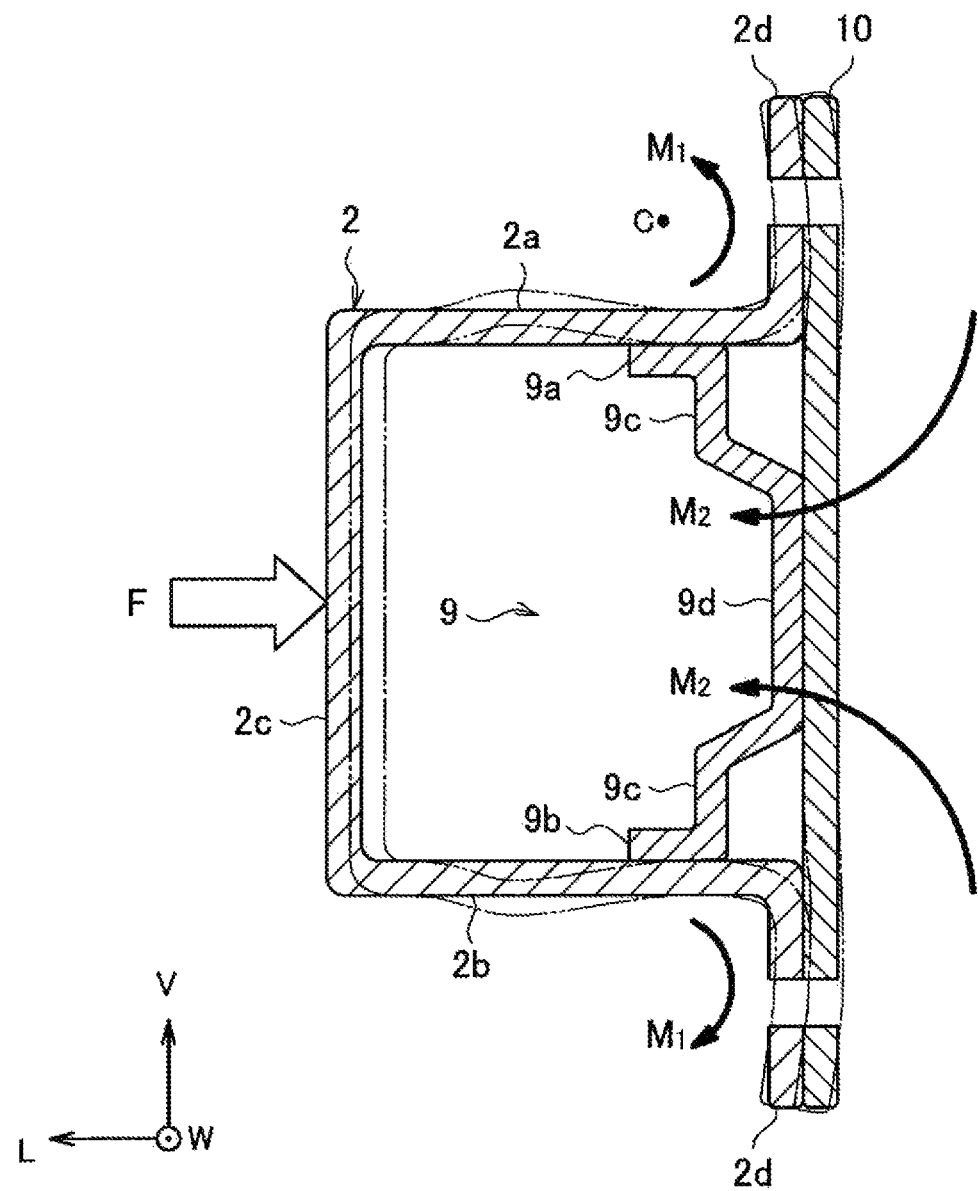
FIG. 15 is a cross-sectional view of a schematic configuration of a fourth modified example of the underrun protector according to the second embodiment.

In addition, the first reinforcing member side surface part 9c is preferably in contact with the beam attachment part 10b of the bracket 10. Accordingly, it is possible to further prevent out-of-plane deformation of the first reinforcing member 9 and the beam attachment part 10b. Therefore, it is possible to further improve the load resistance performance. Here, when a part of the first reinforcing member side surface part 9c is in contact with the beam attachment part 10b, the effect of preventing the out-of-plane deformation described above may occur. FIG. 15 is a cross-sectional view of a schematic configuration of a fourth modified example of the underrun protector 1 according to the present embodiment. As shown in FIG. 15, in the first reinforcing member 9, a first reinforcing member convex part 9d may be further provided at the central part of the first reinforcing member side surface part 9c. When the first reinforcing member convex part 9d comes in contact with the beam attachment part 10b, it is possible to obtain the effect of preventing out-of-plane deformation of the first reinforcing member 9 and the beam attachment part 10b. In addition, in order to inhibit deformation of the first top surface part 2a and the first bottom surface part 2b to the inside of the cross section near the first flange part 2d, the first reinforcing member top surface part 9a and the first reinforcing member bottom surface part 9b are preferably arranged near the first flange part 2d.

Fifth Modified Example

In addition, when a load is input to the beam 2 according to the present embodiment shown in FIG. 9, the beam attachment part 10b may be deformed in a wave shape. Accordingly, out-of-plane deformation is induced, which may serve as a factor inhibiting load resistance performance improvement. Therefore, the inventors conducted more extensive studies of the shape of the beam attachment part 10b and developed the underrun protector 1 to be described below.

Figure 16:
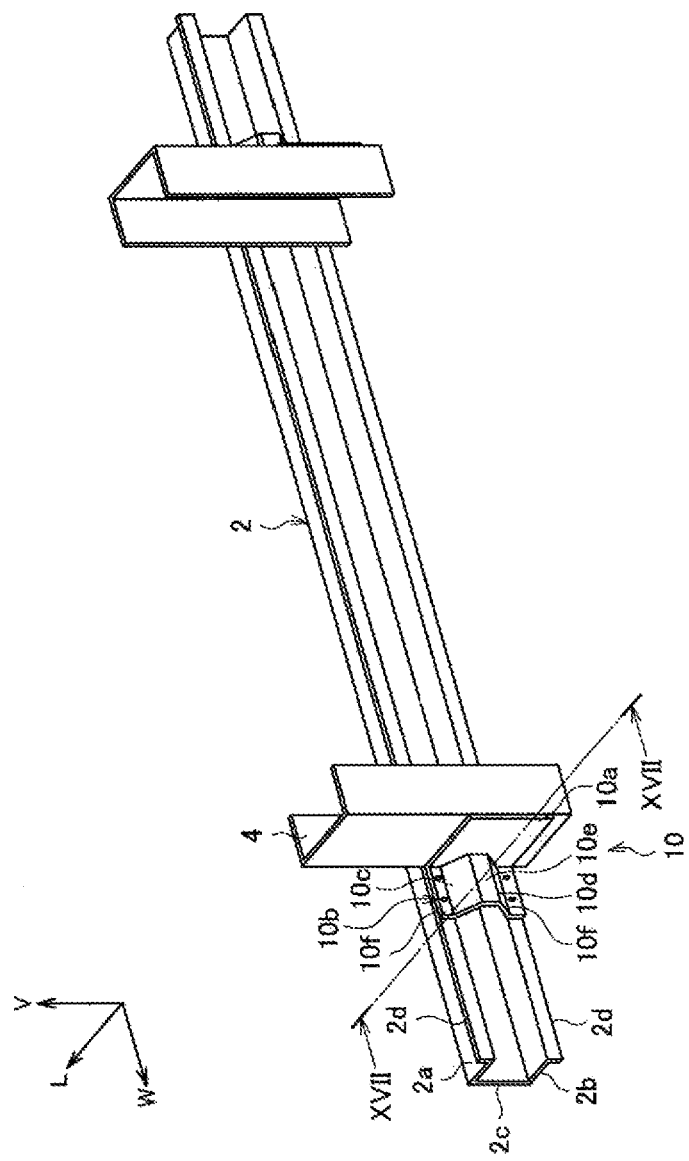
FIG. 16 is a perspective view of a schematic configuration of a fifth modified example of the underrun protector according to the second embodiment.
Figure 17:
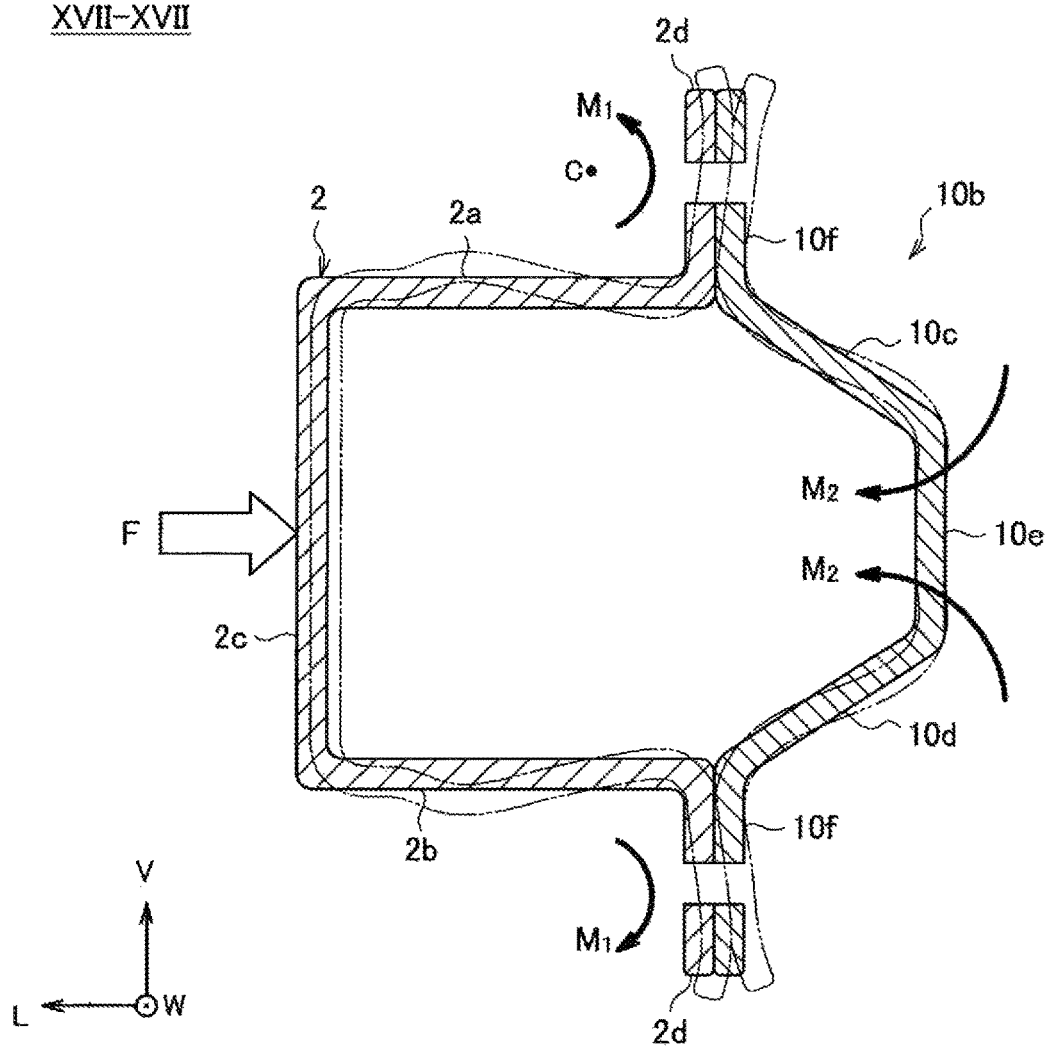
FIG. 17 is a cross-sectional view of the underrun protector according to the second embodiment taken along the line XVII-XVII in FIG. 16.

FIG. 16 and FIG. 17 are a perspective view of a schematic configuration of a fifth modified example of the underrun protector 1 according to the present embodiment and a cross-sectional view taken along the line XVII-XVII. As shown in FIG. 17, in the bracket 10 according to the present modified example, the shape of the beam attachment part 10b has substantially a hat shape in cross section in a cross-sectional view perpendicular to the vehicle width direction W. In the example shown in FIG. 16 and FIG. 17, the beam attachment part 10b includes a second top surface part 10c and a second bottom surface part 10d, and a second side surface part 10e connecting one ends of the second top surface part 10c and the second bottom surface part 10d, and a pair of second flange parts 10f that are formed to protrude outward in the vertical direction V at the other ends (one ends on the side in which the second side surface part 10e is not provided) of the second top surface part 10c and the second bottom surface part 10d. A second flange part 10f and the first flange part 2d are fastened using, for example, bolts (not shown). Therefore, the beam 2 and the bracket 10 are fixed. Here, the method of fixing the beam 2 and the bracket 10 is not limited to the fastening using a bolt. In addition, while the second top surface part 10c and the second bottom surface part 10d are formed to be inclined with respect to the horizontal plane in the example shown in FIG. 16 and FIG. 17, the angle of inclination of the second top surface part 10c and the second bottom surface part 10d with respect to the horizontal plane is appropriately changed according to the necessary load resistance performance and the surrounding margin.

In the bracket 10, since the beam attachment part 10b has substantially a hat-shaped cross section, the rigidity in cross section and strength increase compared to the flat plate beam attachment part. Therefore, it is possible to inhibit wavy out-of-plane deformation in the bracket 10. In addition, as shown in FIG. 17, when the moment $M_2$ generated in the beam attachment part 10b and the moment $M_1$ generated in the first flange part 2d are opposite to each other, the effect of inhibiting mutual deformation can be obtained. Accordingly, it is possible to improve the load resistance performance.

In addition, when the beam attachment part 10b has substantially a hat-shaped cross section, a second side surface part 10e is desirably positioned on the vehicle interior side (the vehicle interior side in the vehicle longitudinal direction L with respect to the first flange part 2d) relative to an open cross section of the beam 2 as shown in FIG. 17. When the beam attachment part 10b has such a shape, it is possible to increase a cross-sectional area of the closed cross section formed by the beam 2 and the bracket 10 in a cross-sectional view perpendicular to the vehicle width direction W. Accordingly, since the bending rigidity and strength of the beam 2 increase, it is possible to improve the load resistance performance.

In addition, when the beam attachment part 10b has substantially a hat-shaped cross section, the stay attachment part 10a and the beam attachment part 10b may be different members. However, in this case, the costs for assembling the stay attachment part 10a and the beam attachment part 10b increase. Therefore, the stay attachment part 10a and the beam attachment part 10b are preferably formed as the integral bracket 10.

Sixth Modified Example

Figure 18:
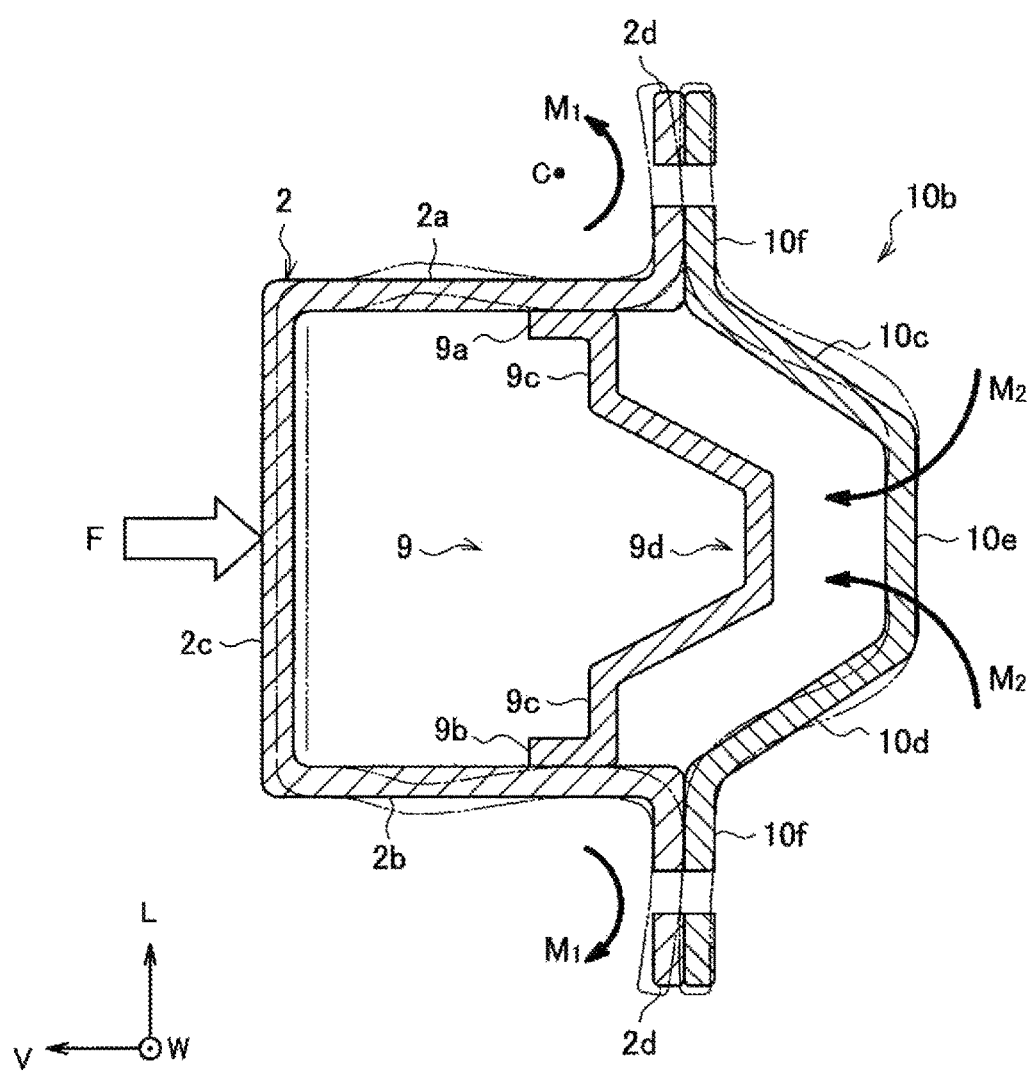
FIG. 18 is a cross-sectional view of a schematic configuration of a sixth modified example of the underrun protector according to the second embodiment.

In addition, when the beam attachment part 10b has substantially a hat-shaped cross section, the first reinforcing member 9 may be further provided inside the beam 2. FIG. 18 is a cross-sectional view of a schematic configuration of a sixth modified example of the underrun protector 1 according to the present embodiment. As shown in FIG. 18, in the first reinforcing member side surface part 9c, the first reinforcing member convex part 9d that protrudes toward the second side surface part 10e (the vehicle interior side in the vehicle longitudinal direction L with respect to the first flange part 2d) of the beam attachment part 10b is preferably provided. That is, the first reinforcing member 9 includes the first reinforcing member top surface part 9a and the first reinforcing member bottom surface part 9b which face each other and the first reinforcing member side surface part 9c connecting one ends of the first reinforcing member top surface part 9a and the first reinforcing member bottom surface part 9b in a cross-sectional view perpendicular to the vehicle width direction W. A part of the first reinforcing member side surface part 9c preferably protrudes to the second side surface part 10e. In this form, it is possible to increase a cross section of the closed cross section formed by the beam 2 and the first reinforcing member 9 in a cross-sectional view perpendicular to the vehicle width direction W. Therefore, since the bending rigidity and strength of the beam 2 can increase, it is possible to improve the load resistance performance. In addition, as described above, a part of the first reinforcing member side surface part 9c is more preferably in contact with the second side surface part 10e. Thus, it is possible to prevent out-of-plane deformation of the first reinforcing member 9 and the beam attachment part 10b. In addition, in order to inhibit deformation of the first top surface part 2a and the first bottom surface part 2b to the inside of the cross section near the first flange part 2d, the first reinforcing member top surface part 9a and the first reinforcing member bottom surface part 9b are preferably arranged near the first flange part 2d.

Seventh Modified Example

Figure 19:
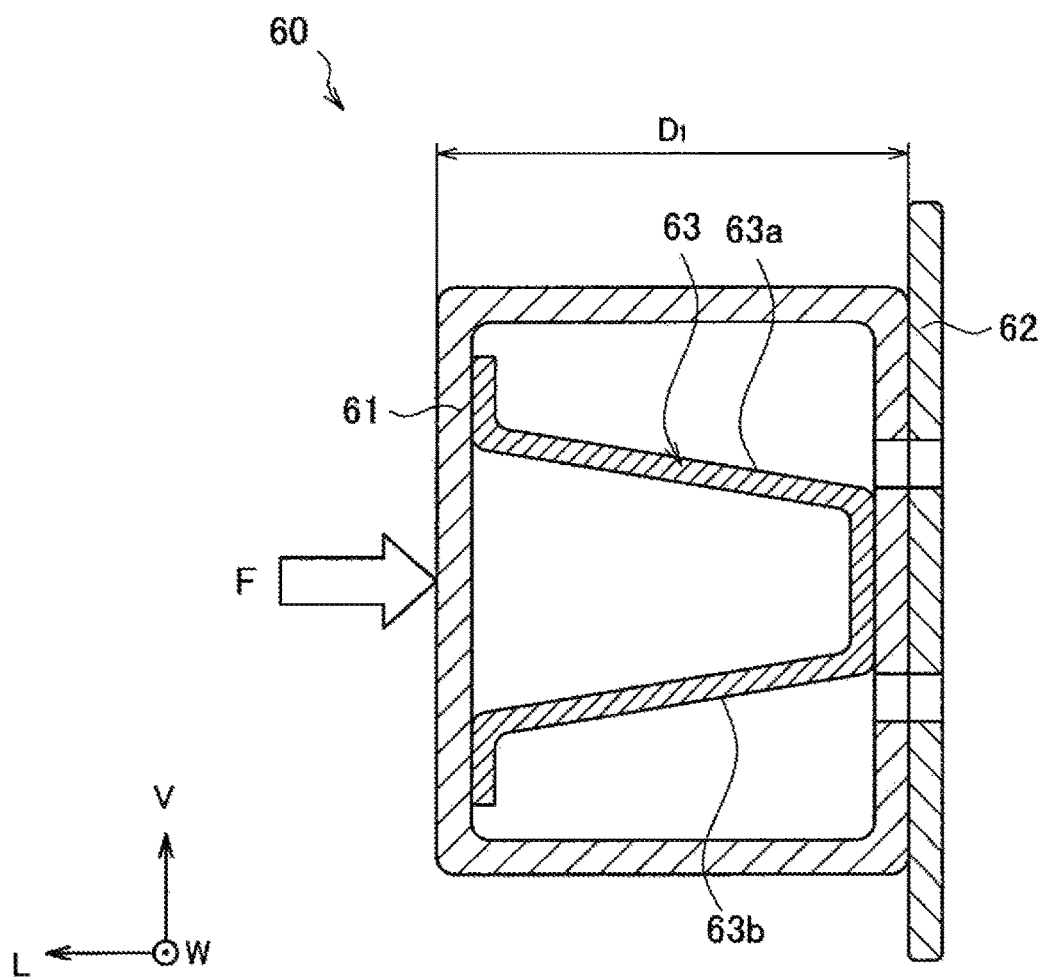
FIG. 19 is a cross-sectional view of an exemplary schematic configuration of an underrun protector of the related art including a reinforcing member.

In an underrun protector 60 of the related art, a hat-shaped reinforcing member 63 shown in FIG. 19 may be provided. The hat-shaped reinforcing member 63 includes a top surface part 63a and a bottom surface part 63b which face each other, and is arranged to bridge a collision surface and an anti-collision surface of a beam 61 having a rectangular cross section. Accordingly, reinforcement for preventing deformation of the collision surface and the anti-collision surface is performed.

When the beam attachment part 10b has substantially a hat-shaped cross section, the reinforcing member shown in FIG. 19 may be provided inside a closed cross section formed by the beam 2 and the beam attachment part 10b.

Figure 20:
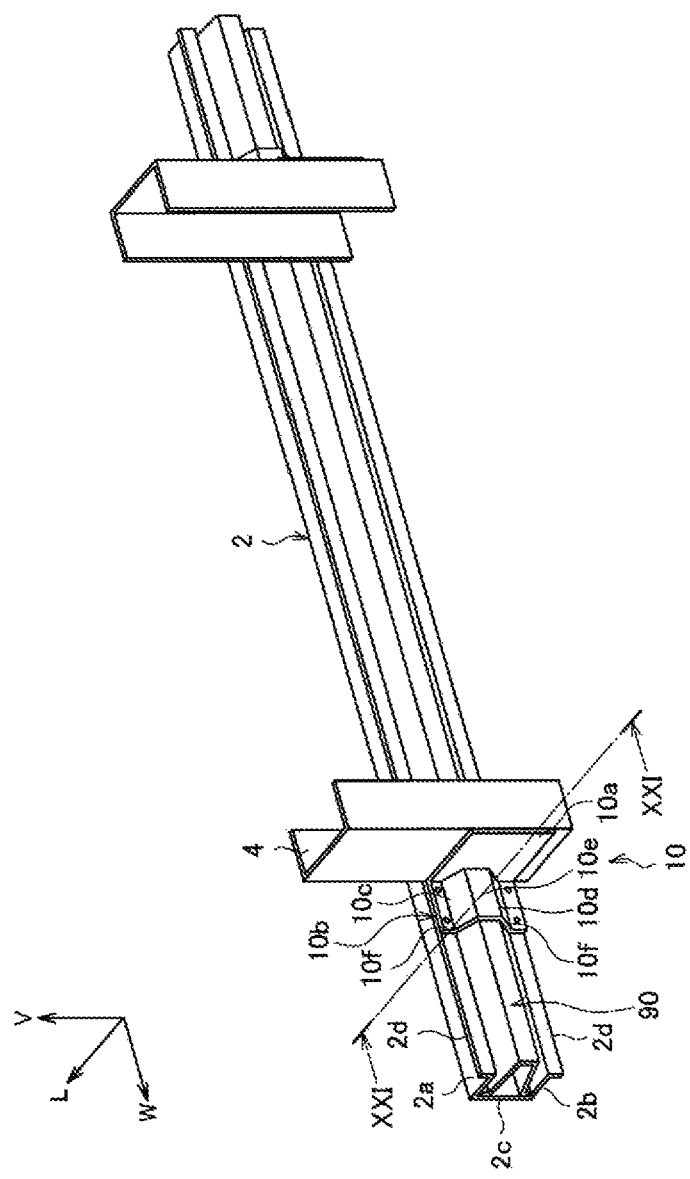
FIG. 20 is a perspective view of a schematic configuration of a seventh modified example of the underrun protector according to the second embodiment.
Figure 21:
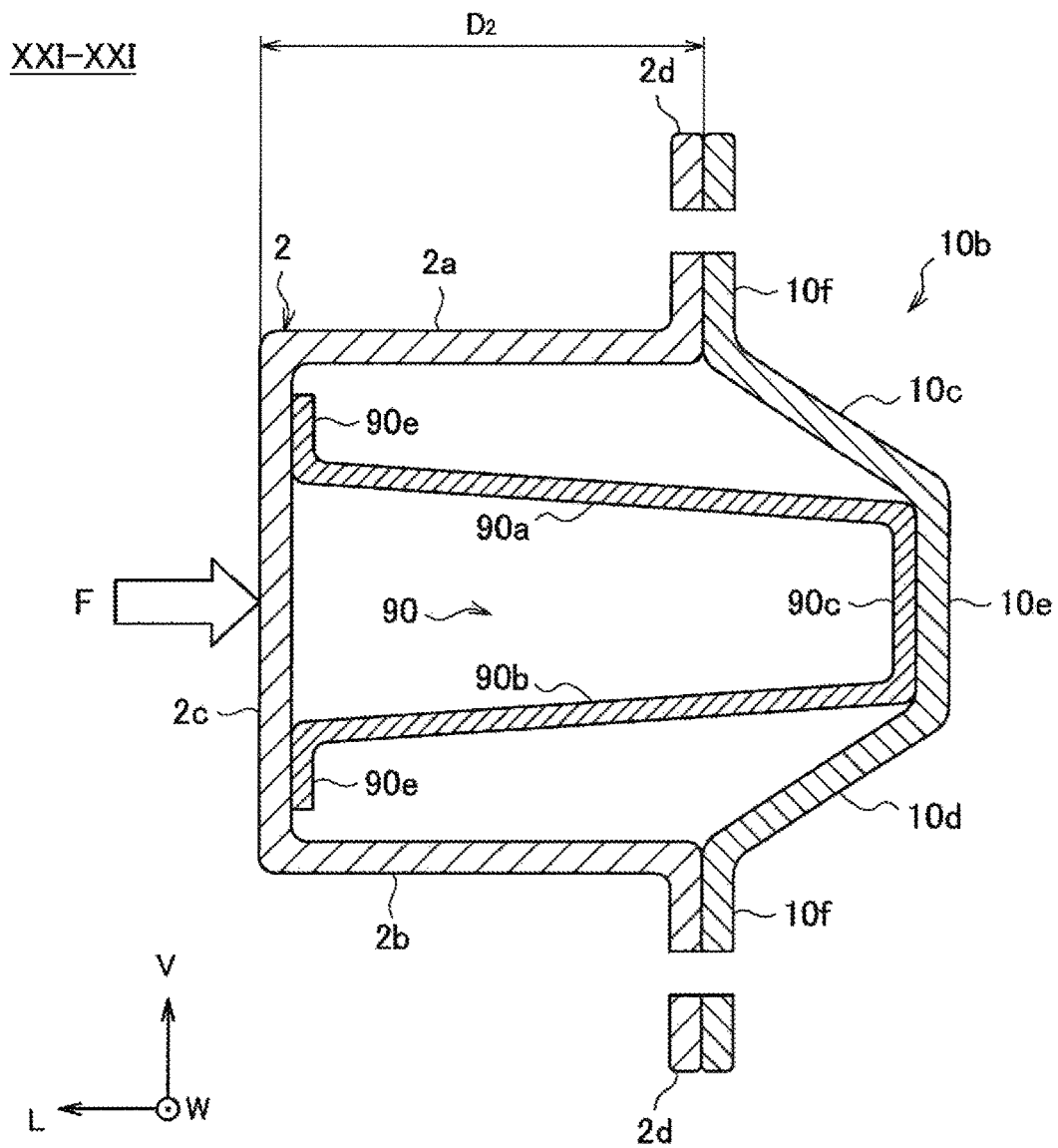
FIG. 21 is a cross-sectional view of the underrun protector according to the second embodiment taken along the line XXI-XXI in FIG. 20.

FIG. 20 and FIG. 21 are a perspective view of a schematic configuration of a seventh modified example of the underrun protector 1 according to the present embodiment and a cross-sectional view taken along the line XXI-XXI. As shown in FIG. 21, a second reinforcing member 90 includes a second reinforcing member top surface part 90a and a second reinforcing member bottom surface part 90b which face each other, a second reinforcing member side surface part 90c connecting one ends of the second reinforcing member top surface part 90a and the second reinforcing member bottom surface part 90b, and a pair of second reinforcing member flange parts 90e that protrude outward in the vertical direction V formed at the other ends (one ends on the side in which the second reinforcing member side surface part 90c is not provided) of the second reinforcing member top surface part 90a and the second reinforcing member bottom surface part 90b in a cross-sectional view perpendicular to the vehicle width direction W. The second reinforcing member side surface part 90c of the second reinforcing member 90 is positioned on the vehicle interior side (the vehicle interior side in the vehicle longitudinal direction L with respect to the first flange part 2d) relative to the open cross section of the beam 2. In addition, the second reinforcing member flange part 90e and the first side surface part 2c are fixed by, for example, welding. Here, a method of fixing the second reinforcing member flange part 90e and the first side surface part 2c is not limited to welding. In addition, while the second reinforcing member top surface part 90a and the second reinforcing member bottom surface part 90b are formed to be inclined with respect to the horizontal plane in the example shown in FIG. 21, the angle of inclination of the second reinforcing member top surface part 90a and the second reinforcing member bottom surface part 90b with respect to the horizontal plane is appropriately changed according to the necessary load resistance performance, beam shape, and the like.

When the second reinforcing member 90 is provided, reinforcement for supporting the collision surface (the first side surface part 2c) is possible. Furthermore, since a cross-sectional area can increase in a cross-sectional view perpendicular to the vehicle width direction W, the bending rigidity and strength of the beam 2 can increase. Therefore, it is possible to reduce the weight and improve the load resistance performance of the underrun protector 1. Here, in the example shown in FIG. 21, the second reinforcing member side surface part 90c of the second reinforcing member 90 is arranged in contact with the second side surface part 10e of the beam attachment part 10b, but both may not be completely in contact with each other. That is, a gap may be provided between the second reinforcing member side surface part 90c and the second side surface part 10e in a range in which reinforcement for supporting the collision surface is possible. However, as described above, in order to prevent out-of-plane deformation of the second reinforcing member 90 and the beam attachment part 10b, the second reinforcing member side surface part 90c is preferably in contact with the second side surface part 10e.

In addition, when the first reinforcing member convex part 9d shown in FIG. 18 is provided or when the second reinforcing member 90 having a hat-shaped cross section shown in FIG. 21 is provided, it is necessary to avoid interference between the stay 4 and the second reinforcing member 90. In order to avoid interference, in the stay 4, a recess (not shown) for avoiding interference with the second reinforcing member 90 may be provided or a notch (not shown) may be provided. In addition, a recess formed of a member different from the stay 4 may be provided in the stay 4. However, when the notch is provided, the strength of the stay 4 may decrease. In addition, when a recess of the stay 4 is formed of a separate member, since it is necessary to assemble the stay 4 and the recess, costs increase. Therefore, when a recess is provided in the stay 4, it is preferable that the stay 4 and the recess be integrally formed.

In addition, a protruding distance $D_2$ of the first side surface part 2c in the vehicle longitudinal direction L from the beam attachment surface 10b in the form (referred to as the present form) shown in FIG. 21 and a protruding distance $D_1$ of the beam 61 having a rectangular cross section in the vehicle longitudinal direction L from a beam attachment surface 62 in the form (referred to as a form of the related art) shown in FIG. 19 are the same. In this case, the present form has a larger cross-sectional area of the closed cross section surrounded by the beam 2 and the beam attachment surface 10b than the form of the related art in a cross-sectional view perpendicular to the vehicle width direction W. That is, when the position of the first side surface part 2c in the vehicle longitudinal direction L is restricted, it is possible to increase a closed cross-sectional area surrounded by the beam 2 and the beam attachment surface 10b without inhibiting the restriction.

Eighth Modified Example

Figure 22:
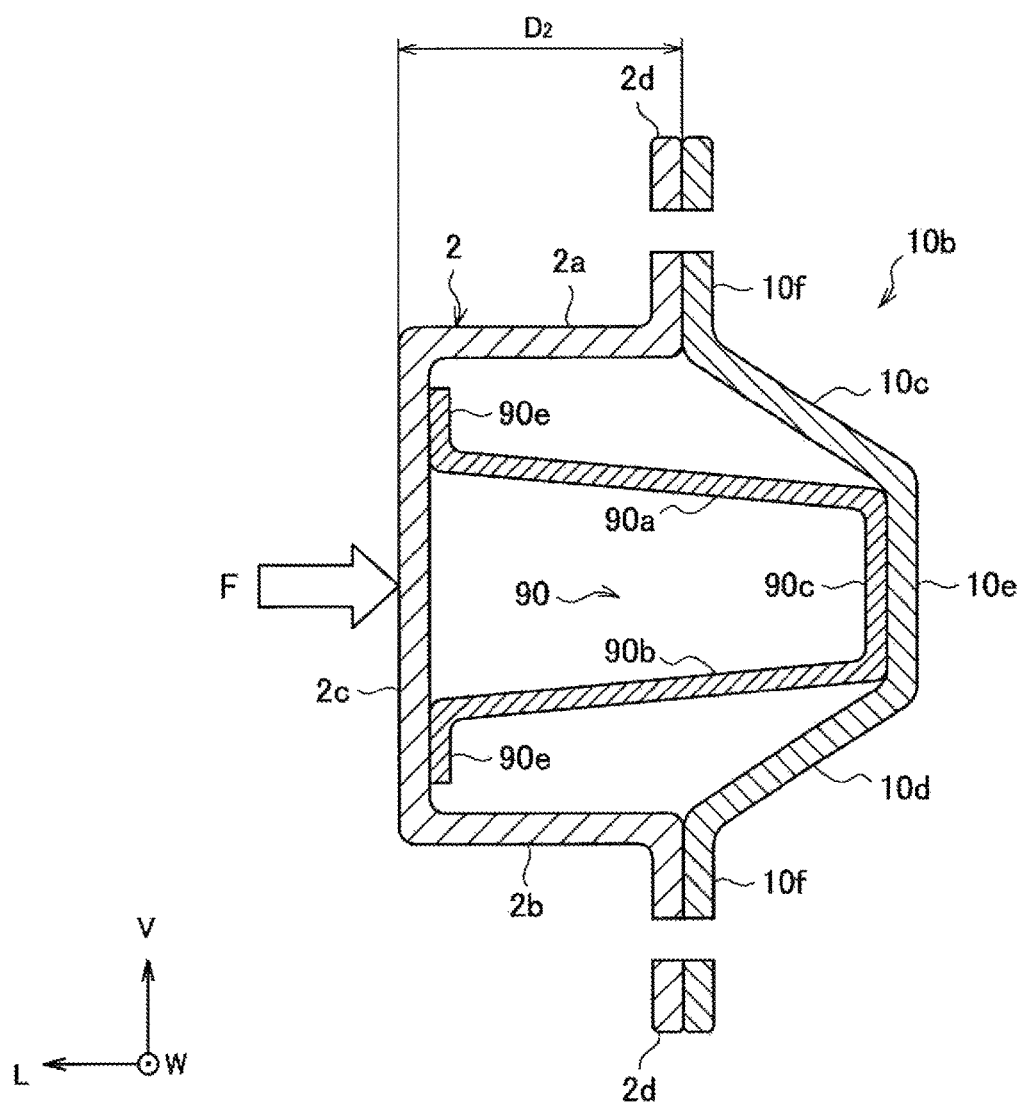
FIG. 22 is a cross-sectional view of a schematic configuration of an eighth modified example of the underrun protector according to the second embodiment.

FIG. 22 is a cross-sectional view of a schematic configuration of an eighth modified example of the underrun protector 1 according to the present embodiment. Referring to FIG. 22, when the cross-sectional area of the closed cross section formed by the beam 2 and the beam attachment surface 10b is the same as the cross-sectional area of the closed cross section formed by the beam 61 having a rectangular cross section of the form of the related art shown in FIG. 19, the protruding distance $D_2$ of the present form is shorter than the protruding distance $D_1$ of the form of the related art. That is, the size of the underrun protector is more compact than in the related art while ensuring the load resistance performance. Therefore, it is possible to reduce the weight and improve the degree of freedom of vehicle design.

The underrun protector 1 according to the second embodiment of the present invention has been described above.

In the first embodiment and the second embodiment, the beam 2 has a hat shape, and the beam 2 is fixed to the connecting structure 3 so that the first side surface part 2c is positioned on the vehicle exterior side in the vehicle longitudinal direction L. That is, the first side surface part 2c is a collision surface.

In this case, for example, as shown in the first embodiment, the beam 2 may be fixed to the connecting structure 3 by bonding of at least one of the first top surface part 2a and the first bottom surface part 2b to the protrusion 6 that protrudes inside the beam 2. In addition, for example, as shown in the second embodiment, the beam 2 may be fixed to the connecting structure 3 by bonding of the first flange part 2d and the connecting structure 3. In addition, the beam 2 and the connecting structure 3 may be fixed by bonding as in the first embodiment and the second embodiment.

For example, in order to improve the load resistance of the attachment position P1 on the beam 2, the connecting structure 3 may be arranged inside the beam 2 as in the first embodiment. Thus, it is possible to prevent the cross section from collapsing at the above attachment position. In addition, in order to improve the load resistance of the position P2 lateral to the attachment position of the beam 2 in the vehicle width direction W, the connecting structure 3 may be arranged in contact with the first flange part 2d of the beam 2 as in the second embodiment. Thus, it is possible to prevent deflection of the beam 2. In this manner, either or both of the first embodiment and the second embodiment can be selected according to the collision form in which improvement of the load resistance is desired. That is, it is possible to desirably improve the load resistance performance of the underrun protector 1.

Here, the present invention is not limited to the example described in the above embodiment. For example, while the first top surface part 2a and the first bottom surface part 2b are in a horizontal state in the above embodiment, at least one of the first top surface part 2a and the first bottom surface part 2b may not be in a horizontal state. For example, according to the necessary load resistance performance, the first top surface part 2a and the first bottom surface part 2b may be provided in inclined states so that angles formed between the first side surface part 2c, and the first top surface part 2a and the first bottom surface part 2b are obtuse angles. Also in this case, it is possible to improve the load resistance performance compared to the underrun protector including a beam having a rectangular cross section.

4. Third Embodiment

Next, an underrun protector 1 according to a third embodiment of the present invention will be described.

Figure 23:
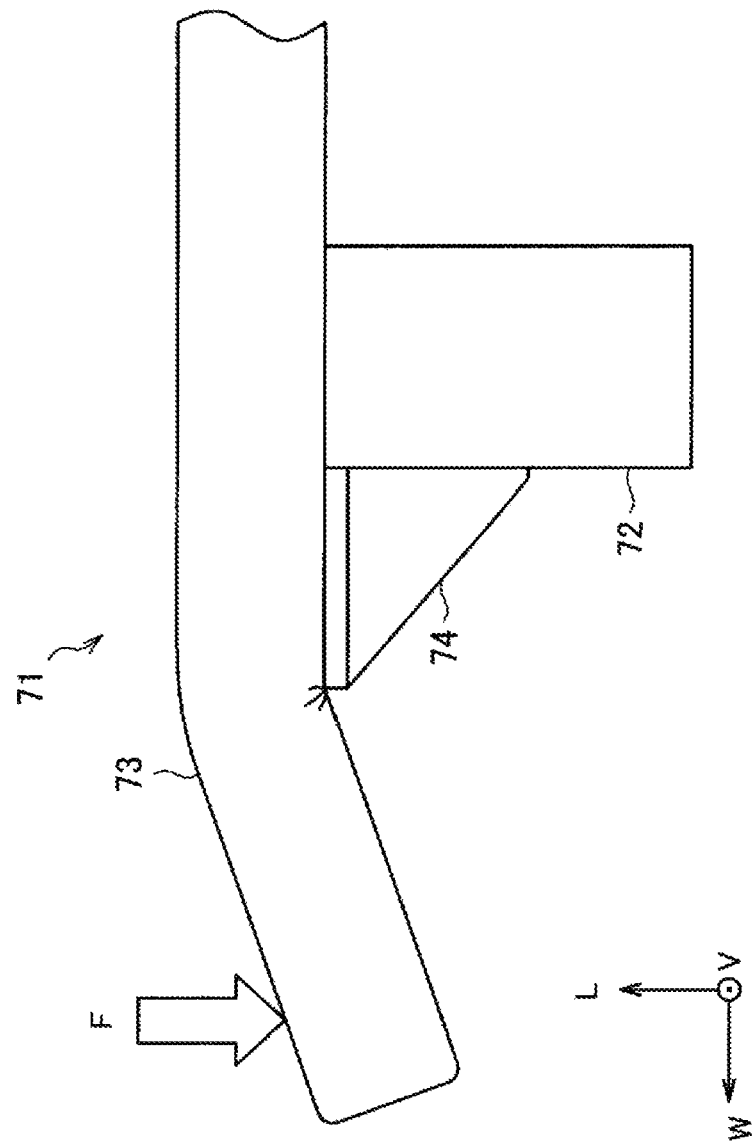
FIG. 23 is a diagram showing an example of a state of deformation of the underrun protector when a load is input to the underrun protector of the related art.

FIG. 23 is a diagram showing an example of a state of deformation of an underrun protector 71 of the related art when a load is input to the underrun protector 71. As shown in FIG. 23, the underrun protector 71 of the related art includes, for example, a connecting structure 72 (for example, a stay and a bracket) attached to a vehicle frame, a beam 73 that extends in the vehicle width direction W and is attached to a beam attachment surface of the connecting structure 72, and a reinforcing member 74 that is provided to bridge the connecting structure 72 and the beam 73. The load resistance performance is improved by providing the reinforcing member 74.

However, as shown in FIG. 23, when the beam attachment surface of the connecting structure 72 is formed in a flat plate, if the load F is input to the outside in the vehicle width direction W relative to the attachment position of the beam 73, the stress concentrates on the edge of the tip of the beam attachment surface. Therefore, the beam 73 is bent at the edge. In this case, since the cross section of the beam 73 may collapse, it is difficult for sufficient load resistance performance to be exhibited. The inventors conducted extensive studies and developed the underrun protector 1 according to the present embodiment to be described below as a result.

Figure 24:
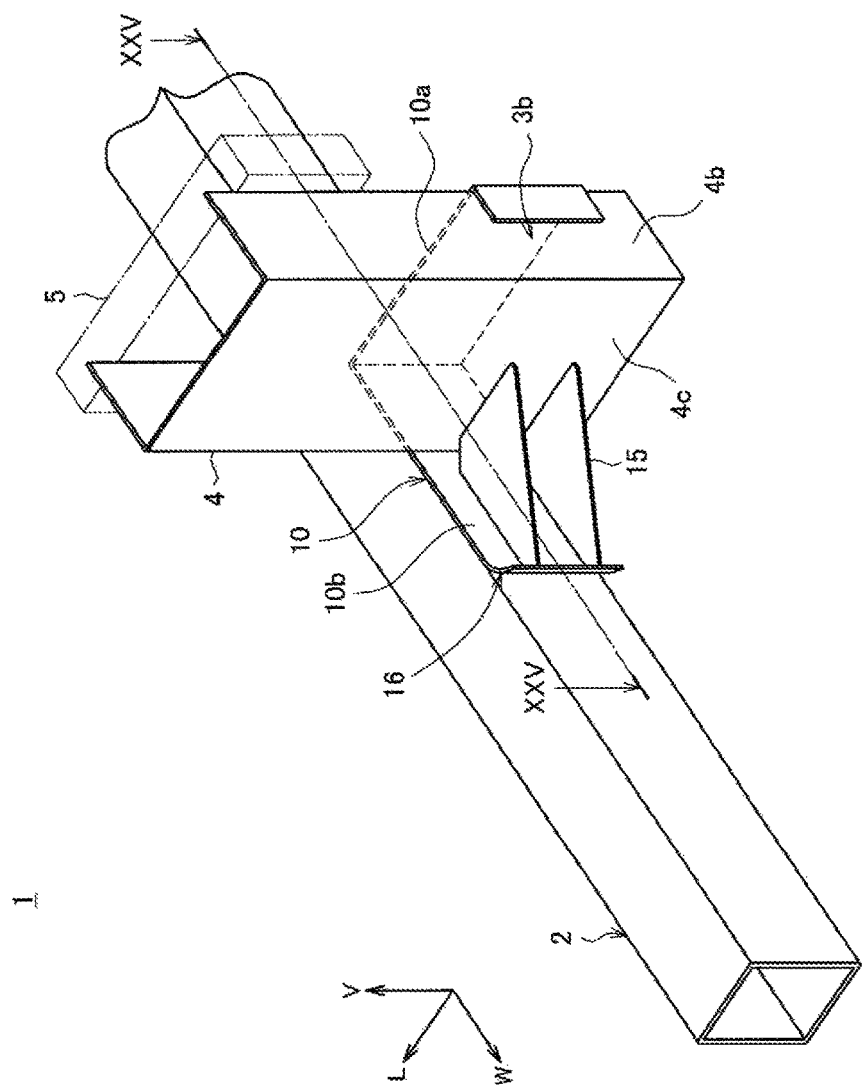
FIG. 24 is a perspective view of a schematic configuration of an underrun protector according to a third embodiment of the present invention.

FIG. 24 is a perspective view of a schematic configuration of the underrun protector 1 according to the third embodiment of the present invention. As shown in FIG. 24, the underrun protector 1 according to the present embodiment includes the beam 2 having a hat-shaped cross section that extends in the vehicle width direction W and the connecting structure 3 for attaching the beam 2 to the vehicle body frame 20. The beam 2 is fixed to the vehicle body frame 20 with the connecting structure 3 therebetween. In the present embodiment, the connecting structure 3 includes the stay 4 that is formed to extend in the vertical direction V, the L-shaped bracket 10 provided between the beam 2 and the stay 4, and a third reinforcing member 15. Here, while the beam 2 has a closed cross-sectional shape alone in a cross-sectional view perpendicular to the vehicle width direction W in the example shown in FIG. 24, the beam 2 may have a hat-shaped cross section.

Figure 25:
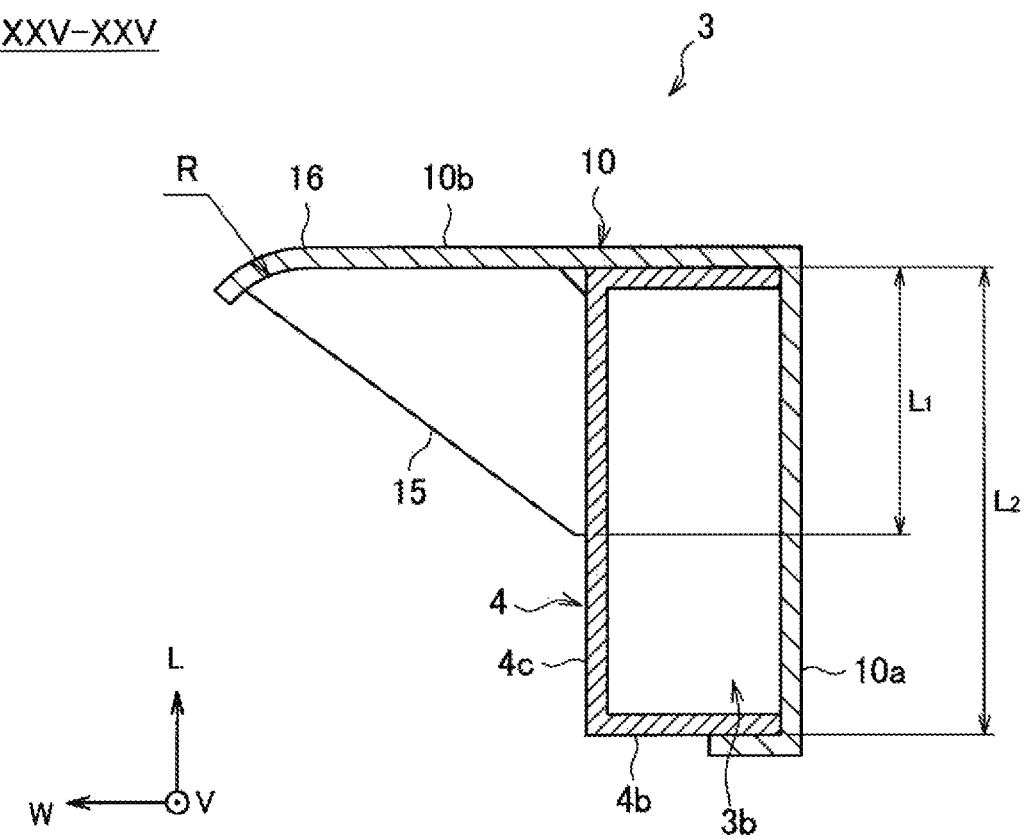
FIG. 25 is a cross-sectional view of the underrun protector according to the third embodiment taken along the line XXV-XXV in FIG. 24.

FIG. 25 is a cross-sectional view of the underrun protector 1 according to the present embodiment taken along the line XXV-XXV in FIG. 24. As shown in FIG. 24 and FIG. 25, the stay 4 is formed in a U-shape in a plan view. An opening part of the stay 4 is provided to face the inside in the vehicle width direction W. A part of the opening part of the stay 4 is covered with the surface 10a (corresponding to the stay attachment surface 10a) on the vehicle body frame side of the bracket 10. The tip of the surface 10a on the vehicle body frame side of the bracket 10 is fixed outside a side wall 4c of the stay 4 by, for example, welding. In addition, the surface to which the beam 2 is attached (hereinafter referred to as a "beam attachment surface 10b") which is a surface perpendicular to the surface 10a on the vehicle body frame side of the bracket 10 is fixed to a rear surface 4b of the stay 4 by, for example, welding. Therefore, the bracket 10 is fixed to the stay 4, and a part whose horizontal cross-sectional shape is a closed cross section (hereinafter referred to as a "closed cross section part 3b") is formed by the surface 10a on the vehicle body frame side of the bracket 10 and the stay 4. The bracket 10 may be fixed to the side wall 4c of the stay 4. In this case, the closed cross section part 3b is not formed by the bracket 10 and the stay 4. However, when the closed cross section part 3b is formed, it is possible to prevent deformation of the stay 4 due to a torsional moment generated in the stay 4 in the event of collision. Therefore, as shown in FIG. 25, the bracket 10 and the stay 4 are preferably provided so that the closed cross section part 3b is formed.

In addition, referring to FIG. 24, the frame attachment plate 5 to which the vehicle body frame (not shown) is attached is provided in an upper part of the stay 4. The frame attachment plate 5 is fixed to the stay 4 by, for example, welding. In addition, the frame attachment plate 5 is fastened to the vehicle body frame using a bolt. Therefore, the connecting structure 3 is fixed to the vehicle body frame.

Referring to FIG. 25, a bent portion 16 that bends rearward in the vehicle longitudinal direction L is provided at the tip of the beam attachment surface 10b of the bracket 10 on the outside in the vehicle width direction W. The radius of curvature in the plane of the bent portion 16 is preferably 50 to 200 mm. When the radius of curvature is less than 50 mm, since the beam 2 is deformed at a small curvature, it is difficult to reduce the stress concentrated on the beam 2, and it is difficult to obtain the effect of preventing the beam 2 from being deflected. On the other hand, when the radius of curvature exceeds 200 mm, since the curvature is large, it is difficult to obtain the effect of the bent portion 16, and the stress concentrates on the beam 2 at the edge of the tip of the beam attachment surface 10b like in the case in which the bent portion 16 is not provided. Here, the beam attachment surface 10b and the beam 2 are fastened using, for example, a bolt. Therefore, the beam 2 is fixed to the connecting structure 3.

The third reinforcing member 15 is provided to bridge the beam attachment surface 10b of the bracket 10 and the rear surface 4b of the stay 4. In the present embodiment, the third reinforcing member 15 is a triangular plate member and is welded to the rear surface 4b (hereinafter referred to as a "reinforcing member attachment surface") of the stay 4 and the inner surface of the bracket 10. Two third reinforcing members 15 are arranged along the vertical direction V. In addition, the third reinforcing member 15 is formed to follow the bent portion 16 in the vicinity of the tip of the beam attachment surface 10b on the outside in the vehicle width direction W. That is, the shape of the tip of the third reinforcing member 15 on the outside in, the vehicle width direction W has a radius of curvature comparable to a radius of curvature R of the bent portion 16.

Figure 26:
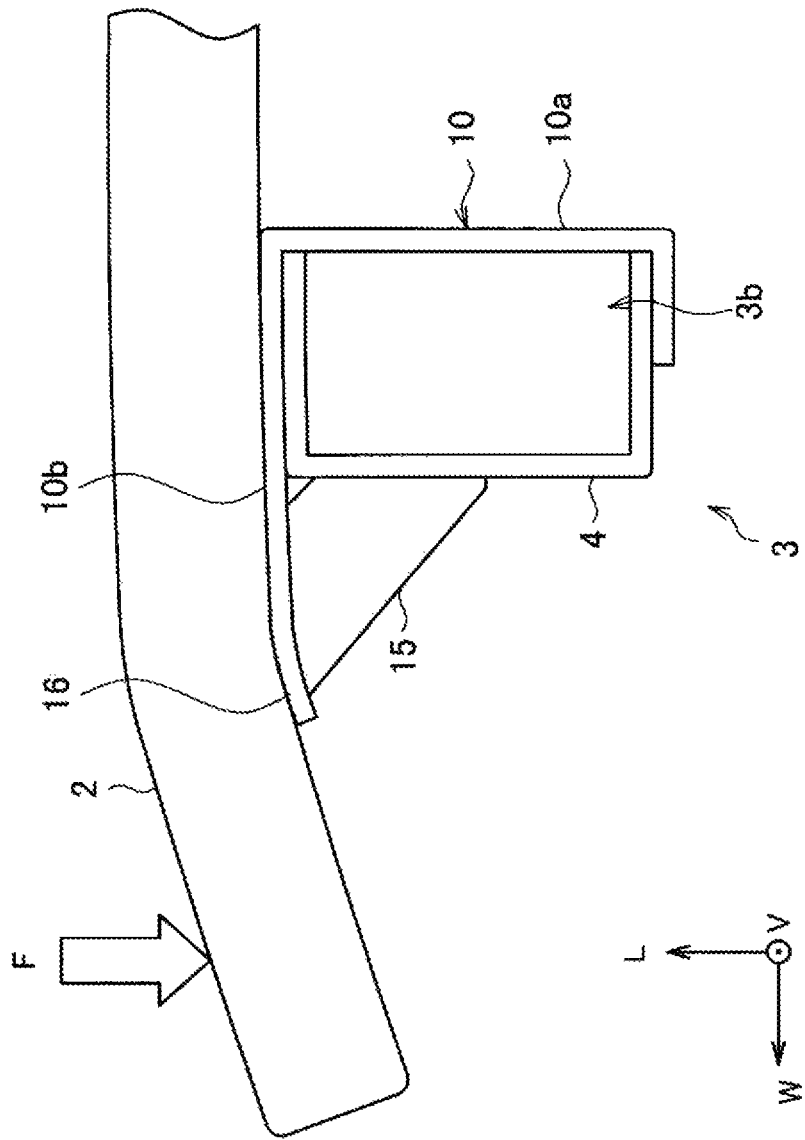
FIG. 26 is a diagram showing an example of a state of deformation of the underrun protector when a load is input to the underrun protector according to the third embodiment.

The underrun protector 1 according to the present embodiment is configured as described above. In such a configuration, as shown in FIG. 26, when a load is input to the beam 2, the beam 2 is bent and deformed along a curved part of the bent portion 16. Therefore, it is possible to avoid stress locally concentrating on the beam 2 at the tip of the beam attachment surface 10b. Therefore, it is possible to prevent the cross section of the beam 2 from collapsing due to the bent beam 2 shown in FIG. 23. As a result, it is possible for the inherent load resistance performance of the underrun protector 1 to be sufficiently exhibited. Therefore, it is possible to improve the load resistance performance compared to the underrun protector of the related art.

While the underrun protector 1 according to the present embodiment has been described above, the present invention is not limited thereto. For example, the shapes of the members of the connecting structure 3 connecting the beam 2 and the vehicle body frame (not shown) are not limited to the examples described in the above embodiment. More specifically, the stay 4 formed in a U-shape in a plan view may be arranged so that an opening part thereof faces the outside in the vehicle width direction W. In this case, a flat plate covering the opening part of the stay 4 or the like may be additionally provided, and the third reinforcing member 15 may be provided to bridge the beam attachment surface 10b and the flat plate. Alternatively, the surface 10a on the vehicle body frame side of the bracket 10 may be welded in accordance with the opening part of the stay 4 facing the outside in the vehicle width direction W, and the third reinforcing member 15 may be provided to bridge the surface 10a on the vehicle body frame side of the bracket 10 and the beam attachment surface 10b.

In addition, instead of the stay 4, a plate member that extends in the vertical direction V may be used. In this case, the surface 10a on the frame attachment side of the bracket 10 may be formed in a U-shape in a plan view, the surface 10a on the frame attachment side may be welded to the plate member, and the third reinforcing member 15 may be provided to bridge the plate member and the beam attachment surface 10b.

That is, the connecting structure 3 connecting the beam 2 and the vehicle body frame (not shown) includes a structure main body part (for example, the stay 4) that is provided to extend in the vertical direction V, a frame attachment part to which the vehicle body frame is attached (for example, the frame attachment plate 5), and a beam attachment member to which a beam is attached (for example, the bracket 10). The beam attachment member includes a beam attachment surface on which the beam is attached and a main body connecting surface that includes a surface perpendicular to the above beam attachment surface in a plan view and is attached to the structure main body part. When a bent portion that is bent rearward in the vehicle longitudinal direction L at the end of the beam attachment surface on the outside in the vehicle width direction W and at least one third reinforcing member that bridges the structure main body part and the beam attachment surface in a plan view are additionally provided, it is possible to obtain the effect of improving the load resistance performance described in the above embodiment. In addition, the flat part of the beam attachment part and the frame attachment part may be integrally formed.

First Modified Example

Figure 27:
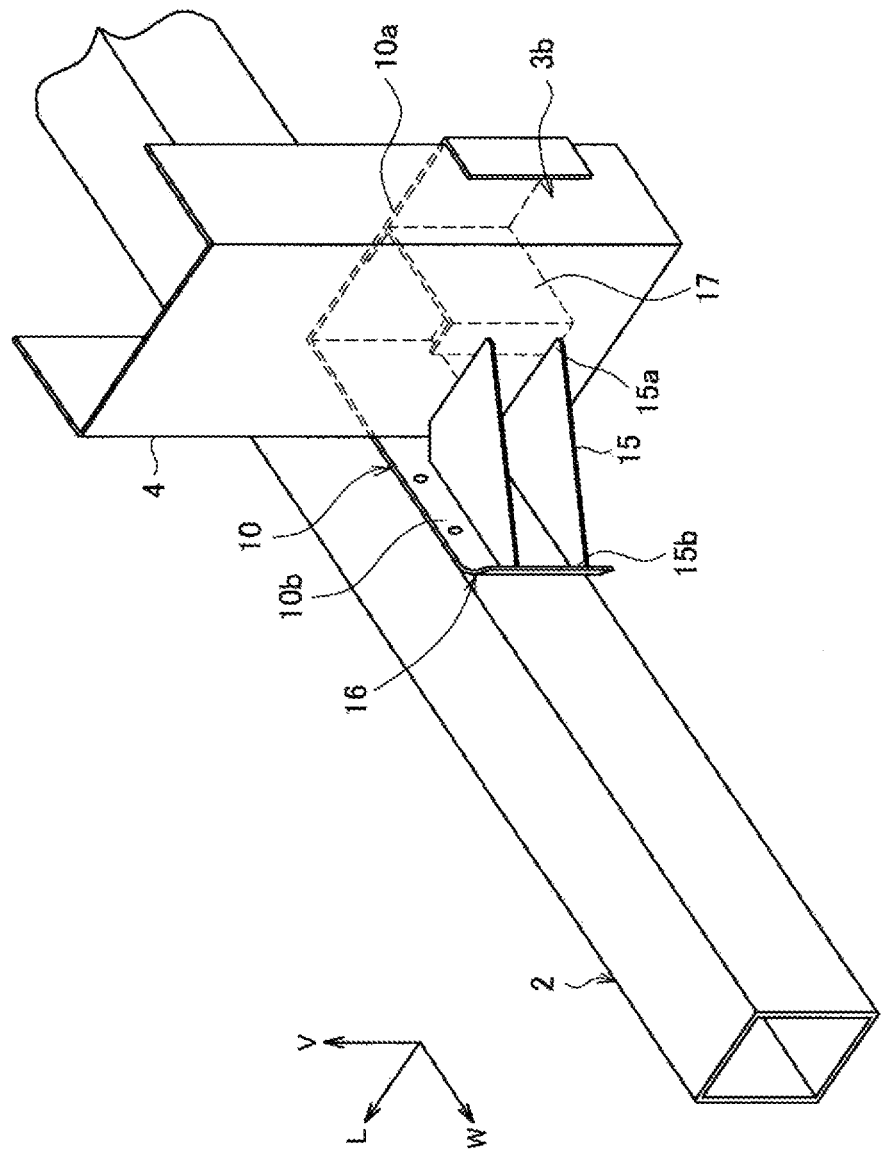
FIG. 27 is a perspective view of a schematic configuration of a first modified example of the underrun protector according to the third embodiment.

In addition, as shown in FIG. 26, when a load is input to the beam 2, the third reinforcing member 15 according to the above embodiment may be deformed to be pinched into the stay 4. In regard to this, for example, a reinforcing plate 17 may be provided inside the closed cross section part 3b of the connecting structure 3. FIG. 27 is a perspective view of a schematic configuration of a first modified example of the underrun protector 1 according to the present embodiment.

As shown in FIG. 27, the reinforcing plate 17 is arranged in accordance with the position of a tip 15a (the tip on the closed cross section part 3b side, hereinafter referred to as a "rear side tip 15a") on the rear side in the vehicle longitudinal direction L among the tip 15a and a tip 15b of the third reinforcing member 15. The reinforcing plate 17 is provided to extend to the rear side tip 15a of the third reinforcing member 15 which is relatively on the upper side from the rear side tip 15a of the third reinforcing member 15 which is relatively on the lower side. In addition, as shown in FIG. 26, the reinforcing plate 17 may have a shape in which both ends protrude forward in the vehicle longitudinal direction L in a plan view or a shape in which both ends protrude rearward in the vehicle longitudinal direction L.

Figure 28:
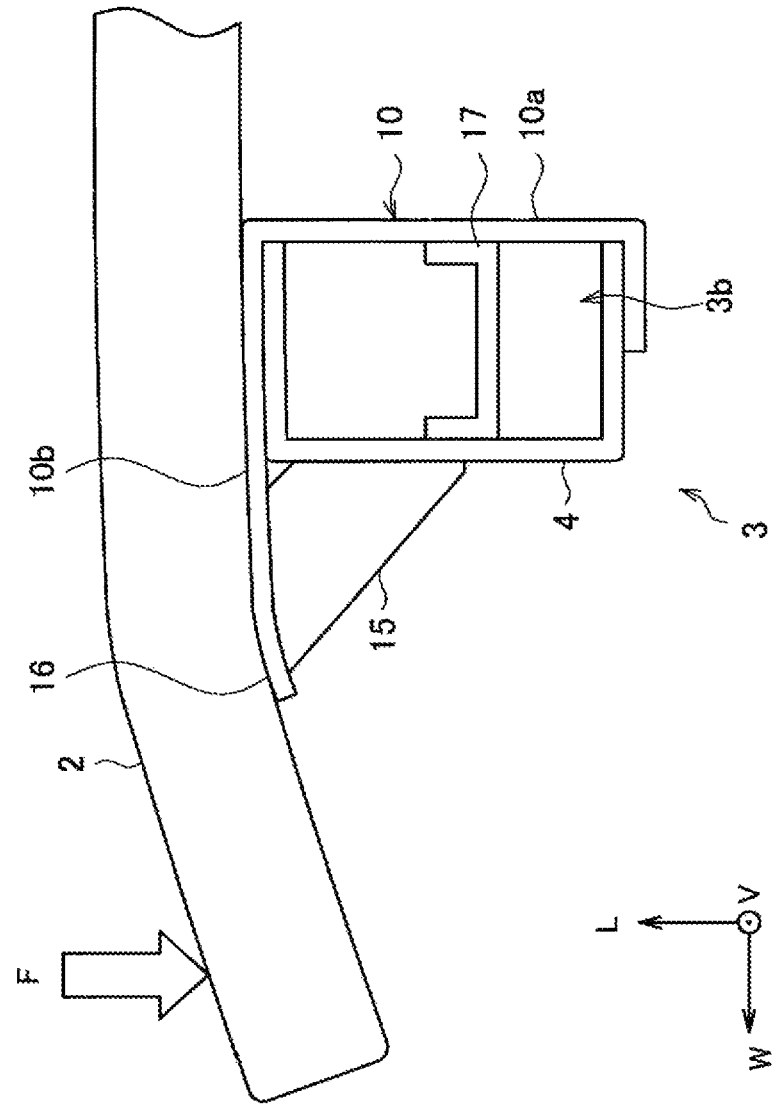
FIG. 28 is a diagram showing an example of a state of deformation of the underrun protector when a load is input to the underrun protector according to the first modified example.

If the reinforcing plate 17 is arranged inside the closed cross section part 3b, as shown in FIG. 28, when a load is input to the beam 2, it is possible to cause the action of inhibiting inward deformation of the stay 4 due to the load transmitted through the beam 2. Therefore, it is possible to improve the load resistance performance.

Such an effect can be obtained when a plurality of third reinforcing members 15 are provided. That is, the reinforcing plate 17 is provided to extend to the rear side tip 15a of the third reinforcing member 15 positioned on the uppermost side from the rear side tip 15a of the third reinforcing member 15 positioned on the lowermost side, in accordance with the position of the rear side tips 15a in the vehicle longitudinal direction L. Thus, it is possible to obtain the effect of improving the load resistance performance.

Second Modified Example

In addition, as shown in FIG. 25, it is preferable that a region in contact with the reinforcing member attachment surface 4b of the third reinforcing member 15 be as large as possible. For example, when a length of a part of the third reinforcing member 15 connected to the closed cross section part 3b of the connecting structure 3 in the vehicle longitudinal direction L is set as $L_1$ and a length of the reinforcing member attachment surface 4b of the closed cross section part 3b in the vehicle longitudinal direction L is set as $L_2$, it is preferable that the third reinforcing member 15 be provided to satisfy the following Formula (1).

$$L_1/L_2 \geq 0.8 \quad (1)$$

Here, the lower limit value, 0.8, shown in Formula (1) is a value found from results of tests that were performed by the inventors under a plurality of conditions as shown in the following examples.

Figure 29:
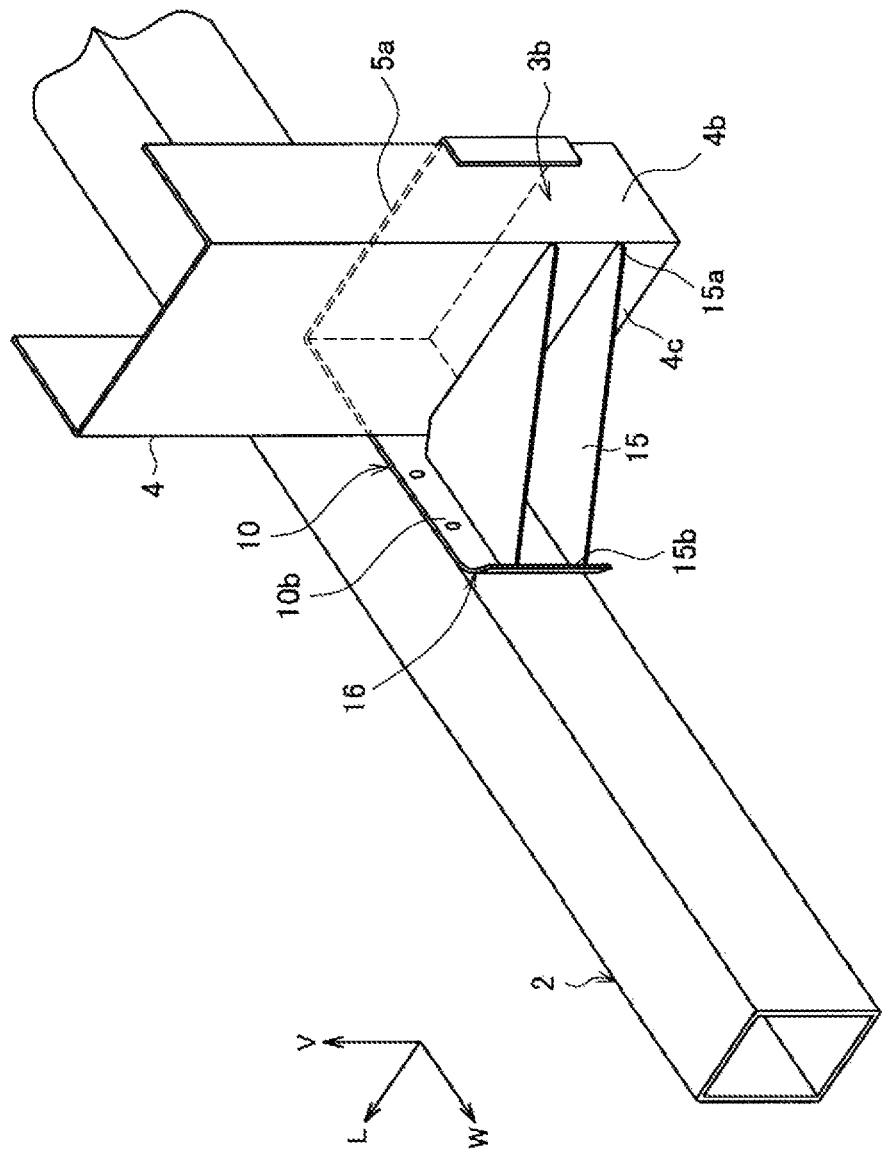
FIG. 29 is a perspective view of a schematic configuration of a second modified example of the underrun protector according to the third embodiment.
Figure 30:
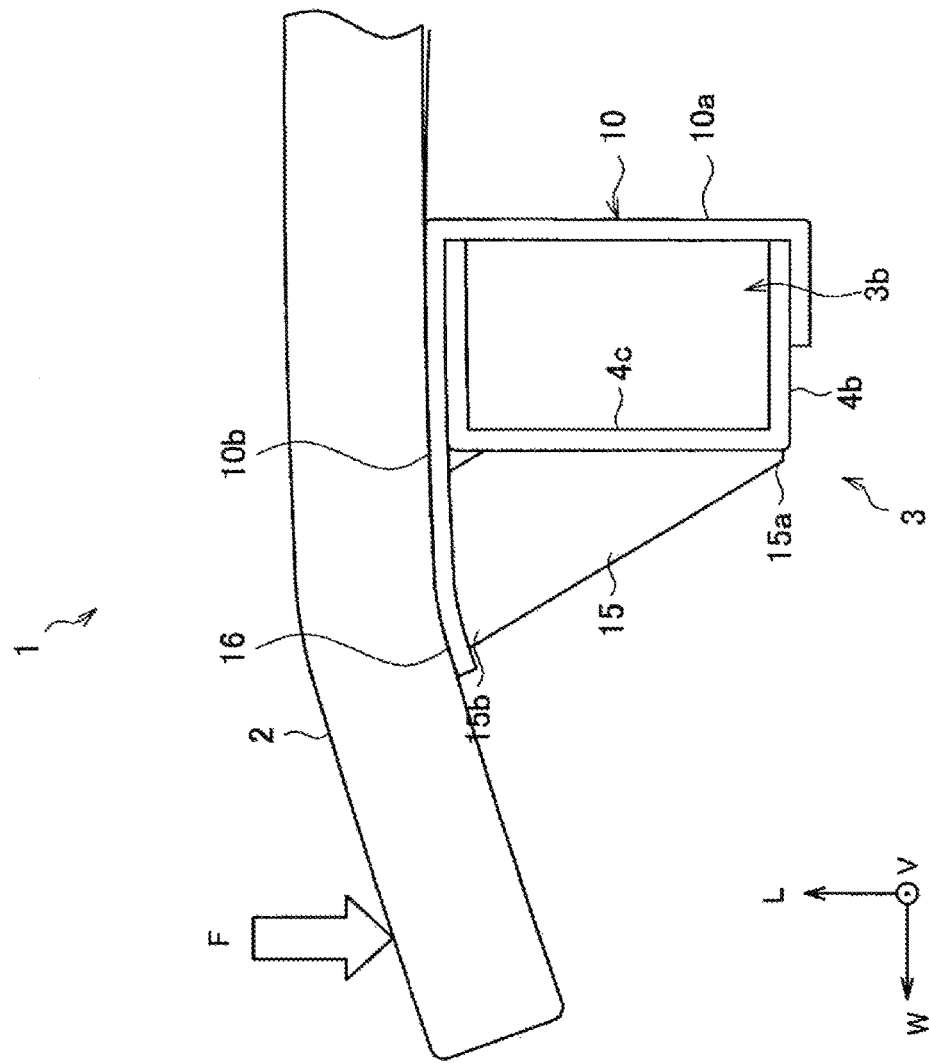
FIG. 30 is a diagram showing an example of a state of deformation of the underrun protector when a load is input to the underrun protector according to the second modified example.

FIG. 29 is a perspective view of a schematic configuration of a second modified example of the underrun protector 1 according to the present embodiment. In addition, FIG. 30 is a diagram showing an example of a state of deformation of the underrun protector 1 when a load is input to the underrun protector 1 according to the present modified example. When the rear side tip 15a of the third reinforcing member 15 in the vehicle longitudinal direction L has a shape that extends to the side wall 4c of the stay 4 as shown in FIG. 29, the load transmitted to the closed cross section part 3b through the third reinforcing member 15 can be widely dispersed to the side wall 4c of the stay. Therefore, as shown in FIG. 30, it is possible to prevent out-of-plane deformation to the inside of the closed cross section part 3b. Therefore, it is possible to further improve the load resistance performance of the underrun protector.

Third Modified Example

Figure 31:
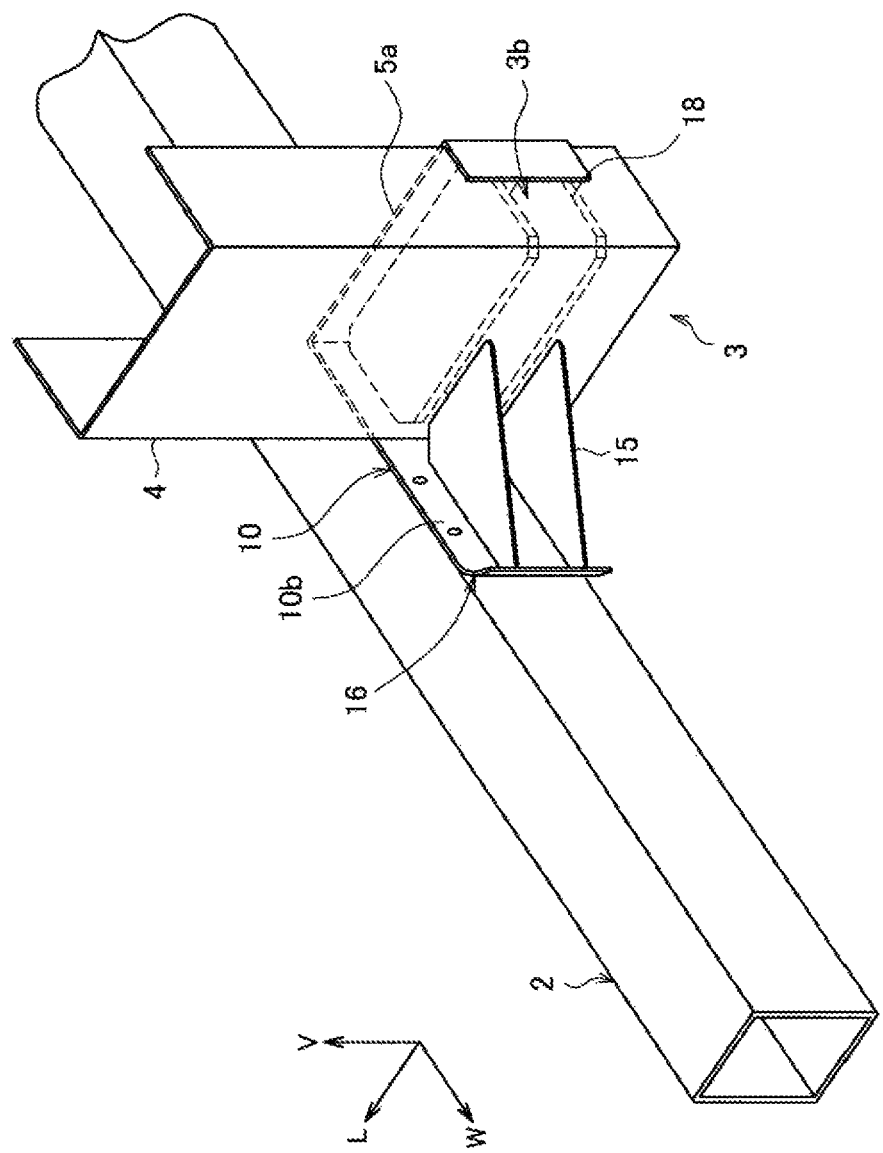
FIG. 31 is a perspective view of a schematic configuration of a third modified example of the underrun protector according to the third embodiment.

FIG. 31 is a perspective view of a schematic configuration of a third modified example of the underrun protector 1 according to the present embodiment. As shown in FIG. 31, a partition member 18 may be provided to fill a space inside the closed cross section part 3b in a horizontal cross-sectional view of the closed cross section part 3b of the connecting structure 3. For example, a flat plate member may be used as the partition member 18. A material of the partition member 18 is not particularly limited. For example, the material of the partition member 18 may be a metal, a plastic or a composite member. The partition member 18 is arranged in accordance with an installation height of the third reinforcing member 15. When the partition member 18 is provided inside the closed cross section part 3b in this manner, since the partition member 18 inhibits out-of-plane deformation of the stay 4, it is possible to prevent deformation to the inside of the closed cross section part 3b of the connecting structure 3. Therefore, it is possible to further improve the load resistance performance. Here, in order to reduce the weight, a region inside the peripheral end of the partition member 18 may be partially hollowed out.

The underrun protector 1 according to the third embodiment of the present invention has been described above.

5. Fourth Embodiment

Next, an underrun protector 1 according to a fourth embodiment of the present invention will be described. The underrun protector 1 according to the present embodiment has a configuration in which characteristic components (a protrusion and a reinforcing member) of the underrun protector 1 according to the first embodiment to the third embodiment of the present invention are combined.

Figure 32:
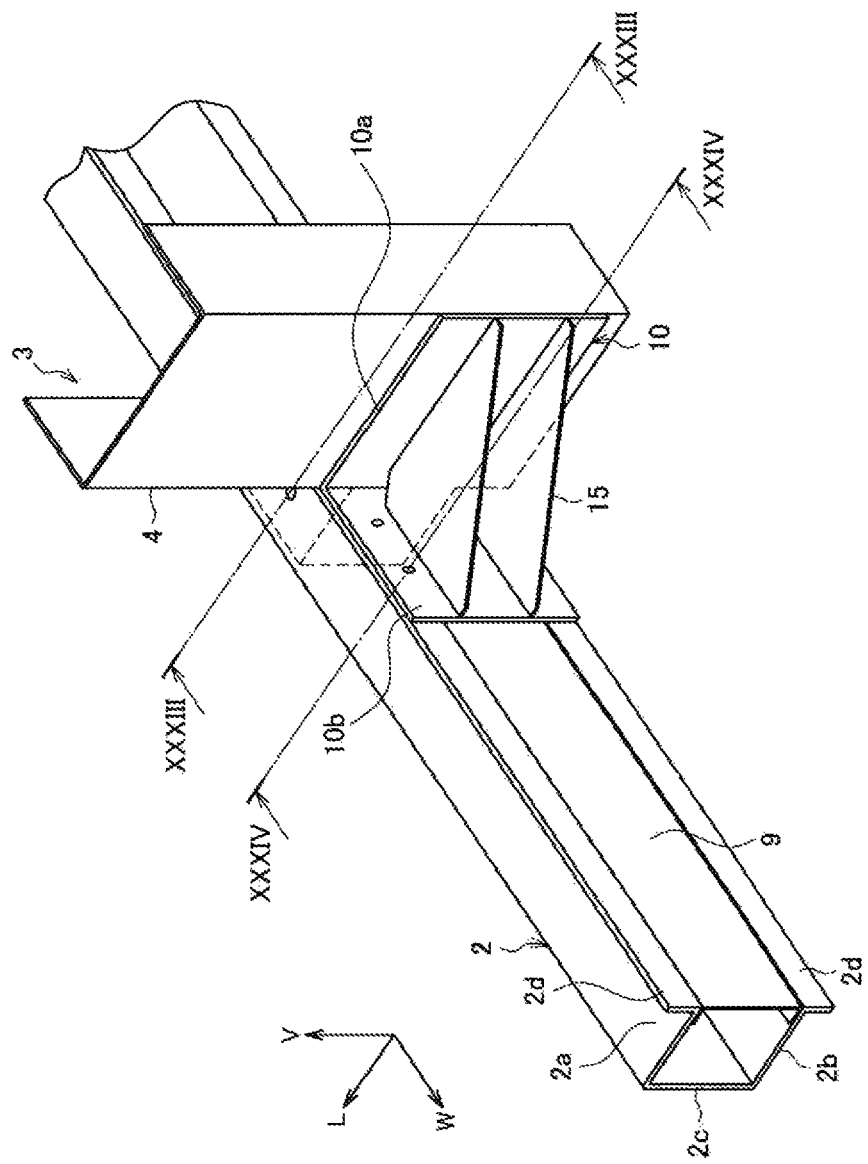
FIG. 32 is a perspective view of a schematic configuration of an underrun protector according to a fourth embodiment of the present invention.
Figure 33:
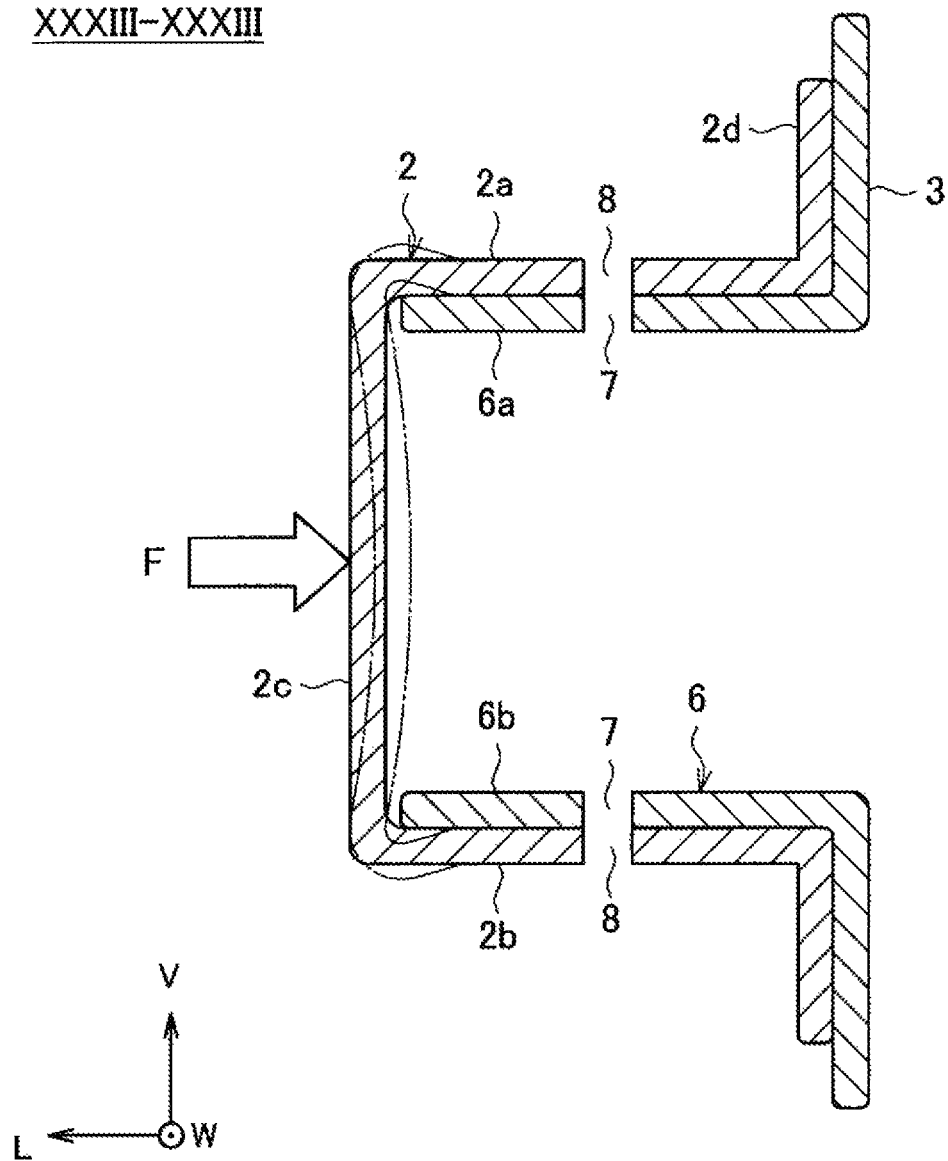
FIG. 33 is a cross-sectional view of the underrun protector according to the fourth embodiment taken along the line XXXIII-XXXIII in FIG. 32.
Figure 34:
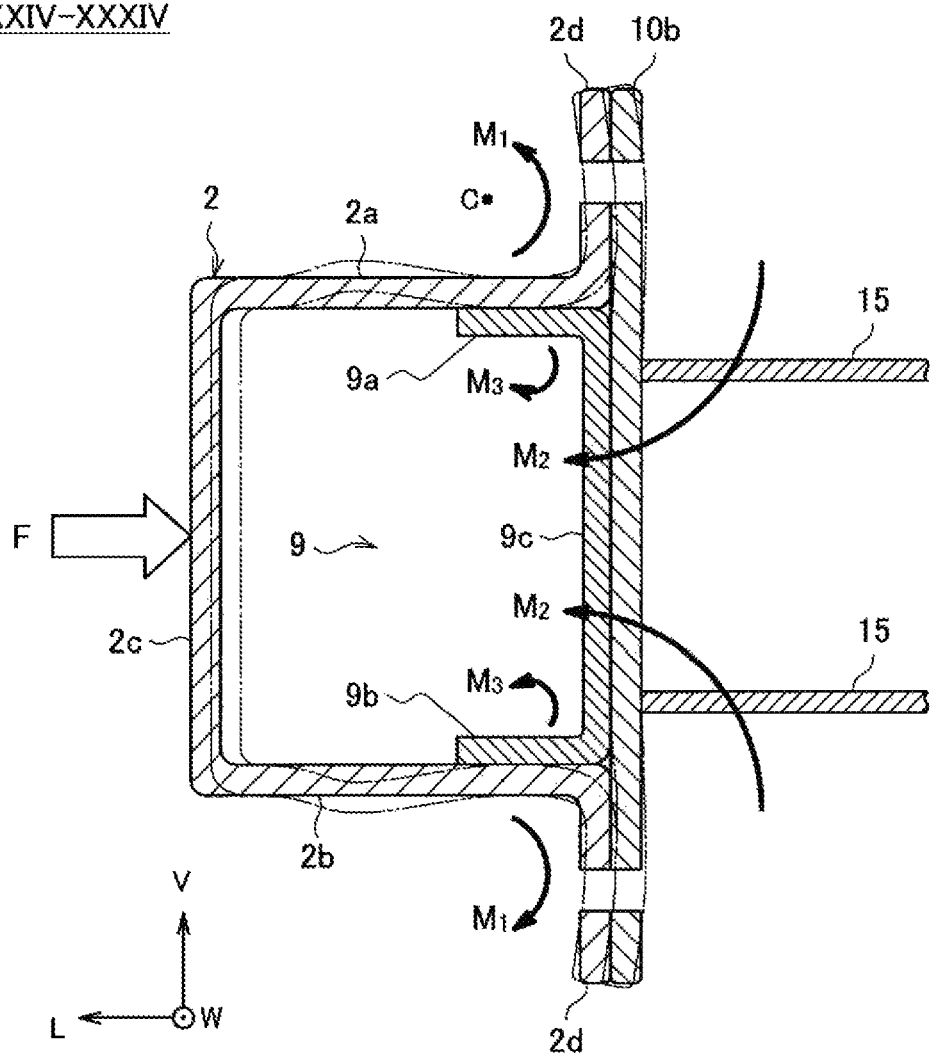
FIG. 34 is a cross-sectional view of the underrun protector according to the fourth embodiment taken along the line XXXIV-XXXIV in FIG. 32.

FIG. 32 is a perspective view of a schematic configuration of the underrun protector 1 according to the fourth embodiment of the present invention. FIG. 33 is a cross-sectional view of the underrun protector 1 according to the present embodiment taken along the line XXXIII-XXXIII shown in FIG. 32. FIG. 34 is a cross-sectional view of the underrun protector 1 according to the present embodiment taken along the line XXXIV-XXXIV shown in FIG. 32. Here, since functions of the beam 2, the stay 4, the frame attachment plate 5, the bracket 10, the third reinforcing member 15, and the vehicle body frame 20 which are basic components of the underrun protector 1 are the same as' those in the first embodiment to the third embodiment of the present invention, description thereof will be omitted.

As shown in FIG. 32 and FIG. 33, the stay 4 according to the present embodiment includes the protrusion 6. The protrusion 6 protrudes from the opening part of the beam 2 inside the beam 2 and is fixed to the first top surface part 2a and the first bottom surface part 2b of the beam 2. Here, as shown in FIG. 33, a cross-sectional shape in a cross-sectional view perpendicular to the vehicle width direction W of the beam 2 according to the present embodiment may be a T shape unlike the first embodiment of the present invention. In such a shape, the stay 4 can be arranged in contact with each of the first flange parts 2d of the beam 2. Therefore, the load transmitted from the first flange part 2d to the stay 4 increases. Therefore, the load resistance performance with respect to the load applied at the attachment position P1 on the beam 2 shown in FIG. 2 is improved.

In addition, as shown in FIG. 32 and FIG. 34, the first reinforcing member 9 is provided in the opening part of the beam 2 according to the present embodiment. The first reinforcing member top surface part 9a and the first reinforcing member bottom surface part 9b of the first reinforcing member 9, and the first top surface part 2a and the first bottom surface part 2b are bonded respectively by, for example, welding. In addition, a closed cross section is formed by the beam 2 and the first reinforcing member 9. Therefore, it is possible to further prevent deformation of the first top surface part 2a and the first bottom surface part 2b to the inside of the cross section. Therefore, the load resistance performance with respect to the load applied to the position P2 lateral to the attachment position of the beam 2 in the vehicle width direction W shown in FIG. 2 is improved.

In addition, as shown in FIG. 32 and FIG. 34, the third reinforcing member 15 is provided to bridge the stay attachment surface 10a and the beam attachment surface 10b of the bracket 10 according to the present embodiment. In addition, the bent portion 16 that bends rearward in the vehicle longitudinal direction L is provided at the tip of the beam attachment surface 10b of the bracket 10 on the outside in the vehicle width direction W. Therefore, when a load is applied at the position P2 lateral to the attachment position of the beam 2 in the vehicle width direction W shown in FIG. 2, it is possible to avoid the stress locally concentrating on the beam 2 at the tip of the beam attachment surface 10b. Therefore, the load resistance performance with respect to the load applied to the position P2 lateral to the attachment position of the beam 2 in the vehicle width direction W shown in FIG. 2 is improved.

The underrun protector 1 according to the present embodiment is configured as described above. The underrun protector 1 according to the present embodiment includes the protrusion 6 shown in the first embodiment of the present invention, the first reinforcing member 9 shown in the second embodiment of the present invention, and the bracket 10 and the third reinforcing member 15 shown in the third embodiment of the present invention. Therefore, it is possible to improve the load resistance performance with respect to a load applied at the attachment position P1 on the beam 2 and a load applied at the position P2 lateral to the attachment position P1 in the vehicle width direction W shown in FIG. 2. That is, it is possible to improve the overall load resistance performance of the underrun protector 1.

Here, while the components according to the first embodiment to the third embodiment of the present invention are included in the underrun protector 1 in the above embodiment, the present invention is not limited thereto. For example, the components in the first embodiment and the second embodiment of the present invention may be incorporated into the underrun protector 1. In addition, the components shown in the first embodiment and the third embodiment of the present invention may be incorporated into the underrun protector 1. In addition, the components shown in the second embodiment and the third embodiment of the present invention may be incorporated into the underrun protector 1. Furthermore, various modified examples shown in the embodiments can be incorporated into the underrun protector 1 according to another embodiment. The components shown in each of the embodiments may be appropriately incorporated into the underrun protector 1 as long as no structural interference occurs. When these components are combined compositely, it is possible to improve the load resistance performance with respect to a plurality of load input positions and it is possible to further increase the improvement rate of the load resistance performance.

The underrun protector 1 according to the fourth embodiment of the present invention has been described above.

EXAMPLES

Experimental Example 1

A load resistance performance evaluation test was performed using the underrun protector according to the first embodiment of the present invention and an underrun protector having a structure of the related art. The underrun protector having a structure of the related art (Comparative Example 1) had a configuration in which the protrusion of the stay was removed from the configuration shown in FIG. 4 and the beam had a rectangular cross section. In addition, the underrun protector according to the first embodiment of the present invention was the underrun protector having the configuration shown in FIG. 4 (Example 1). The beam was formed of a highly tensile steel with a tensile strength of 780 MPa grade, and the stay was formed of a thick material with a tensile strength of 540 MPa grade.

Figure 35:
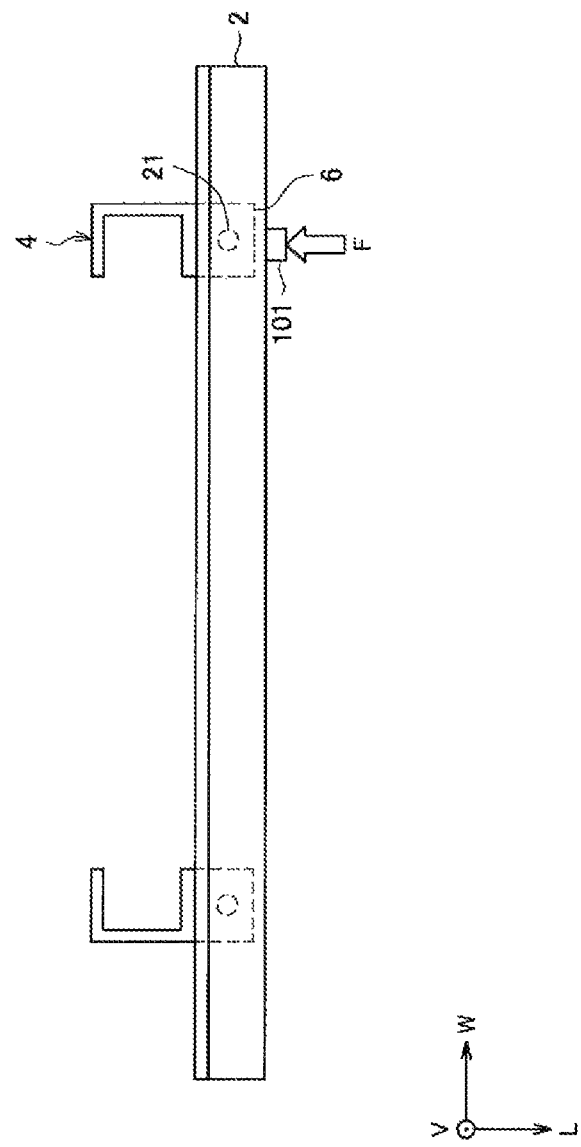
FIG. 35 is a diagram for describing a test method in which a load resistance performance evaluation test is performed using an underrun protector according to Experimental Example 1.

In the load resistance performance evaluation test, an indenter was provided on a beam side surface part at the stay attachment position P1 shown in FIG. 2 and a load was input. FIG. 35 is a diagram for describing a test method in which the load resistance performance evaluation test was performed using the underrun protector 1 according to Experimental Example 1. The underrun protector 1 shown in FIG. 35 was the underrun protector 1 according to Example 1. As shown in FIG. 35, an indenter 101 was provided at the attachment position P1 on the beam 2 and a load F was applied to the indenter 101. The load input position was the same in the underrun protectors according to Example 1 and Comparative Example 1. Then, in the load resistance performance evaluation test, the indentation amount of the indenter and the input load were recorded. The load resistance performances of the underrun protectors according to Example 1 and Comparative Example 1 were evaluated on the basis of the records.

Figure 36:
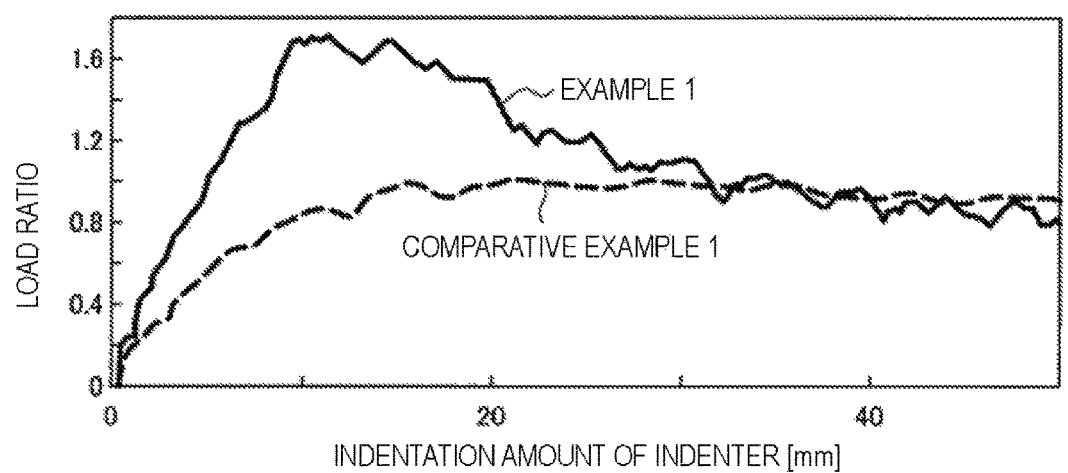
FIG. 36 is a graph showing a relationship between an indentation amount of an indenter and an input load in Example 1 and Comparative Example 1.

FIG. 36 shows a relationship between the indentation amount of the indenter and the input load in Example 1 and Comparative Example 1. Here, the "load ratio" shown in FIG. 36 represents a ratio between the recorded input load and the maximum input load obtained in the load resistance performance evaluation test for Comparative Example 1.

As shown in FIG. 36, in Comparative Example 1, the input load gradually increased as the indentation amount of the indenter increased. In addition, in Comparative Example 1, when the indenter was pushed in to some extent, the input load was almost constant. On the other hand, in Example 1, in a stage in which the indentation amount of the indenter was small, the increase in the input load was significant. In addition, in Example 1, the input load gradually decreased thereafter.

In the load resistance performance evaluation test, the maximum load ratio of the underrun protector according to Example 1 with respect to the underrun protector according to Comparative Example 1 is shown in Table 1.

TABLE 1

| | Structure of underrun protector | | Maximum |
| --- | --- | --- | --- |
| | Beam | Protrusion | load ratio |
| Example 1 | Hat-shaped cross section | Provided | 1.71 |
| Comparative Example 1 | Rectangular cross section | Not provided | 1 |

As shown in Table 1, according to the underrun protector of Example 1, it was possible to improve the load resistance performance by 70% or more with respect to the underrun protector according to Comparative Example 1.

As described above, according to the result of the present experimental example, the underrun protector according to the first embodiment of the present invention showed more favorable load resistance performance when a load was applied at the attachment position of the beam than the underrun protector of the related art.

Experimental Example 2

Next, the load resistance performance evaluation test was performed using the underrun protector according to the second embodiment of the present invention and the underrun protector having a structure of the related art. The underrun protector having a structure of the related art was the above underrun protector according to Comparative Example 1 and the underrun protector having the configuration shown in FIG. 19 (Comparative Example 2) in which a second reinforcing member was added to the underrun protector 1 according to Comparative Example 1. In addition, the underrun protector according to the second embodiment of the present invention was the underrun protector having the configuration shown in FIG. 8 (Example 2), the underrun protector in which the first reinforcing member was removed from the configuration shown in FIG. 8 (Example 3), the underrun protector having the configuration shown in FIG. 14 (Example 4), the underrun protector having the configuration shown in FIG. 17 (Example 5), and the underrun protector having the configuration shown in FIG. 22 (Example 6). The beam was formed of a highly tensile steel with a tensile strength of 780 MPa grade. The stay and the bracket were formed of a thick material with a tensile strength of 540 MPa grade. In addition, the first reinforcing member and the second reinforcing member were formed of a thick material with a tensile strength of 780 MPa grade.

Figure 37:
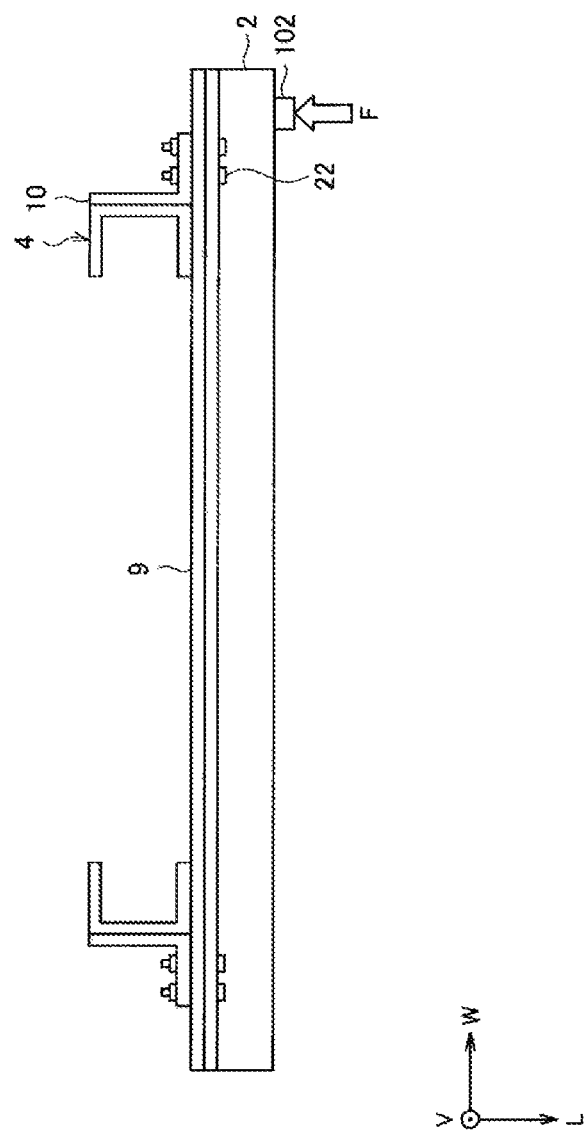
FIG. 37 is a diagram for describing a test method in which a load resistance performance evaluation test is performed using an underrun protector according to Experimental Example 2.

In the load resistance performance evaluation test, an indenter was provided on a beam side surface part at the position P2 lateral to the stay attachment position in the vehicle width direction W shown in FIG. 2, and a load was input. FIG. 37 is a diagram for describing a test method in which the load resistance performance evaluation test was performed using the underrun protector 1 according to Experimental Example 2. The underrun protector 1 shown in FIG. 37 was the underrun protector 1 according to Example 2. As shown in FIG. 37, an indenter 102 was provided at the position P2 lateral to the attachment position P1 on the beam 2 in the vehicle width direction W, and a load F was applied to the indenter 102. The load input position was the same in the underrun protectors according to the examples and the comparative examples. Then, in the load resistance performance evaluation test, the indentation amount of the indenter and the input load were recorded. The load resistance performances of the underrun protectors according to the examples and the comparative examples were evaluated on the basis of the records.

Figure 38:
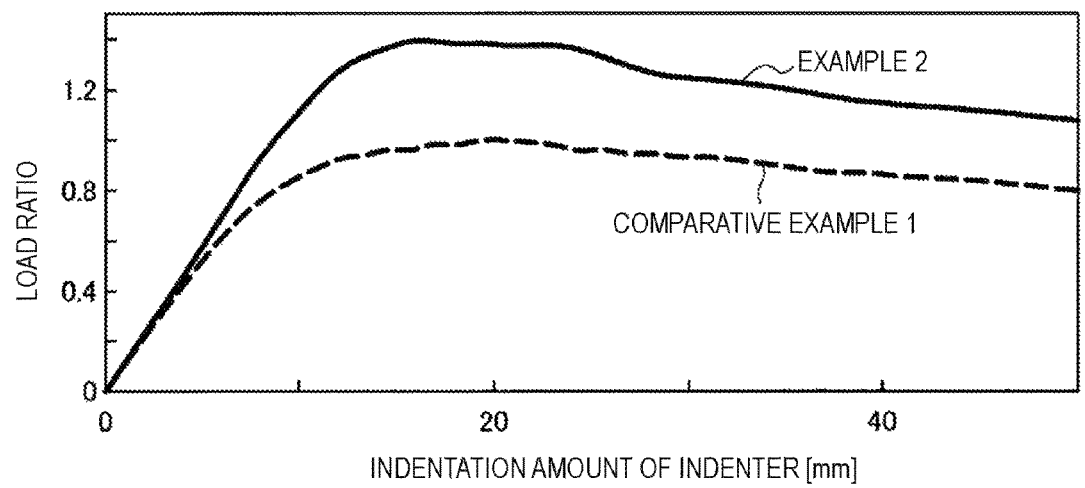
FIG. 38 is a graph showing a relationship between an indentation amount of an indenter and an input load in Example 2 and Comparative Example 1.

FIG. 38 shows a relationship between the indentation amount of the indenter and the input load in Example 2 and Comparative Example 1. Here, the "load ratio" shown in FIG. 38 represents a ratio between the recorded input load and the maximum input load obtained in the load resistance performance evaluation test for Comparative Example 1.

As shown in FIG. 38, in both Example 2 and Comparative Example 1, as the indenter was pushed in, the input load increased before the indentation amount reached a certain amount. In addition, in Example 2 and Comparative Example 1, the input load gradually decreased thereafter. In this manner, the relationship between the indentation amount of the indenter and the input load showed a similar trend in Example 2 and Comparative Example 1. On the other hand, the input maximum load value was significantly larger in Example 2 than in Comparative Example 1.

Next, the maximum load ratio and the weight ratio of the underrun protectors according to Example 2, Example 3, Example 4, and Example 5 with respect to the underrun protector according to Comparative Example 1 are shown in Table 2.

TABLE 2

| | Structure of underrun protector | | | | |
| --- | --- | --- | --- | --- | --- |
| | Beam | Shape of beam attachment part of bracket | Provision of reinforcing member/shape | Maximum load ratio | Weight ratio |
| Example 2 | Hat-shaped cross section | Flat plate | Provided/ flat plate | 1.37 | 1.32 |
| Example 3 | Hat-shaped cross section | Flat plate | Not provided | 1.05 | 0.92 |
| Example 4 | Hat-shaped cross section | Flat plate | Provided/ U-shape | 2.03 | 1.32 |
| Example 5 | Hat-shaped cross section | Hat-shaped cross section | Not provided | 1.16 | 0.92 |
| Comparative Example 1 | Rectangular cross section | Flat plate | Not provided | 1 | 1 |

As shown in Table 2, according to the underrun protector of Example 2, it was possible to improve the load resistance performance by 30% or more with respect to the underrun protector according to Comparative Example 1. In addition, according to the underrun protector of Example 3, it was possible to improve the load resistance performance by 5% with respect to the underrun protector according to Comparative Example 1. Furthermore, according to the underrun protector of Example 3, it was possible to reduce the weight by about 10% with respect to the underrun protector according to Comparative Example 1. That is, according to the underrun protector of Example 3, it was possible to improve the load resistance performance while reducing the weight with respect to the underrun protector of the related art.

On the other hand, according to the underrun protector of Example 4, it was possible to improve the load resistance performance by 100% or more with respect to the underrun protector according to Comparative Example 1. That is, the underrun protector according to Example 4 had higher load resistance performance than the underrun protector according to Example 2. Therefore, when the first reinforcing member having a U-shaped cross section was provided inside the beam, it was possible to improve the load resistance performance.

On the other hand, according to the underrun protector of Example 5, it was possible to improve the load resistance performance by 15% or more with respect to the underrun protector according to Comparative Example 1. Furthermore, the underrun protector according to Example 5 can be reduced in weight by about 10% with respect to the underrun protector according to Comparative Example 1. In addition, the underrun protector according to Example 5 had almost the same weight as the underrun protector according to Example 3. However, the underrun protector according to Example 5 had higher load resistance performance than the underrun protector according to Example 3. Accordingly, it could be understood that, when the shape of the beam attachment part of the bracket was a hat shape in cross section, the load resistance performance was further improved.

Next, the maximum load ratio and the weight ratio of the underrun protector according to Example 6 with respect to the underrun protector according to Comparative Example 2 are shown in Table 3.

TABLE 3

| | Structure of underrun protector | | | |
|---|---|---|---|---|
| Beam | Shape of beam attachment part of bracket | Shape of reinforcing member | Maximum load ratio | Weight ratio |
| Example 6 Hat-shaped cross section | Hat-shaped cross section | Hat-shaped cross section | 1.04 | 0.82 |
| Comparative Example 2 Rectangular cross section | Flat plate | Hat-shaped cross section | 1 | 1 |

According to the underrun protector of Example 6, it was possible to improve the load resistance performance by 4% with respect to the underrun protector according to Comparative Example 2. Furthermore, according to the underrun protector of Example 6, it was possible to reduce the weight by about 20% with respect to the underrun protector according to Comparative Example 2. That is, when the second reinforcing member and the bracket had a hat-shaped cross section, and were provided to support the beam and the side surface part of the bracket, it was possible to improve the load resistance performance while reducing the weight with respect to the underrun protector of the related art.

As described above, according to the result of the present experimental example, the underrun protector according to the second embodiment of the present invention showed more favorable load resistance performance than the underrun protector of the related art when a load was applied at a position lateral to the attachment position of the beam in the vehicle width direction W.

Experimental Example 3

Next, the load resistance performance evaluation test was performed using the underrun protector according to the third embodiment of the present invention and the underrun protector having a structure of the related art. The underrun protector according to the third embodiment of the present invention was the underrun protector having the configuration shown in FIG. 24 (Example 7), and the bent portion was provided at the tip of the beam attachment surface on the outside in the vehicle width direction W. On the other hand, the underrun protector having a structure of the related art was the underrun protector (Comparative Example 3) in which the bent portion at the tip of the beam attachment surface on the outside in the vehicle width direction W was removed from the underrun protector shown in FIG. 24. The beam was formed of a highly tensile steel with a tensile strength of 780 MPa grade. The stay and the bracket were formed of a thick material with a tensile strength of 540 MPa grade. In addition, a third reinforcing member provided to bridge the structure main body part and the beam attachment surface in a plan view was formed of a thick material with a tensile strength of 540 MPa grade. In addition, the radius of curvature of the bent portion according to Example 9 was 100 mm, and $L_1/L_2$ was 0.6.

In the load resistance performance evaluation test, in the same manner as in Experimental Example 2, an indenter was provided on a beam side surface part at the position P2 lateral to the stay attachment position in the vehicle width direction W shown in FIG. 2, and a load was input. The load input position was the same in the underrun protectors according to the examples and the comparative examples.

Then, in the load resistance performance evaluation test, the indentation amount of the indenter and the input load were recorded. The load resistance performances of the underrun protectors according to the examples and the comparative examples were evaluated on the basis of the records.

Figure 39:
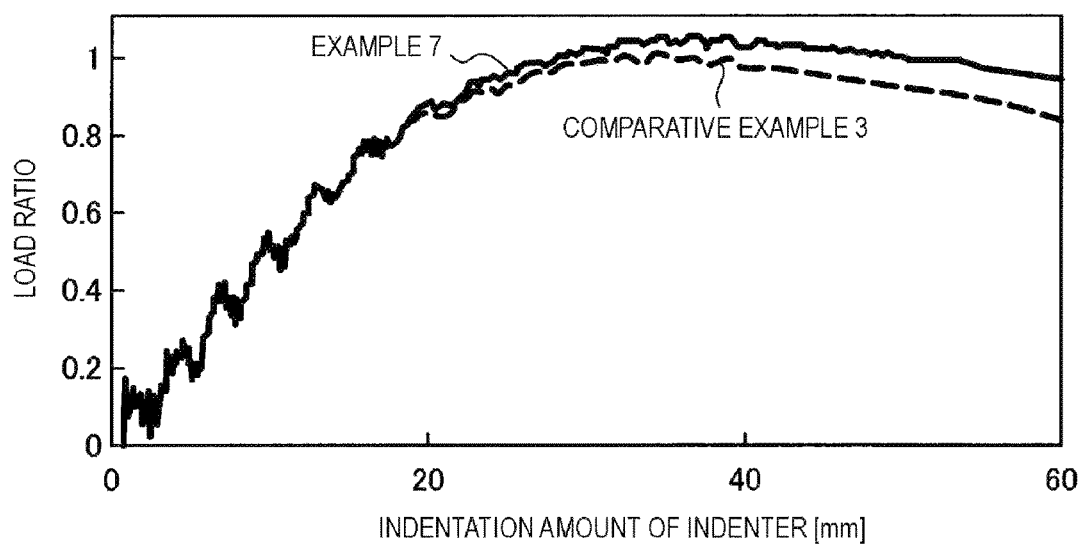
FIG. 39 is a graph showing a relationship between an indentation amount of an indenter and an input load in Example 7 and Comparative Example 3.

FIG. 39 shows a relationship between the indentation amount of the indenter and the input load in Example 7 and Comparative Example 3. As shown in FIG. 39, the maximum input load of the underrun protector according to Example 7 was larger than the maximum input load of the underrun protector according to Comparative Example 3. That is, when the bent portion was provided at the tip of the beam attachment surface, it was possible to improve the load resistance performance of the underrun protector.

Experimental Example 4

Next, in underrun protectors having different structures, an influence of a difference in the structure on load resistance performance was' evaluated. Three types of structure of the underrun protector were used in the present example, a structure A in which the bent portion was provided at the tip of the beam attachment surface on the outside in the vehicle width direction W, a structure B in which the reinforcing plate shown in FIG. 27 was added to the structure A, and a structure C in which the partition member shown in FIG. 31 was added to the structure A. Here, the shape of the third reinforcing member was the same in the structures. In addition, for the structure A, two lengths $L_1$ of the third reinforcing member shown in FIG. 25 in the vehicle longitudinal direction L were provided. In addition, for the structures A to C, three radii of curvature of the bent portion were provided. In Example 8 to Example 19, the load resistance performance evaluation test was performed. Since test conditions were the same as those in Experimental Example 3, description thereof will be omitted.

Parameters of the structures of the underrun protectors according to Example 8 to Example 19 and the maximum load ratio and the weight ratio of the underrun protectors according to Example 8 to Example 19 with respect to the underrun protector according to Comparative Example 3 are shown in Table 4.

TABLE 4

| | Structure of underrun protector | | | |
|---|---|---|---|---|
| | Radius of curvature [mm] | Structure | L1/L2 | Maximum load ratio |
| Example 8 | 50 | A | 0.6 | 1.02 |
| Example 9 | 100 | A | 0.6 | 1.02 |
| Example 10 | 200 | A | 0.6 | 1.02 |
| Example 11 | 50 | B | 0.6 | 1.05 |
| Example 12 | 100 | B | 0.6 | 1.05 |
| Example 13 | 200 | B | 0.6 | 1.05 |
| Example 14 | 50 | C | 0.6 | 1.09 |
| Example 15 | 100 | C | 0.6 | 1.1 |
| Example 16 | 200 | C | 0.6 | 1.13 |
| Example 17 | 50 | A | 1 | 1.09 |
| Example 18 | 100 | A | 1 | 1.11 |
| Example 19 | 200 | A | 1 | 1.12 |

As shown in Table 4, the structure B had higher load resistance performance than the structure A. In addition, the structure C had higher load resistance performance than the structure B. That is, according to the present example, it could be understood that, when the reinforcing plate was provided inside the closed cross section part of the connecting structure in addition to the provision of the bent portion at the tip of the beam attachment surface of the connecting structure, the load resistance performance was improved. In addition, it could be understood that, when the partition member was provided inside the closed cross section part of the connecting structure instead of the reinforcing plate, the load resistance performance was further improved. Here, it was considered that, when both the structure B and the structure C were applied to the underrun protector, the load resistance performance was further improved.

In addition, as shown in Table 4, in the structure C, it could be understood that the load resistance performance was further improved as the radius of curvature of the bent portion increased. That is, when out-of-plane deformation of the closed cross section part due to the input load was effectively prevented as in the structure C, it was possible to further improve the load resistance performance by increasing the radius of curvature of the bent portion.

In addition, as shown in Example 8 to Example 10 and Example 17 to Example 19 in Table 4, it could be understood that, when the value of $L_1/L_2$ was large, the load resistance performance was improved as the radius of curvature of the bent portion increased.

Figure 40:
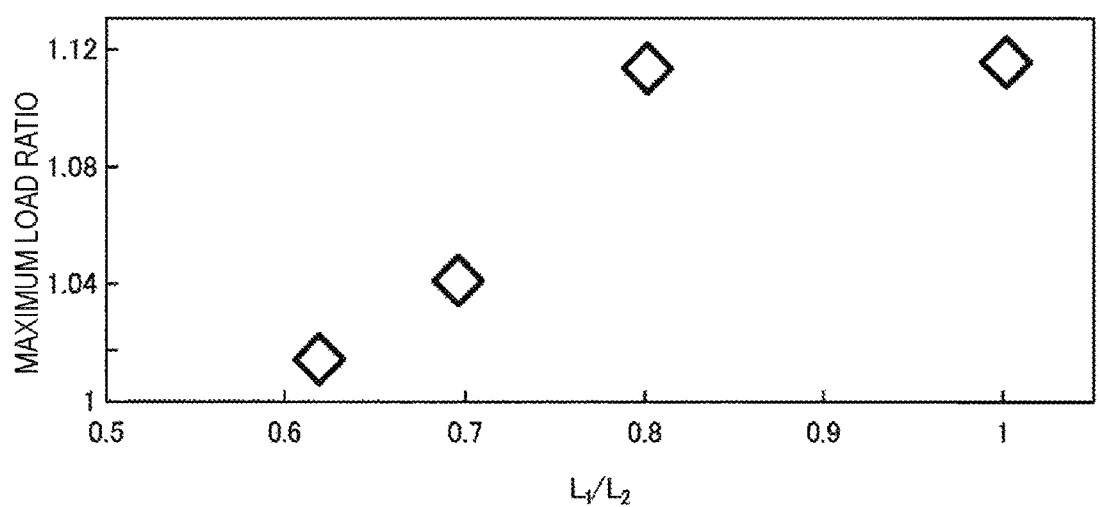
FIG. 40 is a graph showing a relationship of a ratio between a length $L_1$ and a length $L_2$ in a vehicle longitudinal direction of a reinforcing member attachment surface and a maximum load ratio with respect to an underrun protector of the related art.

In order to additionally verify the effect of the length $L_1$ of the third reinforcing member in the vehicle longitudinal direction L, the impact resistance performance evaluation test was performed while changing $L_1$. FIG. 40 is a graph showing a relationship between a ratio between the length $L_1$ and the length $L_2$ of the reinforcing member attachment surface in the vehicle longitudinal direction L and the maximum load ratio with respect to the underrun protector of the related art. Here, the radius of curvature of the bent portion was 200 mm.

As shown in FIG. 40, when $L_1/L_2$ was 0.8 or more, the load resistance performance was significantly improved. Therefore, the third reinforcing member is preferably provided to satisfy $L_1/L_2 \geq 0.8$. Such findings were obtained by the inventors for the first time.

As described above, according to the results of Experimental Example 3 and Experimental Example 4, the underrun protector according to the third embodiment of the present invention showed more favorable load resistance performance than the underrun protector of the related art when a load was applied at a position lateral to the attachment position of the beam in the vehicle width direction W.

Experimental Example 5

Next, the load resistance performance evaluation test was performed using the underrun protector according to the fourth embodiment of the present invention and the underrun protector having a structure of the related art. The underrun protector having a structure of the related art was the above underrun protector according to Comparative Example 1. In addition, the underrun protector according to the fourth embodiment of the present invention was the underrun protector having the configuration shown in FIG. 32 (Example 20). The beam was formed of a highly tensile steel with a tensile strength of 780 MPa grade. The stay and the bracket were formed of a thick material with a tensile strength of 540 MPa grade. In addition, the first reinforcing member was formed of a thick material with a tensile strength of 780 MPa grade. In addition, the third reinforcing member was formed of a thick material with a tensile strength of 540 MPa grade.

In the load resistance performance evaluation test, in the same manner as in Experimental Example 2 to Experimental Example 4, an indenter was provided on a beam side surface part at the position P2 lateral to the stay attachment position in the vehicle width direction W shown in FIG. 2, and a load was input. The load input position was the same in the underrun protectors according to Example 20 and Comparative Example 1. Then, in the load resistance performance evaluation test, the indentation amount of the indenter and the input load were recorded. The load resistance performances of the underrun protectors according to Example 20 and Comparative Example 1 were evaluated on the basis of the records. Here, the underrun protector according to Example 20 had the same configuration as the underrun protector according to Example 1. That is, the load resistance performance obtained when a load was input at the stay attachment position P1 shown in FIG. 2 was considered to have the same result as the evaluation result in Experimental Example 1. Therefore, the load resistance performance evaluation test for the underrun protector according to the present example will not be described here.

The maximum load ratio of the underrun protector according to Example 20 with respect to the underrun protector according to Comparative Example 1 is shown in Table 5.

TABLE 5

| | Structure of underrun protector | | | | |
|---|---|---|---|---|---|
| | Beam | Protrusion | Provision of first reinforcing member/shape | Provision of third reinforcing member | Maximum load ratio |
| Example 20 | Hat-shaped cross section | Provided | Provided/ U-shape | Provided | 2.37 |
| Comparative Example 1 | Rectangular cross section | Not provided | Not provided | Not provided | 1 |

According to the underrun protector according to Example 20, it was possible to improve the load resistance performance by 130% or more with respect to the underrun protector according to Comparative Example 1. Therefore, when the first reinforcing member having a U-shaped cross section and the third reinforcing member provided to bridge the beam attachment surface and the reinforcing member attachment surface were applied to the underrun protector compositely, it was possible to significantly improve the load resistance performance.

As described above, according to the result of the present experimental example, the underrun protector according to the fourth embodiment of the present invention showed significantly favorable load resistance performance with respect to the underrun protector of the related art when a load was applied at the position lateral to the attachment position of the beam in the vehicle width direction W.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 underrun protector
2 beam
2a first top surface part
2b first bottom surface part
2c first side surface part
2d first flange part
3 connecting structure
3a tip of connecting structure
3b closed cross section part of connecting structure
4 stay
4a opening surface
4b reinforcing member attachment surface (rear surface)
4c side wall of stay
5 frame attachment plate
6 protrusion
6a protruding top surface part
6b protruding bottom surface part
6c protruding side surface part
7 bolt hole of protrusion
8 bolt hole of beam
9 first reinforcing member
9a first reinforcing member top surface part
9b first reinforcing member bottom surface part
9c first reinforcing member side surface part
9d first reinforcing member convex part
10 bracket
10a stay attachment part (stay attachment surface)
10b beam attachment part (beam attachment surface)
10c second top surface part
10d second bottom surface part
10e second side surface part
10f second flange part
11 bolt hole of bracket
12 bolt hole of first reinforcing member
13 third reinforcing member
15a, 15b tip of third reinforcing member
16 bent portion
17 reinforcing plate
18 partition member
20 vehicle body frame
21 bolt hole of frame attachment plate
22, 23 bolt
90 second reinforcing member
90a second reinforcing member top surface part
90b second reinforcing member bottom surface part
90c second reinforcing member side surface part
90e second reinforcing member flange part
101, 102 indenter

The invention claimed is:

1. An end structure of a vehicle, comprising:
a beam that is provided to a vehicle body frame downward in the vertical direction and extends in a vehicle width direction; and
a connecting structure that is provided to extend in the vertical direction and connects the beam to the vehicle body frame,
wherein, in a cross-sectional view perpendicular to the vehicle width direction, the beam includes
a first top surface part and a first bottom surface part which face each other,
a first side surface part that connects one ends of the first top surface part and the first bottom surface part, and
first flange parts that are formed to protrude vertically outwardly at the other ends of the first top surface part and the first bottom surface part, and
the beam is fixed to the connecting structure by at least one of bonding of a protrusion that is provided in the connecting structure, protrudes inside the beam, and is arranged inside the beam to the first top surface part and the first bottom surface part and bonding of a beam attachment member provided in the connecting structure to the first flange parts.

2. The end structure of a vehicle according to claim 1, wherein, in a case where the protrusion is provided in the connecting structure, a protruding side surface part which faces the first side surface part is formed in the protrusion.

3. The end structure of a vehicle according to claim 1, wherein, in a case where the beam attachment member is provided in the connecting structure and the beam attachment member is fixed to the first flange parts, in a cross-sectional view perpendicular to the vehicle width direction, the beam attachment member includes
a second top surface part and a second bottom surface part which face each other,
a second side surface part that connects one ends of the second top surface part and the second bottom surface part, and
second flange parts formed to protrude vertically outwardly at the other ends of the second top surface part and the second bottom surface part, and
the first flange parts and the second flange parts are fixed.

4. The end structure of a vehicle according to claim 3, wherein the second side surface part is positioned on a vehicle interior side in a vehicle longitudinal direction with respect to the first flange parts.

5. The end structure of a vehicle according to claim 1, wherein, in a case where the beam attachment member is provided in the connecting structure and the beam attachment member is fixed to the first flange parts,
a first reinforcing member is provided in a region of an opening part of the beam that faces at least the connecting structure in the vehicle width direction, and
a closed cross section is formed by the beam and the first reinforcing member in a cross-sectional view perpendicular to the vehicle width direction.

6. The end structure of a vehicle according to claim 5, wherein, in a cross-sectional view perpendicular to the vehicle width direction, the first reinforcing member includes
a first reinforcing member top surface part and a first reinforcing member bottom surface part which face each other, and
a first reinforcing member side surface part that connects one ends of the first reinforcing member top surface part and the first reinforcing member bottom surface part, and
the first reinforcing member is arranged inside the beam, the first top surface part and the first reinforcing member top surface part are fixed, and the first bottom surface part and the first reinforcing member bottom surface part are fixed.

7. The end structure of a vehicle according to claim 6, wherein, in the first reinforcing member side surface part, a convex part that protrudes to a vehicle interior side in a vehicle longitudinal direction with respect to the first flange parts is formed.

8. The end structure of a vehicle according to claim 7, wherein at least a part of the first reinforcing member side surface part is in contact with the connecting structure.

9. The end structure of a vehicle according to claim 3, wherein a second reinforcing member is provided in a region of an opening part of the beam that faces at least the beam attachment member,
in a cross-sectional view perpendicular to the vehicle width direction, the second reinforcing member includes
a second reinforcing member top surface part and a second reinforcing member bottom surface part which face each other,
a second reinforcing member side surface part that connects one ends of the second reinforcing member top surface part and the second reinforcing member bottom surface part, and
second reinforcing member flange parts formed to protrude vertically outwardly at the other ends of the second reinforcing member top surface part and the second reinforcing member bottom surface part,
the second reinforcing member is arranged inside the beam,
the second reinforcing member flange parts are fixed to the first side surface part, and
the second reinforcing member side surface part is in contact with the beam attachment member.

10. The end structure of a vehicle according to claim 1, wherein, in a case where the beam attachment member is provided in the connecting structure and the beam attachment member is fixed to the first flange parts,
the connecting structure further includes a structure main body part that is provided to extend in the vertical direction,
the beam attachment member includes
a beam attachment surface to which the beam is attached and which includes a bent portion that bends toward a vehicle interior side in a vehicle longitudinal direction at an end on the outside in the vehicle width direction, and
a main body connecting surface which includes a surface perpendicular to the beam attachment surface in a plan view and is attached to the structure main body part, and
at least one third reinforcing member is additionally provided to bridge the structure main body part and the beam attachment surface in a plan view.

11. The end structure of a vehicle according to claim 10, wherein the bent portion has a radius of curvature of 50 to 200 mm.

12. The end structure of a vehicle according to claim 10, wherein the third reinforcing member is provided such that a ratio $L_1/L_2$ of a length $L_1$ of the third reinforcing member in the vehicle longitudinal direction to a length $L_2$ of a surface of the structure main body part to which the third reinforcing member is attached in the vehicle longitudinal direction is 0.8 or more.

13. The end structure of a vehicle according to claim 10, wherein the structure main body part has a U-shaped cross section in which an opening part is provided in the vehicle width direction in a plan view, and
a closed cross section part whose horizontal cross section shape formed by the structure main body part and the main body connecting surface is a closed cross section is further provided.

14. The end structure of a vehicle according to claim 13, wherein, in a case where a plurality of third reinforcing members are provided in the vertical direction,
inside the closed cross section part, a reinforcing plate arranged in accordance with a position of a rear side tip, among tips of the third reinforcing member, in the vehicle longitudinal direction is provided, and
the reinforcing plate has a shape that extends to the rear side tip of the third reinforcing member positioned on the uppermost side from the rear side tip of the third reinforcing member positioned on the lowermost side among the plurality of third reinforcing members.

15. The end structure of a vehicle according to claim 13,
wherein a partition member is provided to fill a space inside the closed cross section part in a horizontal cross-sectional view of the closed cross section part, and
the partition member is arranged in accordance with an installation height of at least one of the third reinforcing members.

16. The end structure of a vehicle according to claim 1, wherein the end structure of the vehicle is an underrun protector.

17. An end structure of a vehicle, comprising:
a beam that extends in a vehicle width direction and a connecting structure that connects the beam and a vehicle body frame,
wherein the connecting structure includes
a structure main body part that is provided to extend in a vertical direction, and
a beam attachment member to which the beam is attached, the beam attachment member includes
a beam attachment surface to which the beam is attached and which includes a bent portion that bends toward a vehicle interior side in a vehicle longitudinal direction at an end on the outside in the vehicle width direction, and
a main body connecting surface which includes a surface perpendicular to the beam attachment surface in a plan view and is attached to the structure main body part, and
at least one reinforcing member is additionally provided to bridge the structure main body part and the beam attachment surface in a plan view.

* * * * *